(12) United States Patent
Sarajedini

(10) Patent No.: US 11,463,179 B2
(45) Date of Patent: *Oct. 4, 2022

(54) SYSTEMS AND METHODS OF ESTIMATING OPTIMAL PHASES TO USE FOR INDIVIDUAL ANTENNAS IN AN ANTENNA ARRAY

(71) Applicant: Energous Corporation, San Jose, CA (US)

(72) Inventor: Amir Sarajedini, Carlsbad, CA (US)

(73) Assignee: ENERGOUS CORPORATION, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/330,284

(22) Filed: May 25, 2021

(65) Prior Publication Data
US 2021/0391927 A1 Dec. 16, 2021

Related U.S. Application Data

(63) Continuation of application No. 16/784,035, filed on Feb. 6, 2020, now Pat. No. 11,018,779.
(Continued)

(51) Int. Cl.
*H04B 17/00* (2015.01)
*H04B 17/12* (2015.01)
(Continued)

(52) U.S. Cl.
CPC .............. *H04B 17/12* (2015.01); *H02J 50/20* (2016.02); *H02J 50/40* (2016.02); *H02J 50/80* (2016.02); *H04B 17/24* (2015.01); *H02J 50/001* (2020.01)

(58) Field of Classification Search
CPC ........ H04B 17/12; H04B 17/24; H04B 17/27; H02J 50/20; H02J 50/40; H02J 50/402; H02J 50/50
See application file for complete search history.

(56) References Cited

U.S. PATENT DOCUMENTS

| 787,412 A | 4/1905 | Tesla |
| 2,811,624 A | 10/1957 | Haagensen |

(Continued)

FOREIGN PATENT DOCUMENTS

| CN | 1829999 A | 9/2006 |
| CN | 101401312 A | 4/2009 |

(Continued)

OTHER PUBLICATIONS

Energous Corp., IPRP, PCT/US2014/037072, Nov. 10, 2015, 6 pgs.
(Continued)

*Primary Examiner* — Tuan Pham
(74) *Attorney, Agent, or Firm* — Morgan, Lewis & Bockius LLP

(57) ABSTRACT

A method includes receiving a wireless communication signal indicating that a receiver is within a wireless-power-transmission range of a transmitter. In response to the receiving, the method further includes transmitting a plurality of radio frequency (RF) test signals using at least two test phases for a respective antenna. The method further includes receiving information identifying a first amount of power delivered to the receiver by a first RF test signal transmitted at a first of the at least two test phases, receiving information identifying a second amount of power delivered to the receiver by a second RF test signal transmitted at a second of the at least two test phases, and determining, based on the first and second amounts of power, an optimal phase for the respective antenna.

29 Claims, 11 Drawing Sheets

Related U.S. Application Data

(60) Provisional application No. 62/802,127, filed on Feb. 6, 2019.

(51) Int. Cl.
*H04B 17/24* (2015.01)
*H02J 50/80* (2016.01)
*H02J 50/20* (2016.01)
*H02J 50/40* (2016.01)
*H02J 50/00* (2016.01)

(56) References Cited

U.S. PATENT DOCUMENTS

| | | |
|---|---|---|
| 2,863,148 A | 12/1958 | Gammon et al. |
| 3,167,775 A | 1/1965 | Guertler |
| 3,434,678 A | 3/1969 | Brown et al. |
| 3,696,384 A | 10/1972 | Lester |
| 3,754,269 A | 8/1973 | Gavin |
| 4,101,895 A | 7/1978 | Jones, Jr. |
| 4,360,741 A | 11/1982 | Fitzsimmons et al. |
| 4,944,036 A | 7/1990 | Hyatt |
| 4,995,010 A | 2/1991 | Knight |
| 5,142,292 A | 8/1992 | Chang |
| 5,200,759 A | 4/1993 | McGinnis |
| 5,211,471 A | 5/1993 | Rohrs |
| 5,276,455 A | 1/1994 | Fitzsimmons et al. |
| 5,548,292 A | 8/1996 | Hirshfield et al. |
| 5,556,749 A | 9/1996 | Mitsuhashi et al. |
| 5,568,088 A | 10/1996 | Dent et al. |
| 5,631,572 A | 5/1997 | Sheen et al. |
| 5,646,633 A | 7/1997 | Dahlberg |
| 5,697,063 A | 12/1997 | Kishigami et al. |
| 5,712,642 A | 1/1998 | Hulderman |
| 5,936,527 A | 8/1999 | Isaacman et al. |
| 5,982,139 A | 11/1999 | Parise |
| 6,046,708 A | 4/2000 | MacDonald, Jr. et al. |
| 6,061,025 A | 5/2000 | Jackson et al. |
| 6,127,799 A | 10/2000 | Krishnan |
| 6,127,942 A | 10/2000 | Welle |
| 6,163,296 A | 12/2000 | Lier et al. |
| 6,176,433 B1 | 1/2001 | Uesaka et al. |
| 6,208,115 B1 | 3/2001 | Binder |
| 6,271,799 B1 | 8/2001 | Rief |
| 6,289,237 B1 | 9/2001 | Mickle et al. |
| 6,316,915 B1 | 11/2001 | Fujiwara et al. |
| 6,329,908 B1 | 12/2001 | Frecska |
| 6,400,586 B2 | 6/2002 | Raddi et al. |
| 6,421,235 B2 | 7/2002 | Ditzik |
| 6,437,685 B2 | 8/2002 | Hanaki |
| 6,456,253 B1 | 9/2002 | Rummeli et al. |
| 6,476,769 B1 | 11/2002 | Lehtola |
| 6,476,795 B1 | 11/2002 | Derocher et al. |
| 6,501,414 B2 | 12/2002 | Arndt et al. |
| 6,583,723 B2 | 6/2003 | Watanabe et al. |
| 6,597,897 B2 | 7/2003 | Tang |
| 6,615,074 B2 | 9/2003 | Mickle et al. |
| 6,650,376 B1 | 11/2003 | Obitsu |
| 6,661,197 B2 | 12/2003 | Zink et al. |
| 6,664,920 B1 | 12/2003 | Mott et al. |
| 6,680,700 B2 | 1/2004 | Hilgers |
| 6,798,716 B1 | 9/2004 | Charych |
| 6,803,744 B1 | 10/2004 | Sabo |
| 6,853,197 B1 | 2/2005 | McFarland |
| 6,856,291 B2 | 2/2005 | Mickle et al. |
| 6,911,945 B2 | 6/2005 | Korva |
| 6,960,968 B2 | 11/2005 | Odendaal et al. |
| 6,967,462 B1 | 11/2005 | Landis |
| 6,982,697 B2 | 1/2006 | Wilson et al. |
| 6,988,026 B2 | 1/2006 | Breed et al. |
| 7,003,350 B2 | 2/2006 | Denker et al. |
| 7,012,572 B1 | 3/2006 | Schaffner et al. |
| 7,027,311 B2 | 4/2006 | Vanderelli et al. |
| 7,042,196 B2 | 5/2006 | Ka-Lai et al. |
| 7,068,234 B2 | 6/2006 | Sievenpiper |
| 7,068,991 B2 | 6/2006 | Parise |
| 7,079,079 B2 | 7/2006 | Jo et al. |
| 7,183,748 B1 | 2/2007 | Unno et al. |
| 7,191,013 B1 | 3/2007 | Miranda et al. |
| 7,193,644 B2 | 3/2007 | Carter |
| 7,196,663 B2 | 3/2007 | Bolzer et al. |
| 7,205,749 B2 | 4/2007 | Hagen et al. |
| 7,215,296 B2 | 5/2007 | Abramov et al. |
| 7,222,356 B1 | 5/2007 | Yonezawa et al. |
| 7,274,334 B2 | 9/2007 | O'Riordan et al. |
| 7,274,336 B2 | 9/2007 | Carson |
| 7,351,975 B2 | 4/2008 | Brady et al. |
| 7,359,730 B2 | 4/2008 | Dennis et al. |
| 7,372,408 B2 | 5/2008 | Gaucher |
| 7,392,068 B2 | 6/2008 | Dayan |
| 7,403,803 B2 | 7/2008 | Mickle et al. |
| 7,443,057 B2 | 10/2008 | Nunally |
| 7,451,839 B2 | 11/2008 | Perlman |
| 7,463,201 B2 | 12/2008 | Chiang et al. |
| 7,471,247 B2 | 12/2008 | Saily |
| 7,525,283 B2 | 4/2009 | Cheng et al. |
| 7,535,195 B1 | 5/2009 | Horovitz et al. |
| 7,564,411 B2 | 7/2009 | Piisila et al. |
| 7,614,556 B2 | 11/2009 | Overhultz et al. |
| 7,639,994 B2 | 12/2009 | Greene et al. |
| 7,643,312 B2 | 1/2010 | Vanderelli et al. |
| 7,652,577 B1 | 1/2010 | Madhow et al. |
| 7,679,576 B2 | 3/2010 | Riedel et al. |
| 7,702,771 B2 | 4/2010 | Ewing et al. |
| 7,786,419 B2 | 8/2010 | Hyde et al. |
| 7,812,771 B2 | 10/2010 | Greene et al. |
| 7,830,312 B2 | 11/2010 | Choudhury et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,904,117 B2 | 3/2011 | Doan et al. |
| 7,911,386 B1 | 3/2011 | Ito et al. |
| 7,925,308 B2 | 4/2011 | Greene et al. |
| 7,948,208 B2 | 5/2011 | Partovi et al. |
| 8,010,205 B2 | 8/2011 | Rahman et al. |
| 8,049,676 B2 | 11/2011 | Yoon et al. |
| 8,055,003 B2 | 11/2011 | Mittleman et al. |
| 8,070,595 B2 | 12/2011 | Alderucci et al. |
| 8,072,380 B2 | 12/2011 | Crouch |
| 8,092,301 B2 | 1/2012 | Alderucci et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,184,454 B2 | 5/2012 | Mao |
| 8,228,194 B2 | 7/2012 | Mickle |
| 8,234,509 B2 | 7/2012 | Gioscia et al. |
| 8,264,101 B2 | 9/2012 | Hyde et al. |
| 8,264,291 B2 | 9/2012 | Morita |
| 8,276,325 B2 | 10/2012 | Clifton et al. |
| 8,278,784 B2 | 10/2012 | Cook et al. |
| 8,284,101 B2 | 10/2012 | Fusco |
| 8,310,201 B1 | 11/2012 | Wright |
| 8,338,991 B2 | 12/2012 | Von Novak et al. |
| 8,362,745 B2 | 1/2013 | Tinaphong |
| 8,380,255 B2 | 2/2013 | Shearer et al. |
| 8,384,600 B2 | 2/2013 | Huang et al. |
| 8,410,953 B2 | 4/2013 | Zeine |
| 8,411,963 B2 | 4/2013 | Luff |
| 8,432,062 B2 | 4/2013 | Greene et al. |
| 8,432,071 B2 | 4/2013 | Huang et al. |
| 8,446,248 B2 | 5/2013 | Zeine |
| 8,447,234 B2 | 5/2013 | Cook et al. |
| 8,451,189 B1 | 5/2013 | Fluhler |
| 8,452,235 B2 | 5/2013 | Kirby et al. |
| 8,457,656 B2 | 6/2013 | Perkins et al. |
| 8,461,817 B2 | 6/2013 | Martin et al. |
| 8,467,733 B2 | 6/2013 | Leabman |
| 8,497,601 B2 | 7/2013 | Hall et al. |
| 8,497,658 B2 | 7/2013 | Von Novak et al. |
| 8,552,597 B2 | 8/2013 | Song et al. |
| 8,558,661 B2 | 10/2013 | Zeine |
| 8,560,026 B2 | 10/2013 | Chanterac |

(56) References Cited

U.S. PATENT DOCUMENTS

| | | |
|---|---|---|
| 8,564,485 B2 | 10/2013 | Milosavljevic et al. |
| 8,587,154 B2 | 11/2013 | Fells et al. |
| 8,604,746 B2 | 12/2013 | Lee |
| 8,614,643 B2 | 12/2013 | Leabman |
| 8,621,245 B2 | 12/2013 | Shearer et al. |
| 8,626,249 B2 | 1/2014 | Kuusilinna et al. |
| 8,629,576 B2 | 1/2014 | Levine |
| 8,653,966 B2 | 2/2014 | Rao et al. |
| 8,655,272 B2 | 2/2014 | Saunamäki |
| 8,674,551 B2 | 3/2014 | Low et al. |
| 8,686,685 B2 | 4/2014 | Moshfeghi |
| 8,686,905 B2 | 4/2014 | Shtrom |
| 8,712,355 B2 | 4/2014 | Black et al. |
| 8,712,485 B2 | 4/2014 | Tam |
| 8,718,773 B2 | 5/2014 | Wills et al. |
| 8,729,737 B2 | 5/2014 | Schatz et al. |
| 8,736,228 B1 | 5/2014 | Freed et al. |
| 8,760,113 B2 | 6/2014 | Keating |
| 8,770,482 B2 | 7/2014 | Ackermann et al. |
| 8,772,960 B2 | 7/2014 | Yoshida |
| 8,819,659 B2 | 8/2014 | Ramer et al. |
| 8,823,319 B2 | 9/2014 | Von Novak, III et al. |
| 8,832,646 B1 | 9/2014 | Wendling |
| 8,853,891 B2 | 10/2014 | Soar |
| 8,854,176 B2 | 10/2014 | Zeine |
| 8,860,364 B2 | 10/2014 | Low et al. |
| 8,896,315 B1 | 11/2014 | Davies |
| 8,897,770 B1 | 11/2014 | Frolov et al. |
| 8,903,456 B2 | 12/2014 | Chu et al. |
| 8,917,057 B2 | 12/2014 | Hui |
| 8,923,189 B2 | 12/2014 | Leabman |
| 8,928,544 B2 | 1/2015 | Massie et al. |
| 8,937,408 B2 | 1/2015 | Ganem et al. |
| 8,946,940 B2 | 2/2015 | Kim et al. |
| 8,963,486 B2 | 2/2015 | Kirby et al. |
| 8,970,070 B2 | 3/2015 | Sada et al. |
| 8,989,053 B1 | 3/2015 | Skaaksrud et al. |
| 9,000,616 B2 | 4/2015 | Greene et al. |
| 9,001,622 B2 | 4/2015 | Perry |
| 9,006,934 B2 | 4/2015 | Kozakai et al. |
| 9,021,277 B2 | 4/2015 | Shearer et al. |
| 9,030,161 B2 | 5/2015 | Lu et al. |
| 9,059,598 B2 | 6/2015 | Kang et al. |
| 9,059,599 B2 | 6/2015 | Won et al. |
| 9,077,188 B2 | 7/2015 | Moshfeghi |
| 9,083,595 B2 | 7/2015 | Rakib et al. |
| 9,088,216 B2 | 7/2015 | Garrity et al. |
| 9,124,125 B2 | 9/2015 | Leabman et al. |
| 9,130,397 B2 | 9/2015 | Leabman et al. |
| 9,130,602 B2 | 9/2015 | Cook |
| 9,142,998 B2 | 9/2015 | Yu et al. |
| 9,143,000 B2 | 9/2015 | Leabman et al. |
| 9,143,010 B2 | 9/2015 | Urano |
| 9,153,074 B2 | 10/2015 | Zhou et al. |
| 9,178,389 B2 | 11/2015 | Hwang |
| 9,225,196 B2 | 12/2015 | Huang et al. |
| 9,240,469 B2 | 1/2016 | Sun et al. |
| 9,242,411 B2 | 1/2016 | Kritchman et al. |
| 9,244,500 B2 | 1/2016 | Cain et al. |
| 9,252,628 B2 | 2/2016 | Leabman et al. |
| 9,270,344 B2 | 2/2016 | Rosenberg |
| 9,276,329 B2 | 3/2016 | Jones et al. |
| 9,282,582 B1 | 3/2016 | Dunsbergen et al. |
| 9,294,840 B1 | 3/2016 | Anderson et al. |
| 9,297,896 B1 | 3/2016 | Andrews |
| 9,318,898 B2 | 4/2016 | John |
| 9,368,020 B1 | 6/2016 | Bell et al. |
| 9,401,977 B1 | 7/2016 | Gaw |
| 9,409,490 B2 | 8/2016 | Kawashima |
| 9,419,335 B2 | 8/2016 | Pintos |
| 9,419,443 B2 | 8/2016 | Leabman |
| 9,438,045 B1 | 9/2016 | Leabman |
| 9,438,046 B1 | 9/2016 | Leabman |
| 9,444,283 B2 | 9/2016 | Son et al. |
| 9,450,449 B1 | 9/2016 | Leabman et al. |
| 9,452,296 B2 | 9/2016 | Forsell |
| 9,461,502 B2 | 10/2016 | Lee et al. |
| 9,520,725 B2 | 12/2016 | Masaoka et al. |
| 9,520,748 B2 | 12/2016 | Hyde et al. |
| 9,521,926 B1 | 12/2016 | Leabman et al. |
| 9,522,270 B2 | 12/2016 | Perryman et al. |
| 9,532,748 B2 | 1/2017 | Denison et al. |
| 9,537,354 B2 | 1/2017 | Bell et al. |
| 9,537,357 B2 | 1/2017 | Leabman |
| 9,537,358 B2 | 1/2017 | Leabman |
| 9,538,382 B2 | 1/2017 | Bell et al. |
| 9,544,640 B2 | 1/2017 | Lau |
| 9,559,553 B2 | 1/2017 | Bae |
| 9,564,773 B2 | 2/2017 | Pogorelik et al. |
| 9,571,974 B2 | 2/2017 | Choi et al. |
| 9,590,317 B2 | 3/2017 | Zimmerman et al. |
| 9,590,444 B2 | 3/2017 | Walley |
| 9,620,996 B2 | 4/2017 | Zeine |
| 9,647,328 B2 | 5/2017 | Dobric |
| 9,647,483 B1 | 5/2017 | Bana et al. |
| 9,706,137 B2 | 7/2017 | Scanlon et al. |
| 9,711,999 B2 | 7/2017 | Hietala et al. |
| 9,723,635 B2 | 8/2017 | Nambord et al. |
| 9,787,103 B1 | 10/2017 | Leabman et al. |
| 9,793,758 B2 | 10/2017 | Leabman |
| 9,793,764 B2 | 10/2017 | Perry |
| 9,800,080 B2 | 10/2017 | Leabman et al. |
| 9,800,172 B1 | 10/2017 | Leabman |
| 9,806,564 B2 | 10/2017 | Leabman |
| 9,812,890 B1 | 11/2017 | Leabman et al. |
| 9,819,230 B2 | 11/2017 | Petras et al. |
| 9,824,815 B2 | 11/2017 | Leabman et al. |
| 9,825,674 B1 | 11/2017 | Leabman |
| 9,831,718 B2 | 11/2017 | Leabman et al. |
| 9,838,083 B2 | 12/2017 | Bell et al. |
| 9,843,201 B1 | 12/2017 | Leabman et al. |
| 9,843,213 B2 | 12/2017 | Leabman et al. |
| 9,843,229 B2 | 12/2017 | Leabman |
| 9,843,763 B2 | 12/2017 | Leabman et al. |
| 9,847,669 B2 | 12/2017 | Leabman |
| 9,847,677 B1 | 12/2017 | Leabman |
| 9,847,679 B2 | 12/2017 | Bell et al. |
| 9,853,361 B2 | 12/2017 | Chen et al. |
| 9,853,458 B1 | 12/2017 | Bell et al. |
| 9,853,485 B2 | 12/2017 | Contopanagos |
| 9,853,692 B1 | 12/2017 | Bell et al. |
| 9,859,756 B2 | 1/2018 | Leabman et al. |
| 9,859,757 B1 | 1/2018 | Leabman et al. |
| 9,859,758 B1 | 1/2018 | Leabman |
| 9,859,797 B1 | 1/2018 | Leabman |
| 9,866,279 B2 | 1/2018 | Bell et al. |
| 9,867,032 B2 | 1/2018 | Verma et al. |
| 9,867,062 B1 | 1/2018 | Bell et al. |
| 9,871,301 B2 | 1/2018 | Contopanagos |
| 9,871,387 B1 | 1/2018 | Bell et al. |
| 9,871,398 B1 | 1/2018 | Leabman |
| 9,876,379 B1 | 1/2018 | Leabman et al. |
| 9,876,380 B1 | 1/2018 | Leabman et al. |
| 9,876,394 B1 | 1/2018 | Leabman |
| 9,876,536 B1 | 1/2018 | Bell et al. |
| 9,876,648 B2 | 1/2018 | Bell |
| 9,882,394 B1 | 1/2018 | Bell et al. |
| 9,882,395 B1 | 1/2018 | Leabman et al. |
| 9,882,427 B2 | 1/2018 | Leabman et al. |
| 9,882,430 B1 | 1/2018 | Leabman et al. |
| 9,887,584 B1 | 2/2018 | Bell et al. |
| 9,887,739 B2 | 2/2018 | Leabman et al. |
| 9,891,669 B2 | 2/2018 | Bell |
| 9,893,535 B2 | 2/2018 | Leabman |
| 9,893,538 B1 | 2/2018 | Bell et al. |
| 9,893,554 B2 | 2/2018 | Bell et al. |
| 9,893,555 B1 | 2/2018 | Leabman et al. |
| 9,893,564 B2 | 2/2018 | de Rochemont |
| 9,899,744 B1 | 2/2018 | Contopanagos et al. |
| 9,899,844 B1 | 2/2018 | Bell et al. |
| 9,899,861 B1 | 2/2018 | Leabman et al. |
| 9,899,873 B2 | 2/2018 | Bell et al. |
| 9,906,275 B2 | 2/2018 | Leabman |
| 9,912,199 B2 | 3/2018 | Leabman et al. |

(56) References Cited

U.S. PATENT DOCUMENTS

| | | |
|---|---|---|
| 9,916,485 B1 | 3/2018 | Lilly et al. |
| 9,917,477 B1 | 3/2018 | Bell et al. |
| 9,923,386 B1 | 3/2018 | Leabman et al. |
| 9,939,864 B1 | 4/2018 | Bell et al. |
| 9,941,707 B1 | 4/2018 | Leabman |
| 9,941,747 B2 | 4/2018 | Bell et al. |
| 9,948,135 B2 | 4/2018 | Leabman et al. |
| 9,954,374 B1 | 4/2018 | Bell et al. |
| 9,965,009 B1 | 5/2018 | Bell et al. |
| 9,966,765 B1 | 5/2018 | Leabman |
| 9,966,784 B2 | 5/2018 | Leabman |
| 9,967,743 B1 | 5/2018 | Bell et al. |
| 9,973,008 B1 | 5/2018 | Leabman |
| 9,991,741 B1 | 6/2018 | Bell et al. |
| 10,003,211 B1 | 6/2018 | Leabman et al. |
| 10,008,777 B1 | 6/2018 | Broyde et al. |
| 10,008,875 B1 | 6/2018 | Leabman |
| 10,008,889 B2 | 6/2018 | Bell et al. |
| 10,014,728 B1 | 7/2018 | Leabman |
| 10,020,678 B1 | 7/2018 | Leabman |
| 10,027,159 B2 | 7/2018 | Hosseini |
| 10,027,168 B2 | 7/2018 | Leabman |
| 10,027,180 B1 | 7/2018 | Hosseini |
| 10,033,222 B1 | 7/2018 | Leabman |
| 10,038,337 B1 | 7/2018 | Leabman et al. |
| 10,050,462 B1 | 8/2018 | Leabman et al. |
| 10,050,470 B1 | 8/2018 | Leabman |
| 10,056,782 B1 | 8/2018 | Leabman |
| 10,063,064 B1 | 8/2018 | Bell et al. |
| 10,063,105 B2 | 8/2018 | Leabman |
| 10,063,106 B2 | 8/2018 | Bell et al. |
| 10,068,703 B1 | 9/2018 | Contopanagos |
| 10,075,008 B1 | 9/2018 | Bell et al. |
| 10,075,017 B2 | 9/2018 | Leabman et al. |
| 10,079,515 B2 | 9/2018 | Hosseini et al. |
| 10,090,699 B1 | 10/2018 | Leabman |
| 10,090,714 B2 | 10/2018 | Bohn et al. |
| 10,090,886 B1 | 10/2018 | Bell et al. |
| 10,103,552 B1 | 10/2018 | Leabman et al. |
| 10,103,582 B2 | 10/2018 | Leabman et al. |
| 10,110,046 B1 | 10/2018 | Esquibel et al. |
| 10,116,143 B1 | 10/2018 | Leabman et al. |
| 10,116,162 B2 | 10/2018 | Hosseini et al. |
| 10,116,170 B1 | 10/2018 | Leabman |
| 10,122,219 B1 | 11/2018 | Hosseini et al. |
| 10,122,415 B2 | 11/2018 | Bell et al. |
| 10,124,754 B1 | 11/2018 | Leabman |
| 10,128,686 B1 | 11/2018 | Leabman et al. |
| 10,128,693 B2 | 11/2018 | Bell et al. |
| 10,128,695 B2 | 11/2018 | Leabman et al. |
| 10,128,699 B2 | 11/2018 | Leabman |
| 10,134,260 B1 | 11/2018 | Bell et al. |
| 10,135,112 B1 | 11/2018 | Hosseini |
| 10,135,286 B2 | 11/2018 | Hosseini et al. |
| 10,135,294 B1 | 11/2018 | Leabman |
| 10,135,295 B2 | 11/2018 | Leabman |
| 10,141,768 B2 | 11/2018 | Leabman et al. |
| 10,141,771 B1 | 11/2018 | Hosseini et al. |
| 10,141,791 B2 | 11/2018 | Bell et al. |
| 10,148,097 B1 | 12/2018 | Leabman et al. |
| 10,148,133 B2 | 12/2018 | Leabman et al. |
| 10,153,645 B1 | 12/2018 | Bell et al. |
| 10,153,653 B1 | 12/2018 | Bell et al. |
| 10,153,660 B1 | 12/2018 | Leabman et al. |
| 10,158,257 B2 | 12/2018 | Leabman |
| 10,158,259 B1 | 12/2018 | Leabman |
| 10,164,478 B2 | 12/2018 | Leabman |
| 10,170,917 B1 | 1/2019 | Bell et al. |
| 10,177,594 B2 | 1/2019 | Contopanagos |
| 10,181,756 B2 | 1/2019 | Bae et al. |
| 10,186,892 B2 | 1/2019 | Hosseini et al. |
| 10,186,893 B2 | 1/2019 | Bell et al. |
| 10,186,911 B2 | 1/2019 | Leabman |
| 10,186,913 B2 | 1/2019 | Leabman et al. |
| 10,193,396 B1 | 1/2019 | Bell et al. |
| 10,199,835 B2 | 2/2019 | Bell |
| 10,199,849 B1 | 2/2019 | Bell |
| 10,199,850 B2 | 2/2019 | Leabman |
| 10,205,239 B1 | 2/2019 | Contopanagos et al. |
| 10,206,185 B2 | 2/2019 | Leabman et al. |
| 10,211,674 B1 | 2/2019 | Leabman et al. |
| 10,211,680 B2 | 2/2019 | Leabman et al. |
| 10,211,682 B2 | 2/2019 | Bell et al. |
| 10,211,685 B2 | 2/2019 | Bell et al. |
| 10,218,207 B2 | 2/2019 | Hosseini et al. |
| 10,218,227 B2 | 2/2019 | Leabman et al. |
| 10,223,717 B1 | 3/2019 | Bell |
| 10,224,758 B2 | 3/2019 | Leabman et al. |
| 10,224,982 B1 | 3/2019 | Leabman |
| 10,230,266 B1 | 3/2019 | Leabman et al. |
| 10,243,414 B1 | 3/2019 | Leabman et al. |
| 10,256,657 B2 | 4/2019 | Hosseini et al. |
| 10,256,677 B2 | 4/2019 | Hosseini et al. |
| 10,263,432 B1 | 4/2019 | Leabman et al. |
| 10,263,476 B2 | 4/2019 | Leabman |
| 10,270,261 B2 | 4/2019 | Bell et al. |
| 10,277,054 B2 | 4/2019 | Hosseini |
| 10,291,055 B1 | 5/2019 | Bell et al. |
| 10,291,056 B2 | 5/2019 | Bell et al. |
| 10,291,066 B1 | 5/2019 | Leabman |
| 10,291,294 B2 | 5/2019 | Leabman |
| 10,298,024 B2 | 5/2019 | Leabman |
| 10,298,133 B2 | 5/2019 | Leabman |
| 10,305,315 B2 | 5/2019 | Leabman et al. |
| 10,312,715 B2 | 6/2019 | Leabman |
| 10,320,446 B2 | 6/2019 | Hosseini |
| 10,333,332 B1 | 6/2019 | Hosseini |
| 10,333,357 B1 | 6/2019 | Abu Qahouq |
| 10,355,534 B2 | 7/2019 | Johnston et al. |
| 10,381,880 B2 | 8/2019 | Leabman et al. |
| 10,389,161 B2 | 8/2019 | Hosseini et al. |
| 10,396,588 B2 | 8/2019 | Leabman |
| 10,396,604 B2 | 8/2019 | Bell et al. |
| 10,439,442 B2 | 10/2019 | Hosseini et al. |
| 10,439,448 B2 | 10/2019 | Bell et al. |
| 10,447,093 B2 | 10/2019 | Hosseini |
| 10,476,312 B2 | 11/2019 | Johnston et al. |
| 10,483,768 B2 | 11/2019 | Bell et al. |
| 10,490,346 B2 | 11/2019 | Contopanagos |
| 10,491,029 B2 | 11/2019 | Hosseini |
| 10,498,144 B2 | 12/2019 | Leabman et al. |
| 10,509,466 B1 | 12/2019 | Miller et al. |
| 10,511,097 B2 | 12/2019 | Komaros et al. |
| 10,511,196 B2 | 12/2019 | Hosseini |
| 10,516,289 B2 | 12/2019 | Leabman et al. |
| 10,516,301 B2 | 12/2019 | Leabman |
| 10,523,033 B2 | 12/2019 | Leabman |
| 10,523,058 B2 | 12/2019 | Leabman |
| 10,554,052 B2 | 2/2020 | Bell et al. |
| 10,594,165 B2 | 3/2020 | Hosseini |
| 10,615,647 B2 | 4/2020 | Johnston et al. |
| 10,616,534 B2 | 4/2020 | Thiel et al. |
| 10,651,670 B1 | 5/2020 | Jiang et al. |
| 10,680,319 B2 | 6/2020 | Hosseini et al. |
| 10,714,984 B2 | 7/2020 | Hosseini et al. |
| 10,734,717 B2 | 8/2020 | Hosseini |
| 10,778,041 B2 | 9/2020 | Leabman |
| 10,790,674 B2 | 9/2020 | Bell et al. |
| 10,840,743 B2 | 11/2020 | Johnston et al. |
| 10,848,853 B2 | 11/2020 | Leabman et al. |
| 10,879,740 B2 | 12/2020 | Hosseini |
| 10,923,954 B2 | 2/2021 | Leabman |
| 10,958,095 B2 | 3/2021 | Leabman et al. |
| 10,965,164 B2 | 3/2021 | Leabman et al. |
| 10,985,617 B1 | 4/2021 | Johnston et al. |
| 10,992,187 B2 | 4/2021 | Leabman |
| 11,011,942 B2 | 5/2021 | Liu |
| 11,018,779 B2 * | 5/2021 | Sarajedini ............ H04B 5/0037 |
| 11,114,885 B2 | 9/2021 | Hosseini et al. |
| 2001/0027876 A1 | 10/2001 | Tsukamoto et al. |
| 2002/0001307 A1 | 1/2002 | Nguyen et al. |
| 2002/0024471 A1 | 2/2002 | Ishitobi |
| 2002/0028655 A1 | 3/2002 | Rosener et al. |
| 2002/0034958 A1 | 3/2002 | Oberschmidt et al. |

(56) References Cited

U.S. PATENT DOCUMENTS

| | | |
|---|---|---|
| 2002/0054330 A1 | 5/2002 | Jinbo et al. |
| 2002/0065052 A1 | 5/2002 | Pande et al. |
| 2002/0072784 A1 | 6/2002 | Sheppard et al. |
| 2002/0080083 A1 | 6/2002 | Nantz et al. |
| 2002/0095980 A1 | 7/2002 | Breed et al. |
| 2002/0103447 A1 | 8/2002 | Terry |
| 2002/0123776 A1 | 9/2002 | Von Arx |
| 2002/0133592 A1 | 9/2002 | Matsuda |
| 2002/0171594 A1 | 11/2002 | Fang |
| 2002/0172223 A1 | 11/2002 | Stilp |
| 2003/0005759 A1 | 1/2003 | Breed et al. |
| 2003/0027036 A1 | 2/2003 | Emori et al. |
| 2003/0038750 A1 | 2/2003 | Chen |
| 2003/0058187 A1 | 3/2003 | Billiet et al. |
| 2003/0076274 A1 | 4/2003 | Phelan et al. |
| 2003/0179152 A1 | 9/2003 | Watada et al. |
| 2003/0179573 A1 | 9/2003 | Chun |
| 2003/0192053 A1 | 10/2003 | Sheppard et al. |
| 2004/0019624 A1 | 1/2004 | Sukegawa |
| 2004/0020100 A1 | 2/2004 | O'Brian et al. |
| 2004/0036657 A1 | 2/2004 | Forster et al. |
| 2004/0066251 A1 | 4/2004 | Eleftheriades et al. |
| 2004/0107641 A1 | 6/2004 | Walton et al. |
| 2004/0113543 A1 | 6/2004 | Daniels |
| 2004/0119675 A1 | 6/2004 | Washio et al. |
| 2004/0130425 A1 | 7/2004 | Dayan et al. |
| 2004/0130442 A1 | 7/2004 | Breed |
| 2004/0142733 A1 | 7/2004 | Parise |
| 2004/0145342 A1 | 7/2004 | Lyon |
| 2004/0155832 A1 | 8/2004 | Yuanzhu |
| 2004/0196190 A1 | 10/2004 | Mendolia et al. |
| 2004/0203979 A1 | 10/2004 | Attar et al. |
| 2004/0207559 A1 | 10/2004 | Milosavljevic |
| 2004/0218759 A1 | 11/2004 | Yacobi |
| 2004/0241402 A1 | 12/2004 | Kawate |
| 2004/0259604 A1 | 12/2004 | Mickle et al. |
| 2004/0263124 A1 | 12/2004 | Wieck et al. |
| 2005/0007276 A1 | 1/2005 | Barrick et al. |
| 2005/0030118 A1 | 2/2005 | Wang |
| 2005/0046584 A1 | 3/2005 | Breed |
| 2005/0055316 A1 | 3/2005 | Williams |
| 2005/0077872 A1 | 4/2005 | Single |
| 2005/0093766 A1 | 5/2005 | Turner |
| 2005/0116683 A1 | 6/2005 | Cheng |
| 2005/0117660 A1 | 6/2005 | Vialle et al. |
| 2005/0134517 A1 | 6/2005 | Gottl |
| 2005/0171411 A1 | 8/2005 | KenKnight |
| 2005/0198673 A1 | 9/2005 | Kit et al. |
| 2005/0227619 A1 | 10/2005 | Lee et al. |
| 2005/0232469 A1 | 10/2005 | Schofield |
| 2005/0237249 A1 | 10/2005 | Nagel |
| 2005/0237258 A1 | 10/2005 | Abramov et al. |
| 2005/0275983 A1 | 12/2005 | Franklin et al. |
| 2005/0282591 A1 | 12/2005 | Shaff |
| 2006/0013335 A1 | 1/2006 | Leabman |
| 2006/0019712 A1 | 1/2006 | Choi |
| 2006/0030279 A1 | 2/2006 | Leabman et al. |
| 2006/0033674 A1 | 2/2006 | Essig, Jr. et al. |
| 2006/0056855 A1 | 3/2006 | Nakagawa et al. |
| 2006/0071308 A1 | 4/2006 | Tang et al. |
| 2006/0092079 A1 | 5/2006 | de Rochemont |
| 2006/0094425 A1 | 5/2006 | Mickle et al. |
| 2006/0113955 A1 | 6/2006 | Nunally |
| 2006/0119532 A1 | 6/2006 | Yun et al. |
| 2006/0136004 A1 | 6/2006 | Cowan et al. |
| 2006/0160517 A1 | 7/2006 | Yoon |
| 2006/0183473 A1 | 8/2006 | Ukon |
| 2006/0190063 A1 | 8/2006 | Kanzius |
| 2006/0192913 A1 | 8/2006 | Shutou et al. |
| 2006/0199620 A1 | 9/2006 | Greene et al. |
| 2006/0238365 A1 | 10/2006 | Vecchione et al. |
| 2006/0266564 A1 | 11/2006 | Perlman et al. |
| 2006/0266917 A1 | 11/2006 | Baldis et al. |
| 2006/0278706 A1 | 12/2006 | Hatakayama et al. |
| 2006/0281435 A1 | 12/2006 | Shearer et al. |
| 2006/0284593 A1 | 12/2006 | Nagy et al. |
| 2006/0287094 A1 | 12/2006 | Mahaffey et al. |
| 2007/0007821 A1 | 1/2007 | Rossetti |
| 2007/0019693 A1 | 1/2007 | Graham |
| 2007/0021140 A1 | 1/2007 | Keyes |
| 2007/0060185 A1 | 3/2007 | Simon et al. |
| 2007/0070490 A1 | 3/2007 | Tsunoda et al. |
| 2007/0090997 A1 | 4/2007 | Brown et al. |
| 2007/0093269 A1 | 4/2007 | Leabman et al. |
| 2007/0097653 A1 | 5/2007 | Gilliland et al. |
| 2007/0099644 A1 | 5/2007 | Batra et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0164868 A1 | 7/2007 | Deavours et al. |
| 2007/0173196 A1 | 7/2007 | Gallic |
| 2007/0173214 A1 | 7/2007 | Mickle et al. |
| 2007/0178857 A1 | 8/2007 | Greene et al. |
| 2007/0178945 A1 | 8/2007 | Cook et al. |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0197281 A1 | 8/2007 | Stronach |
| 2007/0210960 A1 | 9/2007 | Rofougaran et al. |
| 2007/0222681 A1 | 9/2007 | Greene et al. |
| 2007/0228833 A1 | 10/2007 | Stevens et al. |
| 2007/0229261 A1 | 10/2007 | Zimmerman et al. |
| 2007/0240297 A1 | 10/2007 | Yang et al. |
| 2007/0257634 A1 | 11/2007 | Leschin et al. |
| 2007/0273486 A1 | 11/2007 | Shiotsu |
| 2007/0291165 A1 | 12/2007 | Wang |
| 2007/0296639 A1 | 12/2007 | Hook et al. |
| 2007/0298846 A1 | 12/2007 | Greene et al. |
| 2008/0014897 A1 | 1/2008 | Cook et al. |
| 2008/0024376 A1 | 1/2008 | Norris et al. |
| 2008/0048917 A1 | 2/2008 | Achour et al. |
| 2008/0062062 A1 | 3/2008 | Borau et al. |
| 2008/0062255 A1 | 3/2008 | Gal |
| 2008/0067874 A1 | 3/2008 | Tseng |
| 2008/0074324 A1 | 3/2008 | Puzella et al. |
| 2008/0089277 A1 | 4/2008 | Alexander et al. |
| 2008/0110263 A1 | 5/2008 | Klessel et al. |
| 2008/0113816 A1 | 5/2008 | Mahaffey et al. |
| 2008/0122297 A1 | 5/2008 | Arai |
| 2008/0123383 A1 | 5/2008 | Shionoiri |
| 2008/0129536 A1 | 6/2008 | Randall et al. |
| 2008/0140278 A1 | 6/2008 | Breed |
| 2008/0169910 A1 | 7/2008 | Greene et al. |
| 2008/0197802 A1 | 8/2008 | Onishi |
| 2008/0204342 A1 | 8/2008 | Kharadly |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0233890 A1 | 9/2008 | Baker |
| 2008/0248758 A1 | 10/2008 | Schedelbeck et al. |
| 2008/0248846 A1 | 10/2008 | Stronach et al. |
| 2008/0258981 A1 | 10/2008 | Achour et al. |
| 2008/0258993 A1 | 10/2008 | Gummalla et al. |
| 2008/0266191 A1 | 10/2008 | Hilgers |
| 2008/0278378 A1 | 11/2008 | Chang et al. |
| 2008/0309452 A1 | 12/2008 | Zeine |
| 2009/0002493 A1 | 1/2009 | Kates |
| 2009/0010316 A1 | 1/2009 | Rofougaran et al. |
| 2009/0019183 A1 | 1/2009 | Wu et al. |
| 2009/0036065 A1 | 2/2009 | Siu |
| 2009/0039828 A1 | 2/2009 | Jakubowski |
| 2009/0047998 A1 | 2/2009 | Alberth, Jr. |
| 2009/0051324 A1 | 2/2009 | Nakatsuji |
| 2009/0058354 A1 | 3/2009 | Harrison |
| 2009/0058361 A1 | 3/2009 | John |
| 2009/0058731 A1 | 3/2009 | Geary et al. |
| 2009/0060012 A1 | 3/2009 | Gresset et al. |
| 2009/0067198 A1 | 3/2009 | Graham et al. |
| 2009/0067208 A1 | 3/2009 | Martin et al. |
| 2009/0073066 A1 | 3/2009 | Jordon et al. |
| 2009/0096412 A1 | 4/2009 | Huang |
| 2009/0096413 A1 | 4/2009 | Partovi |

(56) References Cited

U.S. PATENT DOCUMENTS

| | | |
|---|---|---|
| 2009/0102292 A1 | 4/2009 | Cook et al. |
| 2009/0102296 A1 | 4/2009 | Greene et al. |
| 2009/0108679 A1 | 4/2009 | Porwal |
| 2009/0122847 A1 | 5/2009 | Nysen et al. |
| 2009/0128262 A1 | 5/2009 | Lee et al. |
| 2009/0157911 A1 | 6/2009 | Aihara |
| 2009/0174604 A1 | 7/2009 | Keskitalo |
| 2009/0180653 A1 | 7/2009 | Sjursen et al. |
| 2009/0200985 A1 | 8/2009 | Zane et al. |
| 2009/0206791 A1 | 8/2009 | Jung |
| 2009/0207090 A1 | 8/2009 | Pettus et al. |
| 2009/0207092 A1 | 8/2009 | Nysen et al. |
| 2009/0218884 A1 | 9/2009 | Soar |
| 2009/0218891 A1 | 9/2009 | McCollough |
| 2009/0219903 A1 | 9/2009 | Alamouti et al. |
| 2009/0243397 A1 | 10/2009 | Cook et al. |
| 2009/0256752 A1 | 10/2009 | Akkermans et al. |
| 2009/0264069 A1 | 10/2009 | Yamasuge |
| 2009/0271048 A1 | 10/2009 | Wakamatsu |
| 2009/0280866 A1 | 11/2009 | Lo et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284220 A1 | 11/2009 | Toncich et al. |
| 2009/0284227 A1 | 11/2009 | Mohammadian et al. |
| 2009/0284325 A1 | 11/2009 | Rossiter et al. |
| 2009/0286475 A1 | 11/2009 | Toncich et al. |
| 2009/0286476 A1 | 11/2009 | Toncich et al. |
| 2009/0291634 A1 | 11/2009 | Saarisalo |
| 2009/0299175 A1 | 12/2009 | Bernstein et al. |
| 2009/0308936 A1 | 12/2009 | Nitzan et al. |
| 2009/0312046 A1 | 12/2009 | Clevenger et al. |
| 2009/0315412 A1 | 12/2009 | Yamamoto et al. |
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019686 A1 | 1/2010 | Gutierrez, Jr. |
| 2010/0019908 A1 | 1/2010 | Cho et al. |
| 2010/0026605 A1 | 2/2010 | Yang et al. |
| 2010/0027379 A1 | 2/2010 | Saulnier et al. |
| 2010/0029383 A1 | 2/2010 | Dai |
| 2010/0033021 A1 | 2/2010 | Bennett |
| 2010/0033390 A1 | 2/2010 | Alamouti et al. |
| 2010/0034238 A1 | 2/2010 | Bennett |
| 2010/0041453 A1 | 2/2010 | Grimm, Jr. |
| 2010/0044123 A1 | 2/2010 | Perlman et al. |
| 2010/0054200 A1 | 3/2010 | Tsai |
| 2010/0060534 A1 | 3/2010 | Oodachi |
| 2010/0066631 A1 | 3/2010 | Puzella et al. |
| 2010/0075607 A1 | 3/2010 | Hosoya |
| 2010/0079005 A1 | 4/2010 | Hyde et al. |
| 2010/0079011 A1 | 4/2010 | Hyde et al. |
| 2010/0082193 A1 | 4/2010 | Chiappetta |
| 2010/0087227 A1 | 4/2010 | Francos et al. |
| 2010/0090524 A1 | 4/2010 | Obayashi |
| 2010/0090656 A1 | 4/2010 | Shearer et al. |
| 2010/0109443 A1 | 5/2010 | Cook et al. |
| 2010/0117596 A1 | 5/2010 | Cook et al. |
| 2010/0117926 A1 | 5/2010 | DeJean, II |
| 2010/0119234 A1 | 5/2010 | Suematsu et al. |
| 2010/0123618 A1 | 5/2010 | Martin et al. |
| 2010/0123624 A1 | 5/2010 | Minear et al. |
| 2010/0124040 A1 | 5/2010 | Diebel et al. |
| 2010/0127660 A1 | 5/2010 | Cook et al. |
| 2010/0134105 A1 | 6/2010 | Zelinski et al. |
| 2010/0141214 A1 | 6/2010 | Yoon et al. |
| 2010/0142418 A1 | 6/2010 | Nishioka et al. |
| 2010/0142509 A1 | 6/2010 | Zhu et al. |
| 2010/0148723 A1 | 6/2010 | Cook et al. |
| 2010/0151808 A1 | 6/2010 | Toncich et al. |
| 2010/0156721 A1 | 6/2010 | Alamouti et al. |
| 2010/0156741 A1 | 6/2010 | Vazquez et al. |
| 2010/0164296 A1 | 7/2010 | Kurs et al. |
| 2010/0164433 A1 | 7/2010 | Janefalker et al. |
| 2010/0167664 A1 | 7/2010 | Szini |
| 2010/0171461 A1 | 7/2010 | Baarman et al. |
| 2010/0171676 A1 | 7/2010 | Tani et al. |
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0210233 A1 | 8/2010 | Cook et al. |
| 2010/0213895 A1 | 8/2010 | Keating et al. |
| 2010/0214177 A1 | 8/2010 | Parsche |
| 2010/0222010 A1 | 9/2010 | Ozaki et al. |
| 2010/0225270 A1 | 9/2010 | Jacobs et al. |
| 2010/0227570 A1 | 9/2010 | Hendin |
| 2010/0231470 A1 | 9/2010 | Lee et al. |
| 2010/0237709 A1 | 9/2010 | Hall et al. |
| 2010/0244576 A1 | 9/2010 | Hillan et al. |
| 2010/0253281 A1 | 10/2010 | Li |
| 2010/0256831 A1 | 10/2010 | Abramo et al. |
| 2010/0259110 A1 | 10/2010 | Kurs et al. |
| 2010/0259401 A1 | 10/2010 | Azancot et al. |
| 2010/0259447 A1 | 10/2010 | Crouch |
| 2010/0264747 A1 | 10/2010 | Hall et al. |
| 2010/0277003 A1 | 11/2010 | Von Novak et al. |
| 2010/0277120 A1 | 11/2010 | Cook et al. |
| 2010/0277121 A1 | 11/2010 | Hall et al. |
| 2010/0279606 A1 | 11/2010 | Hillan et al. |
| 2010/0289341 A1 | 11/2010 | Ozaki et al. |
| 2010/0295372 A1 | 11/2010 | Hyde et al. |
| 2010/0308767 A1 | 12/2010 | Rofougaran et al. |
| 2010/0309079 A1 | 12/2010 | Rofougaran et al. |
| 2010/0309088 A1 | 12/2010 | Hyvonen et al. |
| 2010/0315045 A1 | 12/2010 | Zeine |
| 2010/0316163 A1 | 12/2010 | Forenza et al. |
| 2010/0327766 A1 | 12/2010 | Recker et al. |
| 2010/0328044 A1 | 12/2010 | Waffenschmidt et al. |
| 2010/0332401 A1 | 12/2010 | Prahlad et al. |
| 2011/0009057 A1 | 1/2011 | Saunamaki |
| 2011/0013198 A1 | 1/2011 | Shirley |
| 2011/0018360 A1 | 1/2011 | Baarman et al. |
| 2011/0028114 A1 | 2/2011 | Kerselaers |
| 2011/0031928 A1 | 2/2011 | Soar |
| 2011/0032149 A1 | 2/2011 | Leabman |
| 2011/0032866 A1 | 2/2011 | Leabman |
| 2011/0034190 A1 | 2/2011 | Leabman |
| 2011/0034191 A1 | 2/2011 | Leabman |
| 2011/0043047 A1 | 2/2011 | Karalis et al. |
| 2011/0043163 A1 | 2/2011 | Baarman et al. |
| 2011/0043327 A1 | 2/2011 | Baarman et al. |
| 2011/0050166 A1 | 3/2011 | Cook et al. |
| 2011/0055037 A1 | 3/2011 | Hayashigawa et al. |
| 2011/0056215 A1 | 3/2011 | Ham |
| 2011/0057607 A1 | 3/2011 | Carobolante |
| 2011/0057853 A1 | 3/2011 | Kim et al. |
| 2011/0062788 A1 | 3/2011 | Chen et al. |
| 2011/0074342 A1 | 3/2011 | MacLaughlin |
| 2011/0074346 A1 | 3/2011 | Hall et al. |
| 2011/0074349 A1 | 3/2011 | Ghovanloo |
| 2011/0074620 A1 | 3/2011 | Wintermantel |
| 2011/0078092 A1 | 3/2011 | Kim et al. |
| 2011/0090126 A1 | 4/2011 | Szini et al. |
| 2011/0109167 A1 | 5/2011 | Park et al. |
| 2011/0114401 A1 | 5/2011 | Kanno |
| 2011/0115303 A1 | 5/2011 | Baarman et al. |
| 2011/0115432 A1 | 5/2011 | El-Maleh |
| 2011/0115605 A1 | 5/2011 | Dimig et al. |
| 2011/0121660 A1 | 5/2011 | Azancot et al. |
| 2011/0122018 A1 | 5/2011 | Tamg et al. |
| 2011/0122026 A1 | 5/2011 | DeLaquil et al. |
| 2011/0127845 A1 | 6/2011 | Walley et al. |
| 2011/0127952 A1 | 6/2011 | Walley et al. |
| 2011/0133655 A1 | 6/2011 | Recker et al. |
| 2011/0133691 A1 | 6/2011 | Hautanen |
| 2011/0148578 A1 | 6/2011 | Aloi et al. |
| 2011/0148595 A1 | 6/2011 | Miller et al. |

(56) References Cited

U.S. PATENT DOCUMENTS

| | | |
|---|---|---|
| 2011/0151789 A1 | 6/2011 | Viglione et al. |
| 2011/0152670 A1 | 6/2011 | Yang |
| 2011/0154429 A1 | 6/2011 | Stantchev |
| 2011/0156493 A1 | 6/2011 | Bennett |
| 2011/0156494 A1 | 6/2011 | Mashinsky |
| 2011/0156640 A1 | 6/2011 | Moshfeghi |
| 2011/0163128 A1 | 7/2011 | Taguchi et al. |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0188207 A1 | 8/2011 | Won et al. |
| 2011/0193688 A1 | 8/2011 | Forsell |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0215086 A1 | 9/2011 | Yeh |
| 2011/0217923 A1 | 9/2011 | Ma |
| 2011/0220634 A1 | 9/2011 | Yeh |
| 2011/0221389 A1 | 9/2011 | Won et al. |
| 2011/0222154 A1 | 9/2011 | Choi et al. |
| 2011/0222272 A1 | 9/2011 | Yeh |
| 2011/0227725 A1 | 9/2011 | Muirhead |
| 2011/0228436 A1 | 9/2011 | Lee et al. |
| 2011/0243040 A1 | 10/2011 | Khan et al. |
| 2011/0243050 A1 | 10/2011 | Yanover |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto |
| 2011/0254377 A1 | 10/2011 | Widmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |
| 2011/0304216 A1 | 12/2011 | Baarman |
| 2011/0304437 A1 | 12/2011 | Beeler |
| 2011/0304521 A1 | 12/2011 | Ando et al. |
| 2012/0001644 A1 | 1/2012 | Baarman et al. |
| 2012/0007441 A1 | 1/2012 | John |
| 2012/0013196 A1 | 1/2012 | Kim et al. |
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0025622 A1 | 2/2012 | Kim et al. |
| 2012/0043887 A1 | 2/2012 | Mesibov |
| 2012/0051109 A1 | 3/2012 | Kim et al. |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0068906 A1 | 3/2012 | Asher et al. |
| 2012/0074891 A1 | 3/2012 | Anderson et al. |
| 2012/0075072 A1 | 3/2012 | Pappu |
| 2012/0080944 A1 | 4/2012 | Recker et al. |
| 2012/0080957 A1 | 4/2012 | Cooper et al. |
| 2012/0086284 A1 | 4/2012 | Capanella et al. |
| 2012/0086615 A1 | 4/2012 | Norair |
| 2012/0095617 A1 | 4/2012 | Martin et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |
| 2012/0103562 A1 | 5/2012 | Clayton |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr. |
| 2012/0132647 A1 | 5/2012 | Beverly et al. |
| 2012/0133214 A1 | 5/2012 | Yun et al. |
| 2012/0142291 A1 | 6/2012 | Rath et al. |
| 2012/0143383 A1 | 6/2012 | Cooperrider et al. |
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0149307 A1 | 6/2012 | Terada et al. |
| 2012/0150670 A1 | 6/2012 | Taylor et al. |
| 2012/0153740 A1 | 6/2012 | Soar |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0169276 A1 | 7/2012 | Wang |
| 2012/0169278 A1 | 7/2012 | Choi |
| 2012/0173418 A1 | 7/2012 | Beardsmore et al. |
| 2012/0179004 A1 | 7/2012 | Roesicke et al. |
| 2012/0181973 A1 | 7/2012 | Lyden |
| 2012/0182427 A1 | 7/2012 | Marshall |
| 2012/0188142 A1 | 7/2012 | Shashi et al. |
| 2012/0187851 A1 | 8/2012 | Huggins et al. |
| 2012/0193999 A1 | 8/2012 | Zeine |
| 2012/0200399 A1 | 8/2012 | Chae |
| 2012/0201153 A1 | 8/2012 | Bharadia et al. |
| 2012/0201173 A1 | 8/2012 | Jian et al. |
| 2012/0206299 A1 | 8/2012 | Valdes-Garcia |
| 2012/0211214 A1 | 8/2012 | Phan |
| 2012/0212071 A1 | 8/2012 | Miyabayashi et al. |
| 2012/0212072 A1 | 8/2012 | Miyabayashi et al. |
| 2012/0214462 A1 | 8/2012 | Chu et al. |
| 2012/0214536 A1 | 8/2012 | Kim et al. |
| 2012/0228392 A1 | 9/2012 | Cameron et al. |
| 2012/0228956 A1 | 9/2012 | Kamata |
| 2012/0231856 A1 | 9/2012 | Lee et al. |
| 2012/0235636 A1 | 9/2012 | Partovi |
| 2012/0242283 A1 | 9/2012 | Kim et al. |
| 2012/0242809 A1 | 9/2012 | White et al. |
| 2012/0248886 A1 | 10/2012 | Kesler et al. |
| 2012/0248888 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0265272 A1 | 10/2012 | Judkins |
| 2012/0267900 A1 | 10/2012 | Huffman et al. |
| 2012/0268238 A1 | 10/2012 | Park et al. |
| 2012/0270592 A1 | 10/2012 | Ngai |
| 2012/0274154 A1 | 11/2012 | DeLuca |
| 2012/0280650 A1 | 11/2012 | Kim et al. |
| 2012/0286582 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0294054 A1 | 11/2012 | Kim et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306284 A1 | 12/2012 | Lee et al. |
| 2012/0306433 A1 | 12/2012 | Kim et al. |
| 2012/0306572 A1 | 12/2012 | Hietala et al. |
| 2012/0306705 A1 | 12/2012 | Sakurai et al. |
| 2012/0306707 A1 | 12/2012 | Yang et al. |
| 2012/0306720 A1 | 12/2012 | Tanmi et al. |
| 2012/0307873 A1 | 12/2012 | Kim et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0313446 A1 | 12/2012 | Park et al. |
| 2012/0313449 A1 | 12/2012 | Kurs |
| 2012/0313835 A1 | 12/2012 | Gebretnsae |
| 2012/0326660 A1 | 12/2012 | Lu et al. |
| 2013/0002550 A1 | 1/2013 | Zalewski |
| 2013/0005252 A1 | 1/2013 | Lee et al. |
| 2013/0018439 A1 | 1/2013 | Chow et al. |

(56) References Cited

U.S. PATENT DOCUMENTS

| | | |
|---|---|---|
| 2013/0024059 A1 | 1/2013 | Miller et al. |
| 2013/0026981 A1 | 1/2013 | Van Der Lee |
| 2013/0026982 A1 | 1/2013 | Rothenbaum |
| 2013/0032589 A1 | 2/2013 | Chung |
| 2013/0033571 A1 | 2/2013 | Steen |
| 2013/0038124 A1 | 2/2013 | Newdoll et al. |
| 2013/0038402 A1 | 2/2013 | Karalis et al. |
| 2013/0043738 A1 | 2/2013 | Park et al. |
| 2013/0044035 A1 | 2/2013 | Zhuang |
| 2013/0049471 A1 | 2/2013 | Oleynik |
| 2013/0049475 A1 | 2/2013 | Kim et al. |
| 2013/0049484 A1 | 2/2013 | Weissentern et al. |
| 2013/0057078 A1 | 3/2013 | Lee |
| 2013/0057205 A1 | 3/2013 | Lee et al. |
| 2013/0057210 A1 | 3/2013 | Negaard et al. |
| 2013/0057364 A1 | 3/2013 | Kesler et al. |
| 2013/0058379 A1 | 3/2013 | Kim et al. |
| 2013/0062959 A1 | 3/2013 | Lee et al. |
| 2013/0063082 A1 | 3/2013 | Lee et al. |
| 2013/0063143 A1 | 3/2013 | Adalsteinsson et al. |
| 2013/0063266 A1 | 3/2013 | Yunker et al. |
| 2013/0063550 A1 | 3/2013 | Ritchey et al. |
| 2013/0069444 A1 | 3/2013 | Waffenschmidt et al. |
| 2013/0076308 A1 | 3/2013 | Niskala et al. |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119778 A1 | 5/2013 | Jung |
| 2013/0119929 A1 | 5/2013 | Partovi |
| 2013/0120052 A1 | 5/2013 | Siska |
| 2013/0120205 A1 | 5/2013 | Thomson et al. |
| 2013/0120206 A1 | 5/2013 | Biancotto et al. |
| 2013/0120217 A1 | 5/2013 | Ueda et al. |
| 2013/0130621 A1 | 5/2013 | Kim et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0162335 A1 | 6/2013 | Kim et al. |
| 2013/0169061 A1 | 7/2013 | Microshnichenko et al. |
| 2013/0169219 A1 | 7/2013 | Gray |
| 2013/0169348 A1 | 7/2013 | Shi |
| 2013/0171939 A1 | 7/2013 | Tian et al. |
| 2013/0175877 A1 | 7/2013 | Abe et al. |
| 2013/0178253 A1 | 7/2013 | Karaoguz |
| 2013/0181881 A1 | 7/2013 | Christie et al. |
| 2013/0187475 A1 | 7/2013 | Vendik |
| 2013/0190031 A1 | 7/2013 | Persson et al. |
| 2013/0193769 A1 | 8/2013 | Mehta et al. |
| 2013/0197320 A1 | 8/2013 | Albert et al. |
| 2013/0200064 A1 | 8/2013 | Alexander |
| 2013/0201316 A1 | 8/2013 | Binder et al. |
| 2013/0207477 A1 | 8/2013 | Nam et al. |
| 2013/0207604 A1 | 8/2013 | Zeine |
| 2013/0207879 A1 | 8/2013 | Rada et al. |
| 2013/0210357 A1 | 8/2013 | Qin et al. |
| 2013/0221757 A1 | 8/2013 | Cho et al. |
| 2013/0222201 A1 | 8/2013 | Ma et al. |
| 2013/0223538 A1 | 8/2013 | Wang et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |
| 2013/0249479 A1 | 9/2013 | Partovi |
| 2013/0249682 A1 | 9/2013 | Van Wiemeersch et al. |
| 2013/0250102 A1 | 9/2013 | Scanlon et al. |
| 2013/0254578 A1 | 9/2013 | Huang et al. |
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278076 A1 | 10/2013 | Proud |
| 2013/0278209 A1 | 10/2013 | Von Novak |
| 2013/0285464 A1 | 10/2013 | Miwa |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0288617 A1 | 10/2013 | Kim et al. |
| 2013/0293423 A1 | 11/2013 | Moshfeghi |
| 2013/0300356 A1 | 11/2013 | Yang |
| 2013/0307751 A1 | 11/2013 | Yu-Juin et al. |
| 2013/0310020 A1 | 11/2013 | Kazuhiro |
| 2013/0311798 A1 | 11/2013 | Sultenfuss |
| 2013/0328417 A1 | 12/2013 | Takeuchi |
| 2013/0334883 A1 | 12/2013 | Kim et al. |
| 2013/0339108 A1 | 12/2013 | Ryder et al. |
| 2013/0343208 A1 | 12/2013 | Sexton et al. |
| 2013/0343251 A1 | 12/2013 | Zhang |
| 2013/0343585 A1 | 12/2013 | Bennett et al. |
| 2014/0001608 A1 | 1/2014 | McPartlin |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0002012 A1 | 1/2014 | McCauley et al. |
| 2014/0006017 A1 | 1/2014 | Sen |
| 2014/0008992 A1 | 1/2014 | Leabman |
| 2014/0008993 A1 | 1/2014 | Leabman |
| 2014/0009108 A1 | 1/2014 | Leabman |
| 2014/0009110 A1 | 1/2014 | Lee |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yu et al. |
| 2014/0021908 A1 | 1/2014 | McCool |
| 2014/0024325 A1 | 1/2014 | Lun et al. |
| 2014/0035524 A1 | 2/2014 | Zeine |
| 2014/0035526 A1 | 2/2014 | Tripathi et al. |
| 2014/0035786 A1 | 2/2014 | Ley |
| 2014/0043248 A1 | 2/2014 | Yeh |
| 2014/0049422 A1 | 2/2014 | Von Novak et al. |
| 2014/0054971 A1 | 2/2014 | Kissin |
| 2014/0055098 A1 | 2/2014 | Lee et al. |
| 2014/0057618 A1 | 2/2014 | Zirwas et al. |
| 2014/0062395 A1 | 3/2014 | Kwon et al. |
| 2014/0082435 A1 | 3/2014 | Kitgawa |
| 2014/0086125 A1 | 3/2014 | Polo et al. |
| 2014/0086592 A1 | 3/2014 | Nakahara et al. |
| 2014/0091756 A1 | 4/2014 | Ofstein et al. |
| 2014/0091968 A1 | 4/2014 | Harel et al. |
| 2014/0091974 A1 | 4/2014 | Desclos et al. |
| 2014/0103869 A1 | 4/2014 | Radovic |
| 2014/0104157 A1 | 4/2014 | Burns |
| 2014/0111147 A1 | 4/2014 | Soar |
| 2014/0111153 A1 | 4/2014 | Kwon et al. |
| 2014/0111156 A1 | 4/2014 | Lee et al. |
| 2014/0113689 A1 | 4/2014 | Lee |
| 2014/0117946 A1 | 5/2014 | Muller et al. |
| 2014/0118140 A1 | 5/2014 | Amis |
| 2014/0125275 A1 | 5/2014 | Low et al. |
| 2014/0128107 A1 | 5/2014 | An |
| 2014/0132210 A1 | 5/2014 | Partovi |
| 2014/0133279 A1 | 5/2014 | Khuri-Yakub |
| 2014/0139034 A1 | 5/2014 | Sankar et al. |
| 2014/0139039 A1 | 5/2014 | Cook et al. |
| 2014/0139180 A1 | 5/2014 | Kim et al. |

(56) References Cited

U.S. PATENT DOCUMENTS

| | | |
|---|---|---|
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |
| 2014/0145884 A1 | 5/2014 | Dang et al. |
| 2014/0152117 A1 | 6/2014 | Sanker |
| 2014/0152251 A1 | 6/2014 | Kim et al. |
| 2014/0159646 A1 | 6/2014 | Sankar et al. |
| 2014/0159651 A1 | 6/2014 | Von Novak et al. |
| 2014/0159652 A1 | 6/2014 | Hall et al. |
| 2014/0159662 A1 | 6/2014 | Furui |
| 2014/0159667 A1 | 6/2014 | Kim et al. |
| 2014/0169385 A1 | 6/2014 | Hadani et al. |
| 2014/0175876 A1 | 6/2014 | Cheatham, III et al. |
| 2014/0175893 A1 | 6/2014 | Sengupta et al. |
| 2014/0176054 A1 | 6/2014 | Porat et al. |
| 2014/0176061 A1 | 6/2014 | Cheatham, III et al. |
| 2014/0176082 A1 | 6/2014 | Visser |
| 2014/0177399 A1 | 6/2014 | Teng et al. |
| 2014/0183964 A1 | 7/2014 | Walley |
| 2014/0184148 A1 | 7/2014 | Van Der Lee et al. |
| 2014/0184155 A1 | 7/2014 | Cha |
| 2014/0184163 A1 | 7/2014 | Das et al. |
| 2014/0184170 A1 | 7/2014 | Jeong |
| 2014/0191568 A1 | 7/2014 | Partovi |
| 2014/0191818 A1 | 7/2014 | Waffenschmidt et al. |
| 2014/0194092 A1 | 7/2014 | Wanstedt et al. |
| 2014/0194095 A1 | 7/2014 | Wanstedt et al. |
| 2014/0197691 A1 | 7/2014 | Wang |
| 2014/0203629 A1 | 7/2014 | Hoffman et al. |
| 2014/0206384 A1 | 7/2014 | Kim et al. |
| 2014/0210281 A1 | 7/2014 | Ito et al. |
| 2014/0217955 A1 | 8/2014 | Lin |
| 2014/0217967 A1 | 8/2014 | Zeine et al. |
| 2014/0225805 A1 | 8/2014 | Pan et al. |
| 2014/0232320 A1 | 8/2014 | Ento July et al. |
| 2014/0232610 A1 | 8/2014 | Shigemoto et al. |
| 2014/0239733 A1 | 8/2014 | Mach et al. |
| 2014/0241231 A1 | 8/2014 | Zeine |
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |
| 2014/0252869 A1 | 9/2014 | Kamiura et al. |
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0266946 A1 | 9/2014 | Bily et al. |
| 2014/0273819 A1 | 9/2014 | Nadakuduti et al. |
| 2014/0273892 A1 | 9/2014 | Nourbakhsh |
| 2014/0281655 A1 | 9/2014 | Angle et al. |
| 2014/0292090 A1 | 10/2014 | Cordeiro et al. |
| 2014/0292269 A1 | 10/2014 | Keating et al. |
| 2014/0292451 A1 | 10/2014 | Zimmerman |
| 2014/0300452 A1 | 10/2014 | Rofe et al. |
| 2014/0312706 A1 | 10/2014 | Fiorello et al. |
| 2014/0312833 A1 | 10/2014 | Won et al. |
| 2014/0325218 A1 | 10/2014 | Shimizu et al. |
| 2014/0327320 A1 | 11/2014 | Muhs et al. |
| 2014/0327390 A1 | 11/2014 | Park et al. |
| 2014/0333142 A1 | 11/2014 | Desrosiers |
| 2014/0346860 A1 | 11/2014 | Aubry et al. |
| 2014/0354063 A1 | 12/2014 | Leabman et al. |
| 2014/0354221 A1 | 12/2014 | Leabman et al. |
| 2014/0355718 A1 | 12/2014 | Guan et al. |
| 2014/0357309 A1 | 12/2014 | Leabman et al. |
| 2014/0368048 A1 | 12/2014 | Leabman et al. |
| 2014/0368161 A1 | 12/2014 | Leabman et al. |
| 2014/0368405 A1 | 12/2014 | Ek et al. |
| 2014/0370929 A1 | 12/2014 | Khawand et al. |
| 2014/0375139 A1 | 12/2014 | Tsukamoto |
| 2014/0375253 A1 | 12/2014 | Leabman et al. |
| 2014/0375255 A1 | 12/2014 | Leabman et al. |
| 2014/0375258 A1 | 12/2014 | Arkhipenkov |
| 2014/0375261 A1 | 12/2014 | Manova-Elssibony et al. |
| 2014/0376646 A1 | 12/2014 | Leabman et al. |
| 2015/0001949 A1 | 1/2015 | Leabman et al. |
| 2015/0002086 A1 | 1/2015 | Matos et al. |
| 2015/0003207 A1 | 1/2015 | Lee et al. |
| 2015/0008980 A1 | 1/2015 | Kim et al. |
| 2015/0011160 A1 | 1/2015 | Uurgovan et al. |
| 2015/0015180 A1 | 1/2015 | Miller et al. |
| 2015/0015182 A1 | 1/2015 | Brandtman et al. |
| 2015/0015192 A1 | 1/2015 | Leabman et al. |
| 2015/0015194 A1 | 1/2015 | Leabman et al. |
| 2015/0015195 A1 | 1/2015 | Leabman et al. |
| 2015/0021990 A1 | 1/2015 | Myer et al. |
| 2015/0022008 A1 | 1/2015 | Leabman et al. |
| 2015/0022009 A1 | 1/2015 | Leabman et al. |
| 2015/0022010 A1 | 1/2015 | Leabman et al. |
| 2015/0022194 A1 | 1/2015 | Almalki et al. |
| 2015/0023204 A1 | 1/2015 | Wil et al. |
| 2015/0028688 A1 | 1/2015 | Masaoka |
| 2015/0028694 A1 | 1/2015 | Leabman et al. |
| 2015/0028697 A1 | 1/2015 | Leabman et al. |
| 2015/0028875 A1 | 1/2015 | Irie et al. |
| 2015/0029397 A1 | 1/2015 | Leabman et al. |
| 2015/0035378 A1 | 2/2015 | Calhoun et al. |
| 2015/0035709 A1 | 2/2015 | Lim |
| 2015/0035715 A1 | 2/2015 | Kim et al. |
| 2015/0039482 A1 | 2/2015 | Fuinaga |
| 2015/0041459 A1 | 2/2015 | Leabman et al. |
| 2015/0042264 A1 | 2/2015 | Leabman et al. |
| 2015/0042265 A1 | 2/2015 | Leabman et al. |
| 2015/0042287 A1 | 2/2015 | Liu et al. |
| 2015/0044977 A1 | 2/2015 | Ramasamy et al. |
| 2015/0046526 A1 | 2/2015 | Bush et al. |
| 2015/0061404 A1 | 3/2015 | Lamenza et al. |
| 2015/0076917 A1 | 3/2015 | Leabman et al. |
| 2015/0076927 A1 | 3/2015 | Leabman et al. |
| 2015/0077036 A1 | 3/2015 | Leabman et al. |
| 2015/0077037 A1 | 3/2015 | Leabman et al. |
| 2015/0091520 A1 | 4/2015 | Blum et al. |
| 2015/0091706 A1 | 4/2015 | Chemishkian et al. |
| 2015/0097442 A1 | 4/2015 | Muurinen |
| 2015/0097663 A1 | 4/2015 | Sloo et al. |
| 2015/0102681 A1 | 4/2015 | Leabman et al. |
| 2015/0102764 A1 | 4/2015 | Leabman et al. |
| 2015/0102769 A1 | 4/2015 | Leabman et al. |
| 2015/0102942 A1 | 4/2015 | Houser et al. |
| 2015/0102973 A1 | 4/2015 | Hand et al. |
| 2015/0108848 A1 | 4/2015 | Joehren |
| 2015/0109181 A1 | 4/2015 | Hyde et al. |
| 2015/0115877 A1 | 4/2015 | Aria et al. |
| 2015/0115878 A1 | 4/2015 | Park |
| 2015/0116153 A1 | 4/2015 | Chen et al. |
| 2015/0123483 A1 | 5/2015 | Leabman et al. |
| 2015/0123496 A1 | 5/2015 | Leabman et al. |
| 2015/0128733 A1 | 5/2015 | Taylor et al. |
| 2015/0130285 A1 | 5/2015 | Leabman et al. |
| 2015/0130293 A1 | 5/2015 | Hajimiri et al. |
| 2015/0137612 A1 | 5/2015 | Yamakawa et al. |
| 2015/0148664 A1 | 5/2015 | Stolka et al. |
| 2015/0155737 A1 | 6/2015 | Mayo |
| 2015/0155738 A1 | 6/2015 | Leabman et al. |
| 2015/0162662 A1 | 6/2015 | Chen et al. |
| 2015/0162751 A1 | 6/2015 | Leabman et al. |
| 2015/0162779 A1 | 6/2015 | Lee et al. |
| 2015/0171512 A1 | 6/2015 | Chen et al. |
| 2015/0171513 A1 | 6/2015 | Chen et al. |
| 2015/0171516 A1 | 6/2015 | Chen et al. |
| 2015/0171656 A1 | 6/2015 | Leabman et al. |
| 2015/0171658 A1 | 6/2015 | Manova-Elssibony et al. |
| 2015/0171931 A1 | 6/2015 | Won et al. |
| 2015/0177326 A1 | 6/2015 | Chakraborty et al. |
| 2015/0180133 A1 | 6/2015 | Hunt |
| 2015/0180249 A1 | 6/2015 | Jeon et al. |
| 2015/0180284 A1 | 6/2015 | Kang et al. |
| 2015/0181117 A1 | 6/2015 | Park et al. |
| 2015/0187491 A1 | 7/2015 | Yanagawa |
| 2015/0188352 A1 | 7/2015 | Peek et al. |
| 2015/0199665 A1 | 7/2015 | Chu |

(56) References Cited

U.S. PATENT DOCUMENTS

| | | |
|---|---|---|
| 2015/0201385 A1 | 7/2015 | Mercer et al. |
| 2015/0207333 A1 | 7/2015 | Baarman et al. |
| 2015/0207542 A1 | 7/2015 | Zeine |
| 2015/0222126 A1 | 8/2015 | Leabman et al. |
| 2015/0233987 A1 | 8/2015 | Von Novak, III et al. |
| 2015/0234144 A1 | 8/2015 | Cameron et al. |
| 2015/0236520 A1 | 8/2015 | Baarman |
| 2015/0236877 A1 | 8/2015 | Peng et al. |
| 2015/0244070 A1 | 8/2015 | Cheng et al. |
| 2015/0244080 A1 | 8/2015 | Gregoire |
| 2015/0244187 A1 | 8/2015 | Horie |
| 2015/0244201 A1 | 8/2015 | Chu |
| 2015/0244341 A1 | 8/2015 | Ritter et al. |
| 2015/0249484 A1 | 9/2015 | Mach et al. |
| 2015/0255989 A1 | 9/2015 | Walley et al. |
| 2015/0256097 A1 | 9/2015 | Gudan et al. |
| 2015/0260835 A1 | 9/2015 | Widmer et al. |
| 2015/0262465 A1 | 9/2015 | Pritchett |
| 2015/0263534 A1 | 9/2015 | Lee et al. |
| 2015/0263548 A1 | 9/2015 | Cooper |
| 2015/0270618 A1 | 9/2015 | Zhu et al. |
| 2015/0270622 A1 | 9/2015 | Takasaki et al. |
| 2015/0270741 A1 | 9/2015 | Leabman et al. |
| 2015/0278558 A1 | 10/2015 | Priev et al. |
| 2015/0280429 A1 | 10/2015 | Makita et al. |
| 2015/0280484 A1 | 10/2015 | Radziemski et al. |
| 2015/0288074 A1 | 10/2015 | Harper et al. |
| 2015/0288214 A1 | 10/2015 | Borngraber |
| 2015/0288438 A1 | 10/2015 | Maltsev et al. |
| 2015/0306063 A1 | 10/2015 | McGinnis et al. |
| 2015/0311585 A1 | 10/2015 | Church et al. |
| 2015/0312721 A1 | 10/2015 | Singh |
| 2015/0318729 A1 | 11/2015 | Leabman |
| 2015/0326024 A1 | 11/2015 | Bell et al. |
| 2015/0326025 A1 | 11/2015 | Bell et al. |
| 2015/0326051 A1 | 11/2015 | Bell et al. |
| 2015/0326063 A1 | 11/2015 | Leabman et al. |
| 2015/0326068 A1 | 11/2015 | Bell et al. |
| 2015/0326069 A1 | 11/2015 | Petras et al. |
| 2015/0326070 A1 | 11/2015 | Petras et al. |
| 2015/0326071 A1 | 11/2015 | Contopanagos |
| 2015/0326072 A1 | 11/2015 | Petras et al. |
| 2015/0326142 A1 | 11/2015 | Petras et al. |
| 2015/0326143 A1 | 11/2015 | Petras et al. |
| 2015/0327085 A1 | 11/2015 | Hadani |
| 2015/0333528 A1 | 11/2015 | Leabman |
| 2015/0333529 A1 | 11/2015 | Leabman |
| 2015/0333573 A1 | 11/2015 | Leabman |
| 2015/0333800 A1 | 11/2015 | Perry et al. |
| 2015/0339497 A1 | 11/2015 | Kurian |
| 2015/0340759 A1 | 11/2015 | Bridgelall et al. |
| 2015/0340903 A1 | 11/2015 | Bell et al. |
| 2015/0340909 A1 | 11/2015 | Bell et al. |
| 2015/0340910 A1 | 11/2015 | Petras et al. |
| 2015/0340911 A1 | 11/2015 | Bell et al. |
| 2015/0341087 A1 | 11/2015 | Moore et al. |
| 2015/0349574 A1 | 12/2015 | Leabman |
| 2015/0356482 A1 | 12/2015 | Whipple et al. |
| 2015/0358222 A1 | 12/2015 | Berger et al. |
| 2015/0365003 A1 | 12/2015 | Sadwick |
| 2015/0365137 A1 | 12/2015 | Miller et al. |
| 2015/0365138 A1 | 12/2015 | Miller et al. |
| 2016/0001136 A1 | 1/2016 | King et al. |
| 2016/0005068 A1 | 1/2016 | Im et al. |
| 2016/0012695 A1 | 1/2016 | Bell et al. |
| 2016/0013560 A1 | 1/2016 | Daniels |
| 2016/0013656 A1 | 1/2016 | Bell et al. |
| 2016/0013661 A1 | 1/2016 | Kurs et al. |
| 2016/0013677 A1 | 1/2016 | Bell et al. |
| 2016/0013678 A1 | 1/2016 | Bell et al. |
| 2016/0013855 A1 | 1/2016 | Campos |
| 2016/0020636 A1 | 1/2016 | Khlat |
| 2016/0020647 A1 | 1/2016 | Leabman et al. |
| 2016/0020649 A1 | 1/2016 | Bell et al. |
| 2016/0020830 A1 | 1/2016 | Bell et al. |
| 2016/0028403 A1 | 1/2016 | McCaughan et al. |
| 2016/0033254 A1 | 2/2016 | Zeine et al. |
| 2016/0042206 A1 | 2/2016 | Pesavento et al. |
| 2016/0043562 A1 | 2/2016 | Lisi et al. |
| 2016/0043571 A1 | 2/2016 | Kesler et al. |
| 2016/0043572 A1 | 2/2016 | Cooper et al. |
| 2016/0054395 A1 | 2/2016 | Bell et al. |
| 2016/0054396 A1 | 2/2016 | Bell et al. |
| 2016/0054440 A1 | 2/2016 | Younis |
| 2016/0056635 A1 | 2/2016 | Bell |
| 2016/0056640 A1 | 2/2016 | Mao |
| 2016/0056664 A1 | 2/2016 | Partovi |
| 2016/0056669 A1 | 2/2016 | Bell |
| 2016/0056966 A1 | 2/2016 | Bell |
| 2016/0064959 A1 | 3/2016 | Jung et al. |
| 2016/0065005 A1 | 3/2016 | Won et al. |
| 2016/0079799 A1 | 3/2016 | Khlat |
| 2016/0087483 A1 | 3/2016 | Hietala et al. |
| 2016/0087486 A1 | 3/2016 | Pogorelik et al. |
| 2016/0087687 A1 | 3/2016 | Kesler et al. |
| 2016/0094091 A1 | 3/2016 | Shin et al. |
| 2016/0094092 A1 | 3/2016 | Davlantes et al. |
| 2016/0099601 A1 | 4/2016 | Leabman et al. |
| 2016/0099602 A1 | 4/2016 | Leabman et al. |
| 2016/0099609 A1 | 4/2016 | Leabman et al. |
| 2016/0099610 A1 | 4/2016 | Leabman et al. |
| 2016/0099611 A1 | 4/2016 | Leabman et al. |
| 2016/0099612 A1 | 4/2016 | Leabman et al. |
| 2016/0099613 A1 | 4/2016 | Leabman et al. |
| 2016/0099614 A1 | 4/2016 | Leabman et al. |
| 2016/0099755 A1 | 4/2016 | Leabman et al. |
| 2016/0099756 A1 | 4/2016 | Leabman et al. |
| 2016/0099757 A1 | 4/2016 | Leabman et al. |
| 2016/0099758 A1 | 4/2016 | Leabman et al. |
| 2016/0100124 A1 | 4/2016 | Leabman et al. |
| 2016/0100312 A1 | 4/2016 | Bell et al. |
| 2016/0112787 A1 | 4/2016 | Rich |
| 2016/0126749 A1 | 5/2016 | Shichino et al. |
| 2016/0126752 A1 | 5/2016 | Vuori et al. |
| 2016/0126776 A1 | 5/2016 | Kim et al. |
| 2016/0141908 A1 | 5/2016 | Jaki et al. |
| 2016/0164563 A1 | 6/2016 | Khawand et al. |
| 2016/0172890 A1 | 6/2016 | Jeong |
| 2016/0174162 A1 | 6/2016 | Nadakuduti et al. |
| 2016/0181849 A1 | 6/2016 | Govindaraj |
| 2016/0181854 A1 | 6/2016 | Leabman |
| 2016/0181867 A1 | 6/2016 | Daniel et al. |
| 2016/0181873 A1 | 6/2016 | Mitcheson et al. |
| 2016/0191121 A1 | 6/2016 | Bell |
| 2016/0197522 A1 | 7/2016 | Zeine et al. |
| 2016/0202343 A1 | 7/2016 | Okutsu |
| 2016/0204622 A1 | 7/2016 | Leabman |
| 2016/0204642 A1 | 7/2016 | Oh |
| 2016/0211704 A1* | 7/2016 | Uchida ............... H01F 38/14 |
| 2016/0218545 A1 | 7/2016 | Schroeder et al. |
| 2016/0233582 A1 | 8/2016 | Piskun |
| 2016/0238365 A1 | 8/2016 | Wixey et al. |
| 2016/0240908 A1 | 8/2016 | Strong |
| 2016/0248276 A1 | 8/2016 | Hong et al. |
| 2016/0294225 A1 | 10/2016 | Blum et al. |
| 2016/0299210 A1 | 10/2016 | Zeine |
| 2016/0301240 A1 | 10/2016 | Zeine |
| 2016/0322833 A1 | 11/2016 | Moshfeghi et al. |
| 2016/0322868 A1 | 11/2016 | Akuzawa et al. |
| 2016/0323000 A1 | 11/2016 | Liu et al. |
| 2016/0325680 A1 | 11/2016 | Curtis et al. |
| 2016/0336804 A1 | 11/2016 | Son et al. |
| 2016/0339258 A1 | 11/2016 | Perryman et al. |
| 2016/0344098 A1 | 11/2016 | Ming |
| 2016/0359367 A1 | 12/2016 | Rothschild |
| 2016/0368510 A1 | 12/2016 | Simon et al. |
| 2016/0380464 A1 | 12/2016 | Chin et al. |
| 2016/0380466 A1 | 12/2016 | Yang et al. |
| 2017/0005481 A1 | 1/2017 | Von Novak, III |
| 2017/0005516 A9 | 1/2017 | Leabman et al. |
| 2017/0005524 A1 | 1/2017 | Akuzawa et al. |
| 2017/0005530 A1 | 1/2017 | Zeine et al. |
| 2017/0012448 A1 | 1/2017 | Miller et al. |
| 2017/0025887 A1 | 1/2017 | Hyun et al. |

(56) References Cited

U.S. PATENT DOCUMENTS

| | | |
|---|---|---|
| 2017/0025903 A1 | 1/2017 | Song et al. |
| 2017/0026087 A1 | 1/2017 | Tanabe |
| 2017/0033611 A1 | 2/2017 | Shin et al. |
| 2017/0040700 A1 | 2/2017 | Leung |
| 2017/0043675 A1 | 2/2017 | Jones et al. |
| 2017/0047784 A1 | 2/2017 | Jung et al. |
| 2017/0187225 A1 | 2/2017 | Hosseini |
| 2017/0063168 A1 | 3/2017 | Uchida |
| 2017/0077733 A1 | 3/2017 | Jeong et al. |
| 2017/0077735 A1 | 3/2017 | Leabman |
| 2017/0077736 A1 | 3/2017 | Leabman |
| 2017/0077764 A1 | 3/2017 | Bell et al. |
| 2017/0077765 A1 | 3/2017 | Bell et al. |
| 2017/0077979 A1 | 3/2017 | Papa et al. |
| 2017/0077995 A1 | 3/2017 | Leabman |
| 2017/0085112 A1 | 3/2017 | Leabman et al. |
| 2017/0085120 A1 | 3/2017 | Leabman et al. |
| 2017/0085127 A1 | 3/2017 | Leabman |
| 2017/0085437 A1 | 3/2017 | Condeixa et al. |
| 2017/0092115 A1 | 3/2017 | Sloo et al. |
| 2017/0093229 A1 | 3/2017 | Sindia et al. |
| 2017/0104263 A1 | 4/2017 | Hosseini |
| 2017/0110886 A1 | 4/2017 | Reynolds et al. |
| 2017/0110887 A1 | 4/2017 | Bell et al. |
| 2017/0110888 A1 | 4/2017 | Leabman |
| 2017/0110889 A1 | 4/2017 | Bell |
| 2017/0110910 A1 | 4/2017 | Zeine et al. |
| 2017/0110914 A1 | 4/2017 | Bell |
| 2017/0117756 A1 | 4/2017 | Muratov |
| 2017/0118714 A1 | 4/2017 | Kaechi |
| 2017/0127196 A1 | 5/2017 | Blum et al. |
| 2017/0134686 A9 | 5/2017 | Leabman |
| 2017/0141582 A1 | 5/2017 | Adolf et al. |
| 2017/0141583 A1 | 5/2017 | Adolf et al. |
| 2017/0141622 A1 | 5/2017 | Meichle |
| 2017/0163076 A1 | 6/2017 | Park et al. |
| 2017/0168595 A1 | 6/2017 | Sakaguchi et al. |
| 2017/0179763 A9 | 6/2017 | Leabman |
| 2017/0179771 A1 | 6/2017 | Leabman |
| 2017/0187198 A1 | 6/2017 | Leabman |
| 2017/0187222 A1 | 6/2017 | Hosseini |
| 2017/0187223 A1 | 6/2017 | Hosseini |
| 2017/0187224 A1 | 6/2017 | Hosseini |
| 2017/0187228 A1 | 6/2017 | Hosseini |
| 2017/0187247 A1 | 6/2017 | Leabman |
| 2017/0187248 A1 | 6/2017 | Leabman |
| 2017/0187422 A1 | 6/2017 | Hosseini |
| 2017/0214422 A1 | 7/2017 | Na et al. |
| 2017/0274787 A1 | 9/2017 | Salter et al. |
| 2017/0285207 A1 | 10/2017 | Shao et al. |
| 2017/0331331 A1 | 11/2017 | Zeine et al. |
| 2017/0338695 A1 | 11/2017 | Port |
| 2017/0346349 A1 | 11/2017 | Shimokawa |
| 2018/0006611 A1 | 1/2018 | de Jong et al. |
| 2018/0012082 A1 | 1/2018 | Satazoda et al. |
| 2018/0040929 A1 | 2/2018 | Chappelle |
| 2018/0048178 A1 | 2/2018 | Leabman |
| 2018/0090992 A1 | 3/2018 | Shrivastava et al. |
| 2018/0123400 A1 | 5/2018 | Leabman |
| 2018/0131238 A1 | 5/2018 | Leabman |
| 2018/0131449 A1 | 5/2018 | Kare et al. |
| 2018/0159338 A1 | 6/2018 | Leabman et al. |
| 2018/0159355 A1 | 6/2018 | Leabman |
| 2018/0166924 A1 | 6/2018 | Hosseini |
| 2018/0166925 A1 | 6/2018 | Hosseini |
| 2018/0183494 A1 | 6/2018 | Leabman |
| 2018/0198199 A1 | 7/2018 | Hosseini |
| 2018/0205232 A1 | 7/2018 | Leabman et al. |
| 2018/0205265 A1 | 7/2018 | Park et al. |
| 2018/0212454 A1 | 7/2018 | Leabman |
| 2018/0212474 A1 | 7/2018 | Hosseini |
| 2018/0212523 A1 | 7/2018 | Leabman |
| 2018/0226839 A1* | 8/2018 | Higaki .................. H02J 50/23 |
| 2018/0226840 A1 | 8/2018 | Leabman |
| 2018/0227018 A1 | 8/2018 | Moshfeghi |
| 2018/0241255 A1 | 8/2018 | Leabman |
| 2018/0248409 A1 | 8/2018 | Johnston |
| 2018/0254639 A1 | 9/2018 | Bell |
| 2018/0262014 A1 | 9/2018 | Bell |
| 2018/0262040 A1 | 9/2018 | Contopanagos |
| 2018/0262050 A1 | 9/2018 | Witz |
| 2018/0262060 A1 | 9/2018 | Johnston |
| 2018/0269570 A1 | 9/2018 | Hosseini |
| 2018/0287431 A1 | 10/2018 | Liu et al. |
| 2018/0301934 A1 | 10/2018 | Prabhala et al. |
| 2018/0309314 A1 | 10/2018 | White et al. |
| 2018/0331429 A1 | 11/2018 | Komaros |
| 2018/0331581 A1 | 11/2018 | Hosseini |
| 2018/0337534 A1 | 11/2018 | Bell et al. |
| 2018/0343040 A1 | 11/2018 | Luzinski et al. |
| 2018/0375340 A1 | 12/2018 | Bell et al. |
| 2018/0375368 A1 | 12/2018 | Leabman et al. |
| 2018/0376235 A1 | 12/2018 | Leabman |
| 2019/0052115 A1 | 2/2019 | Hosseini |
| 2019/0052979 A1 | 2/2019 | Chen et al. |
| 2019/0074133 A1 | 3/2019 | Contopanagos |
| 2019/0074722 A1 | 3/2019 | Shahsavari et al. |
| 2019/0074728 A1 | 3/2019 | Leabman |
| 2019/0074730 A1 | 3/2019 | Shahsavari et al. |
| 2019/0074862 A1 | 3/2019 | Wang et al. |
| 2019/0089203 A1 | 3/2019 | Leabman |
| 2019/0130215 A1 | 5/2019 | Kaestle et al. |
| 2019/0131827 A1 | 5/2019 | Johnston |
| 2019/0148950 A1* | 5/2019 | Zeine .................. H02J 5/005 307/104 |
| 2019/0173323 A1 | 6/2019 | Hosseini |
| 2019/0207570 A1 | 7/2019 | Govindaraj |
| 2019/0222070 A1 | 7/2019 | Leabman |
| 2019/0229397 A1 | 7/2019 | Rizzo et al. |
| 2019/0245389 A1 | 8/2019 | Johnston et al. |
| 2019/0288567 A1 | 9/2019 | Leabman et al. |
| 2019/0296586 A1 | 9/2019 | Moshfeghi |
| 2019/0326782 A1 | 10/2019 | Graham et al. |
| 2019/0363588 A1 | 11/2019 | Daetwyler et al. |
| 2019/0372384 A1 | 12/2019 | Hosseini et al. |
| 2019/0386522 A1 | 12/2019 | Park et al. |
| 2019/0393729 A1 | 12/2019 | Contopanagos et al. |
| 2019/0393928 A1 | 12/2019 | Leabman |
| 2020/0006988 A1 | 1/2020 | Leabman |
| 2020/0021128 A1 | 1/2020 | Bell et al. |
| 2020/0044488 A1 | 2/2020 | Johnston et al. |
| 2020/0091608 A1 | 3/2020 | Alpman et al. |
| 2020/0112204 A1 | 4/2020 | Hosseini et al. |
| 2020/0119592 A1 | 4/2020 | Hosseini |
| 2020/0144846 A1 | 5/2020 | Shin |
| 2020/0153117 A1 | 5/2020 | Papio-Toda et al. |
| 2020/0202145 A1 | 6/2020 | Mao et al. |
| 2020/0203837 A1 | 6/2020 | Komaros et al. |
| 2020/0225673 A1 | 7/2020 | Ebrahimi Afrouzi et al. |
| 2020/0235614 A1 | 7/2020 | Swan et al. |
| 2020/0244102 A1 | 7/2020 | Leabman et al. |
| 2020/0244104 A1 | 7/2020 | Katajamaki et al. |
| 2020/0244111 A1 | 7/2020 | Johnston et al. |
| 2020/0252141 A1 | 8/2020 | Sarajedini |
| 2020/0274397 A1 | 8/2020 | Hwang et al. |
| 2020/0313464 A1 | 10/2020 | Leabman |
| 2020/0403452 A1 | 12/2020 | Leabman |
| 2021/0091602 A1 | 3/2021 | Woo |
| 2021/0091606 A1 | 3/2021 | Johnston et al. |
| 2021/0104919 A1 | 4/2021 | Leabman |
| 2021/0152922 A1 | 5/2021 | Leabman et al. |
| 2021/0184503 A1 | 6/2021 | Leabman |
| 2021/0184509 A1 | 6/2021 | Muryanto et al. |

FOREIGN PATENT DOCUMENTS

| | | |
|---|---|---|
| CN | 101465471 A | 6/2009 |
| CN | 101496222 A | 7/2009 |
| CN | 201278367 Y | 7/2009 |
| CN | 101507044 A | 8/2009 |
| CN | 101630357 A | 1/2010 |
| CN | 101699709 A | 4/2010 |
| CN | 102004442 A | 4/2011 |
| CN | 102027690 A | 4/2011 |

(56) References Cited

FOREIGN PATENT DOCUMENTS

| | | |
|---|---|---|
| CN | 102089952 A | 6/2011 |
| CN | 102227884 A | 10/2011 |
| CN | 102292896 A | 12/2011 |
| CN | 102474109 A | 5/2012 |
| CN | 202333847 U | 7/2012 |
| CN | 102860037 A | 1/2013 |
| CN | 103151848 A | 6/2013 |
| CN | 103155353 A | 6/2013 |
| CN | 103296767 A | 9/2013 |
| CN | 103348563 A | 10/2013 |
| CN | 103594776 A | 2/2014 |
| CN | 103683443 A | 3/2014 |
| CN | 104040789 A | 9/2014 |
| CN | 203826555 U | 9/2014 |
| CN | 104090265 A | 10/2014 |
| CN | 104113814 A | 10/2014 |
| CN | 104167773 A | 11/2014 |
| CN | 104347915 A | 2/2015 |
| CN | 104584449 A | 4/2015 |
| CN | 104617680 A | 5/2015 |
| CN | 104659927 A | 5/2015 |
| CN | 105207373 A | 12/2015 |
| CN | 105491472 A | 4/2016 |
| CN | 105762946 A | 7/2016 |
| CN | 105765821 A | 7/2016 |
| CN | 105932407 A | 9/2016 |
| CN | 106329116 A | 1/2017 |
| CN | 103380561 B | 9/2017 |
| CN | 107465273 A | 12/2017 |
| DE | 20016655 U1 | 2/2002 |
| DE | 102013216953 A1 | 2/2015 |
| DE | 102014219679 A1 | 3/2016 |
| EP | 1028482 A2 | 8/2000 |
| EP | 1081506 A1 | 3/2001 |
| EP | 2346136 A1 | 7/2011 |
| EP | 2397973 A1 | 2/2012 |
| EP | 2545635 A2 | 1/2013 |
| EP | 2747195 A1 | 6/2014 |
| EP | 3067983 A1 | 9/2016 |
| EP | 3118970 A1 | 1/2017 |
| EP | 3145052 A1 | 3/2017 |
| GB | 2404497 A | 2/2005 |
| GB | 2556620 A | 6/2018 |
| JP | H 06327172 A | 11/1994 |
| JP | 2000323916 A | 11/2000 |
| JP | 2002209343 A | 7/2002 |
| JP | 2002319816 A | 10/2002 |
| JP | 2006157586 A | 6/2006 |
| JP | 2007043432 A | 2/2007 |
| JP | 2007135335 A | 5/2007 |
| JP | 2008092704 A | 4/2008 |
| JP | 2008167017 A | 7/2008 |
| JP | 2008295176 A | 12/2008 |
| JP | 2009071835 A | 4/2009 |
| JP | 2009525715 A | 7/2009 |
| JP | 2009201328 A | 9/2009 |
| JP | 2009290764 A | 12/2009 |
| JP | 2011083078 A | 4/2011 |
| JP | 2011514781 A | 5/2011 |
| JP | 2012016171 A | 1/2012 |
| JP | 2012023950 A | 2/2012 |
| JP | 2012095226 A | 5/2012 |
| JP | 2012157167 A | 8/2012 |
| JP | 2013099249 A | 5/2013 |
| JP | 2013162624 A | 8/2013 |
| JP | 2014501080 A | 1/2014 |
| JP | 2014075927 A | 4/2014 |
| JP | 2014112063 A | 6/2014 |
| JP | 2014176125 A | 9/2014 |
| JP | 2014176131 A | 9/2014 |
| JP | 2014223018 A | 11/2014 |
| JP | 2015027345 A | 2/2015 |
| JP | 2015128349 A | 7/2015 |
| JP | 2015128370 A | 7/2015 |
| JP | 2015139276 A | 7/2015 |
| JP | 2017034935 A | 2/2017 |
| JP | WO2015177859 A1 | 4/2017 |
| KR | 20060061776 A | 6/2006 |
| KR | 20070044302 A | 4/2007 |
| KR | 100755144 B1 | 9/2007 |
| KR | 20110132059 A | 12/2011 |
| KR | 20110135540 A | 12/2011 |
| KR | 20120009843 A | 2/2012 |
| KR | 20120108759 A | 10/2012 |
| KR | 20130026977 A | 3/2013 |
| KR | 20140023409 A | 2/2014 |
| KR | 20140023410 A | 3/2014 |
| KR | 20140025410 A | 3/2014 |
| KR | 20140085200 A | 7/2014 |
| KR | 20140148270 A | 12/2014 |
| KR | 20150077678 A | 7/2015 |
| KR | 20160018826 A | 2/2016 |
| KR | 20160087671 A | 7/2016 |
| KR | 20170050971 A | 5/2017 |
| KR | 20180108317 A | 10/2018 |
| KR | 20190009237 A | 1/2019 |
| RU | 2658332 C1 | 6/2018 |
| WO | WO 199508125 A1 | 3/1995 |
| WO | WO 199831070 A1 | 7/1998 |
| WO | WO 199952173 A1 | 10/1999 |
| WO | WO 2000111716 A1 | 2/2001 |
| WO | WO 2003091943 A1 | 11/2003 |
| WO | WO 2004077550 A1 | 9/2004 |
| WO | WO 2006122783 A2 | 11/2006 |
| WO | WO 2007070571 A2 | 6/2007 |
| WO | WO 2008024993 A2 | 2/2008 |
| WO | WO 2008156571 A2 | 12/2008 |
| WO | WO 2010022181 A1 | 2/2010 |
| WO | WO 2010039246 A1 | 4/2010 |
| WO | WO 2010116441 A1 | 10/2010 |
| WO | WO 2010138994 A1 | 12/2010 |
| WO | WO 2011112022 A2 | 9/2011 |
| WO | WO 2012153529 A1 | 11/2012 |
| WO | WO 2012177283 A1 | 12/2012 |
| WO | WO 2013031988 A1 | 3/2013 |
| WO | WO 2013035190 A1 | 3/2013 |
| WO | WO 2013038074 A2 | 3/2013 |
| WO | WO 2013042399 A1 | 3/2013 |
| WO | WO 2013052950 A1 | 4/2013 |
| WO | WO 2013088238 A2 | 6/2013 |
| WO | WO 2013105920 A2 | 7/2013 |
| WO | WO 2013175596 A1 | 11/2013 |
| WO | WO 2014068992 A1 | 5/2014 |
| WO | WO 2014075103 A1 | 5/2014 |
| WO | WO 2014113093 A1 | 7/2014 |
| WO | WO 2014132258 A1 | 9/2014 |
| WO | WO 2014134996 A1 | 9/2014 |
| WO | WO 2014156465 A1 | 10/2014 |
| WO | WO 2014171348 A1 | 10/2014 |
| WO | WO 2014182788 A2 | 11/2014 |
| WO | WO 2014182788 A3 | 11/2014 |
| WO | WO 2014197472 A1 | 12/2014 |
| WO | WO 2014209587 A1 | 12/2014 |
| WO | WO 2015038773 A1 | 3/2015 |
| WO | WO 2015097809 A1 | 7/2015 |
| WO | WO 2015130902 A1 | 9/2015 |
| WO | WO 2015161323 A1 | 10/2015 |
| WO | WO 2016024869 A1 | 2/2016 |
| WO | WO 2016048512 A1 | 3/2016 |
| WO | WO 2016088261 A1 | 6/2016 |
| WO | WO 2016187357 A1 | 11/2016 |
| WO | WO 2018203176 A1 | 11/2018 |
| WO | WO 2018208130 A1 | 11/2018 |
| WO | WO 2019012372 A1 | 1/2019 |

OTHER PUBLICATIONS

Energous Corp., IPRP, PCT/US2014/037109, Apr. 12, 2016, 9 pgs.
Energous Corp., IPRP, PCT/US2014/037170, Nov. 10, 2015, 8 pgs.
Energous Corp., IPRP, PCT/US2014/040648, Dec. 8, 2015, 8 pgs.
Energous Corp., IPRP, PCT/US2014/040697, Dec. 8, 2015, 9 pgs.
Energous Corp., IPRP, PCT/US2014/040705, Dec. 8, 2015, 6 pgs.
Energous Corp., IPRP, PCT/US2014/041323, Dec. 22, 2015, 8 pgs.

(56) References Cited

OTHER PUBLICATIONS

Energous Corp., IPRP, PCT/US2014/041342, Dec. 15, 2015, 8 pgs.
Energous Corp., IPRP, PCT/US2014/041534, Dec. 29, 2015, 7 pgs.
Energous Corp., IPRP, PCT/US2014/041546, Dec. 29, 2015, 9 pgs.
Energous Corp., IPRP, PCT/US2014/041558, Dec. 29, 2015, 6 pgs.
Energous Corp., IPRP, PCT/US2014/044810, Jan. 5, 2016, 10 pgs.
Energous Corp., IPRP, PCT/US2014/045102, Jan. 12, 2016, 11 pgs.
Energous Corp., IPRP, PCT/US2014/045119, Jan. 12, 2016, 9 pgs.
Energous Corp., IPRP, PCT/US2014/045237, Jan. 12, 2016, 12 pgs.
Energous Corp., IPRP, PCT/US2014/046941, Jan. 19, 2016, 9 pgs.
Energous Corp., IPRP, PCT/US2014/046956, Jan. 19, 2016, 7 pgs.
Energous Corp., IPRP, PCT/US2014/046961, Jan. 19, 2016, 8 pgs.
Energous Corp., IPRP, PCT/US2014/047963, Jan. 26, 2016, 10 pgs.
Energous Corp., IPRP, PCT/US2014/048002, Feb. 12, 2015 8 pgs.
Energous Corp., IPRP, PCT/US2014/049666, Feb. 9, 2016, 5 pgs.
Energous Corp., IPRP, PCT/US2014/049669, Feb. 9, 2016, 8 pgs.
Energous Corp., IPRP, PCT/US2014/049673, Feb. 9, 2016, 6 pgs.
Energous Corp., IPRP, PCT/US2014/054891, Mar. 15, 2016, 10 pgs.
Energous Corp., IPRP, PCT/US2014/054897, Mar. 15, 2016, 8 pgs.
Energous Corp., IPRP, PCT/US2014/054953, Mar. 22, 2016, 5 pgs.
Energous Corp., IPRP, PCT/US2014/055195, Mar. 22, 2016, 9 pgs.
Energous Corp., IPRP, PCT/US2014/059317, Apr. 12, 2016, 10 pgs.
Energous Corp., IPRP, PCT/US2014/059340, Apr. 12, 2016, 11 pgs.
Energous Corp., IPRP, PCT/US2014/059871, Apr. 12, 2016, 9 pgs.
Energous Corp., IPRP, PCT/US2014/062661, May 3, 2016, 10 pgs.
Energous Corp., IPRP, PCT/US2014/062672, May 10, 2016, 8 pgs.
Energous Corp., IPRP, PCT/US2014/062682, May 3, 2016, 8 pgs.
Energous Corp., IPRP, PCT/US2014/068282, Jun. 7, 2016, 10 pgs.
Energous Corp., IPRP, PCT/US2014/068568, Jun. 14, 2016, 8 pgs.
Energous Corp., IPRP, PCT/US2014/068586, Jun. 14, 2016, 8 pgs.
Energous Corp., IPRP, PCT/US2015/067242, Jun. 27, 2017, 7 pgs.
Energous Corp., IPRP, PCT/US2015/067243, Jun. 27, 2017, 7 pgs.
Energous Corp., IPRP, PCT/US2015/067245, Jun. 27, 2017, 7 pgs.
Energous Corp., IPRP, PCT/US2015/067246, Jun. 27, 2017, 9 pgs.
Energous Corp., IPRP, PCT/US2015/067249, Jun. 27, 2017, 7 pgs.
Energous Corp., IPRP, PCT/US2015/067250, Mar. 30, 2016, 10 pgs.
Energous Corp., IPRP, PCT/US2015/067271, Jul. 4, 2017, 5 pgs.
Energous Corp., IPRP, PCT/US2015/067275, Jul. 4, 2017, 7 pgs.
Energous Corp., IPRP, PCT/US2015/067279, Jul. 4, 2017, 7 pgs.
Energous Corp., IPRP, PCT/US2015/067282, Jul. 4, 2017, 6 pgs.
Energous Corp., IPRP, PCT/US2015/067287, Jul. 4, 2017, 6 pgs.
Energous Corp., IPRP, PCT/US2015/067291, Jul. 4, 2017, 4 pgs.
Energous Corp., IPRP, PCT/US2015/067294, Jul. 4, 2017, 6 pgs.
Energous Corp., IPRP, PCT/US2015/067325, Jul. 4, 2017, 8 pgs.
Energous Corp., IPRP, PCT/US2015/067334, Jul. 4, 2017, 5 pgs.
Energous Corp., IPRP, PCT/US2016/068495, Jun. 26, 2018, 7 pgs.
Energous Corp., IPRP, PCT/US2016/068498, Jun. 26, 2018, 6 pgs.
Energous Corp., IPRP, PCT/US2016/068504, Jun. 26, 2018, 5 pgs.
Energous Corp., IPRP, PCT/US2016/068551, Jun. 26, 2018, 6 pgs.
Energous Corp., IPRP, PCT/US2016/068565, Jun. 26, 2018, 9 pgs.
Energous Corp., IPRP, PCT/US2016/068987, Jul. 3, 2018, 7 pgs.
Energous Corp., IPRP, PCT/US2016/068993, Jul. 3, 2018, 10 pgs.
Energous Corp., IPRP, PCT/US2016/069313, Jul. 3, 2018, 7 pgs.
Energous Corp., IPRP, PCT/US2016/069316, Jul. 3, 2018, 12 pgs.
Energous Corp., IPRP, PCT/US2017/046800, Feb. 12, 2019, 10 pgs.
Energous Corp., IPRP, PCT/US2017/065886, Jun. 18, 2019, 10 pgs.
Energous Corp., IPRP, PCT/US2018/012806, Jul. 9, 2019, 6 pgs.
Energous Corp., IPRP, PCT/US2018/025465, Oct. 1, 2019, 8 pgs.
Energous Corp., IPRP, PCT/US2018/031768, Nov. 12, 2019, 8 pgs.
Energous Corp., IPRP, PCT/US2018/031786, Apr. 14, 2020, 7 pgs.
Energous Corp., IPRP, PCT/US2018/039334, Dec. 24, 2019, 8 pgs.
Energous Corp., IPRP, PCT/US2018/051082, Mar. 17, 2020, 9 pgs.
Energous Corp., IPRP, PCT/US2018/058178, May 5, 2020, 7 pgs.
Energous Corp., IPRP, PCT/US2018/064289, Dec. 29, 2020, 8 pgs.
Energous Corp., IPRP, PCT/US2019/015820, Aug. 4, 2020, 7 pgs.
Energous Corp., IPRP, PCT/US2019/021817, Sep. 15, 2020, 7 pgs.
Energous Corp., IPRP, PCT/US2019/039014, Dec. 29, 2020, 10 pgs.
Energous Corp., IPRP, PCT/US2019/061445, May 18, 2021, 14 pgs.
Energous Corp., IPRP, PCT/US2020/015450, Jul. 27, 2021, 6 pgs.
Energous Corp., IPRP, PCT/US2020/016975, Aug. 10, 2021, 13 pgs.
Energous Corp., ISRWO, PCT/US2014/037072, Sep. 12, 2014, 8 pgs.
Energous Corp., ISRWO, PCT/US2014/037109, Apr. 8, 2016, 12 pgs.
Energous Corp., ISRWO, PCT/US2014/037170, Sep. 15, 2014, 11 pgs.
Energous Corp., ISRWO, PCT/US2014/040648, Oct. 10, 2014, 11 pgs.
Energous Corp., ISRWO, PCT/US2014/040697, Oct. 1, 2014, 12 pgs.
Energous Corp., ISRWO, PCT/US2014/040705, Sep. 23, 2014, 8 pgs.
Energous Corp., ISRWO, PCT/US2014/041323, Oct. 1, 2014, 10 pgs.
Energous Corp., ISRWO, PCT/US2014/041342, Jan. 27, 2015, 10 pgs.
Energous Corp., ISRWO, PCT/US2014/041534, Oct. 13, 2014, 10 pgs.
Energous Corp., ISRWO, PCT/US2014/041546, Oct. 16, 2014, 12 pgs.
Energous Corp., ISRWO, PCT/US2014/041558, Oct. 10, 2014, 8 pgs.
Energous Corp., ISRWO, PCT/US2014/044810 Oct. 21 2014, 12 pgs.
Energous Corp., ISRWO, PCT/US2014/045102, Oct. 28, 2014, 14 pgs.
Energous Corp., ISRWO, PCT/US2014/045119, Oct. 13, 2014, 11 pgs.
Energous Corp., ISRWO, PCT/US2014/045237, Oct. 13, 2014, 16 pgs.
Energous Corp., ISRWO, PCT/US2014/046941, Nov. 6, 2014, 11 pgs.
Energous Corp., ISRWO, PCT/US2014/046956, Nov. 12, 2014, 10 pgs.
Energous Corp., ISRWO, PCT/US2014/046961, Nov. 24, 2014, 16 pgs.
Energous Corp., ISRWO, PCT/US2014/047963, Nov. 7, 2014, 13 pgs.
Energous Corp., ISRWO, PCT/US2014/048002, Nov. 13, 2014, 11 pgs.
Energous Corp., ISRWO, PCT/US2014/049666, Nov. 10, 2014, 7 pgs.
Energous Corp., ISRWO, PCT/US2014/049669, Nov. 13, 2014, 10 pgs.
Energous Corp., ISRWO, PCT/US2014/049673, Nov. 18, 2014, 10 pgs.
Energous Corp., ISRWO, PCT/US2014/054891, Dec. 18, 2014, 12 pgs.
Energous Corp., ISRWO, PCT/US2014/054897, Feb. 17, 2015, 10 pgs.
Energous Corp., ISRWO, PCT/US2014/054953, Dec. 4, 2014, 7 pgs.
Energous Corp., ISRWO, PCT/US2014/055195, Dec. 22, 2014, 11 pgs.
Energous Corp., ISRWO, PCT/US2014/059317, Feb. 24, 2015, 13 pgs.
Energous Corp., ISRWO, PCT/US2014/059340, Jan. 15, 2015, 13 pgs.
Energous Corp., ISRWO, PCT/US2014/059871, Jan. 23, 2015, 12 pgs.
Energous Corp., ISRWO, PCT/US2014/062661, Jan. 27, 2015, 12 pgs.
Energous Corp., ISRWO, PCT/US2014/062672, Jan. 26, 2015, 11 pgs.
Energous Corp., ISRWO, PCT/US2014/062682, Feb. 12, 2015, 10 pgs.
Energous Corp., ISRWO, PCT/US2014/068282, Mar. 19, 2015, 13 pgs.

(56) References Cited

OTHER PUBLICATIONS

Energous Corp., ISRWO, PCT/US2014/068568, Mar. 20, 2015, 10 pgs.
Energous Corp., ISRWO, PCT/US2014/068586, Mar. 20, 2015, 11 pgs.
Energous Corp., ISRWO, PCT/US2015/067242, Mar. 16, 2016, 9 pgs.
Energous Corp., ISRWO, PCT/US2015/067243, Mar. 10, 2016, 11 pgs.
Energous Corp., ISRWO, PCT/US2015/067245, Mar. 17, 2016, 8 pgs.
Energous Corp., ISRWO, PCT/US2015/067246, May 11, 2016, 18 pgs.
Energous Corp., ISRWO, PCT/US2015/067249, Mar. 29, 2016, 8 pgs.
Energous Corp., ISRWO, PCT/US2015/067250, Mar. 30, 2016, 11 pgs.
Energous Corp., ISRWO, PCT/US2015/067271, Mar. 11, 2016, 6 pgs.
Energous Corp., ISRWO, PCT/US2015/067275, Mar. 3, 2016, 8 pgs.
Energous Corp., ISRWO, PCT/US2015/067279, Mar. 11, 2015, 13 pgs.
Energous Corp., ISRWO, PCT/US2015/067282, Jul. 5, 2016, 7 pgs.
Energous Corp., ISRWO, PCT/US2015/067287, Feb. 2, 2016, 8 pgs.
Energous Corp., ISRWO, PCT/US2015/067291, Mar. 4, 2016, 10 pgs.
Energous Corp., ISRWO, PCT/US2015/067294, Mar. 29, 2016, 7 pgs.
Energous Corp., ISRWO, PCT/US2015/067325, Mar. 10, 2016, 9 pgs.
Energous Corp., ISRWO, PCT/US2015/067334, Mar. 3, 2016, 6 pgs.
Energous Corp., ISRWO, PCT/US2016/068495, Mar. 30, 2017, 9 pgs.
Energous Corp., ISRWO, PCT/US2016/068498, May 17, 2017, 8 pgs.
Energous Corp., ISRWO, PCT/US2016/068504, Mar. 30, 2017, 8 pgs.
Energous Corp., ISRWO, PCT/US2016/068551, Mar. 17, 2017, 8 pgs.
Energous Corp., ISRWO, PCT/US2016/068565, Mar. 8, 2017, 11 pgs.
Energous Corp., ISRWO, PCT/US2016/068987, May 8, 2017, 10 pgs.
Energous Corp., ISRWO, PCT/US2016/068993, Mar. 13, 2017, 12 pgs.
Energous Corp., ISRWO, PCT/US2016/069313, Nov. 13, 2017, 10 pgs.
Energous Corp., ISRWO, PCT/US2016/069316, Mar. 16, 2017, 15 pgs.
Energous Corp., ISRWO, PCT/US2017/046800, Sep. 11, 2017, 13 pgs.
Energous Corp., ISRWO, PCT/US2017/065886, Apr. 6, 2018, 13 pgs.
Energous Corp., ISRWO, PCT/US2018/012806, Mar. 23, 2018, 9 pgs.
Energous Corp., ISRWO, PCT/US2018/025465, Jun. 22, 2018, 9 pgs.
Energous Corp., ISRWO, PCT/US2018/031768, Jul. 3, 2018, 9 pgs.
Energous Corp., ISRWO, PCT/US2018/031786, Aug. 8, 2018, 9 pgs.
Energous Corp., ISRWO, PCT/US2018/039334, Sep. 11, 2018, 9 pgs.
Energous Corp., ISRWO, PCT/US2018/051082, Dec. 12, 2018, 9 pgs.
Energous Corp., ISRWO, PCT/US2018/058178, Mar. 13, 2019, 10 pgs.
Energous Corp., ISRWO, PCT/US2018/064289, Apr. 25, 2019, 12 pgs.
Energous Corp., ISRWO, PCT/US2019/015820, May 14, 2019, 9 pgs.
Energous Corp., ISRWO, PCT/US2019/021817, Apr. 6, 2019, 11 pgs.
Energous Corp., ISRWO, PCT/US2019/039014, Oct. 4, 2019, 15 pgs.
Energous Corp., ISRWO, PCT/US2019/061445, Jan. 7, 2020, 19 pgs.
Energous Corp., ISRWO, PCT/US2020/015450, May 18, 2020, 8 pgs.
Energous Corp., ISRWO, PCT/US2020/016975, May 15, 2020, 15 pgs.
Energous Corp., ISRWO, PCT/US2020/027409, Jul. 24, 2020, 11 pgs.
Energous Corp., ISRWO, PCT/US2020/051692, Jan. 6, 2021, 9 pgs.
Energous Corp., ISRWO, PCT/US2020/051693, Jan. 7, 2021, 18 pgs.
Energous Corp., ISRWO, PCT/US2020/011694, Jan. 6, 2021, 11 pgs.
Energous Corp., ISRWO, PCT/US2020/051695, Jan. 82021, 14 pgs.
Energous Corp., ISRWO, PCT/US2020/064592, Mar. 24, 2021, 10 pgs.
Energous Corp., ISRWO, PCT/US2020/067566, Apr. 27, 2021, 12 pgs.
Notice of Intent to Issue Reexam Cettificate: U.S. Appl. No. 90/013793 Feb. 2, 2017, 8 pgs.
Order Grantin Reexamination Reuest, U.S. Appl. No. 90/013,793 Aug. 31, 2016, 23 pgs.
*Ossia Inc.* vs *Energous Corp.*, Declaration of Stephen B. Heppe in Support of Petition for Post-Grant Review of U.S. Pat. No. 9,124,125, PGR2016-00023, May 31, 2016, 144 pgs.
*Ossia Inc.* vs *Energous Corp.*, Declaration of Stephen B. Heppe in Support of Petition for Post-Grant Review of U.S. Pat. No. 9,124,125, PGR2016-00024, May 31, 2016, 122 pgs.
*Ossia Inc.* vs *Energous Corp.*, Patent Owner Preliminagy Response, Sep. 8, 2016, 95 pgs.
*Ossia Inc.* vs *Energous Corp.*, Petition for Post Grant Review of U.S. Pat. No. 9,124,125, May 31, 2016, 86 pgs.
*Ossia Inc.* vs *Energous Corp.*, Petition for Post-Grant Review of U.S. Pat. No. 9,124,125, May 31, 2016, 92 pgs.
*Ossia Inc.* vs *Energous Corp.*, PGR2016-00023—Institution Decision, Nov. 29, 2016, 29 pgs.
*Ossia Inc.* vs *Energous Corp.*, PGR2016-00024—Institution Decision, Nov. 29, 2016, 50 pgs.
*Ossia Inc.* vs *Energous Corp.*, PGR2016-00024—Judgement-Adverse, Jan. 20, 2017, 3 pgs.
Extended European Search Report, EP14818136.5, dated Jul. 21, 2016, 9 pgs.
Extended European Search Report, EP14822971.9, dated Feb. 10, 2017, 10 pgs.
Extended European Search Report, EP14868901.1, dated Jul. 17, 2017, 6 pgs.
Extended European Search Report, EP15874273.4, dated May 11, 2018, 7 pgs.
Extended European Search Report, EP15876033.0, dated Jun. 13, 2018, 10 pgs.
Extended European Search Report, EP15876036.3, dated May 3, 2018, 9 pgs.
Extended European Search Report, EP15876043.9, dated Aug. 9, 2018, 9 pgs.
Extended European Search Report, EP16189052.0, dated Feb. 10, 2017, 13 pgs.
Extended European Search Report, EP16189300.3, dated Mar. 24, 2017, 6 pgs.
Extended European Search Report, EP16189319.3, dated Feb. 10, 2017, 11 pgs.
Extended European Search Report, EP16189974.5, dated Mar. 13, 2017, 7 pgs.
Extended European Search Report, EP16189982.8, dated Feb. 7, 2017, 11 pgs.

(56) References Cited

OTHER PUBLICATIONS

Extended European Search Report, EP16189987.7, dated Feb. 9, 2017, 10 pgs.
Extended European Search Report, EP16189988.5, dated Mar. 13, 2017, 6 pgs.
Extended European Search Report, EP16193743.8, dated Feb. 8, 2017, 9 pgs.
Extended European Search Report, EP16196205.5, dated Apr. 7, 2017, 9 pgs.
Extended European Search Report, EP16880139.7, dated Jul. 12, 2019, 5 pgs.
Extended European Search Report, EP16880153.8, dated Jul. 2, 2019, 9 pgs.
Extended European Search Report, EP16880158.7, dated Jul. 15, 2019, 8 pgs.
Extended European Search Report, EP16882597.4, dated Aug. 7, 2019, 9 pgs.
Extended European Search Report, EP16882696.4, dated Jul. 3, 2019, 10 pgs.
Extended European Search Report, EP17840412.5, dated Jul. 15, 2019, 8 pgs.
Extended European Search Report, EP17882087.4, dated Sep. 17, 2019, 10 pgs.
Extended European Search Report, EP18204043.6, dated Feb. 14, 2019, 5 pgs.
Extended European Search Report, EP18797695.6, dated Nov. 19, 2020, 9 pgs.
Extended European Search Report, EP18820206.3, dated May 17, 2021, 6 pgs.
Extended European Search Report, EP19214719.7, dated Jan. 17, 2020, 9 pgs.
Extended European Search Report, EP21159553.3, dated May 31, 2021, 8 pgs.
Extended European Search Report, EP21161278.3, dated Jun. 28, 2021, 10 pgs.
Adamiuk et al. "Compact, Dual-Polarized UWB-Antanna, Embedded in a Dielectric," IEEE Transactions on Antenna and Propagation, IEEE Service Center, Piscataway, NJ, US vol. 56, No. 2, Feb. 1, 2010, 8 pgs.
Gill et al. "A System for Change Detection and Human Recognition in Voxel Space using the Microsoft Kinect Sensor," 2011 IEEE Applied Imagery Pattern Recognition Workshop. 8 pgs.
Han et al. Enhanced Computer Vision with Microsoft Kinect Sensor: A Review, IEEE Transactions on Cybernetics vol. 43, No. 5. pp. 1318-1334, Oct. 3, 2013.
Hsieh et al. "Development of a Retrodirective Wireless Microwave Power Transmission System", IEEE, 2003 pp. 393-396.
Leabman "Adaptive Band-partitioning for Interference Cancellation in Communication System," Thesis Massachusetts Institute of Technology, Feb. 1997, pp. 1-70.
Li et al. High-Efficiency Switching-Mode Charger System Design Considerations with Dynamic Power Path Management, Mar./Apr. 2012 Issue, 8 pgs.
Mao et al. "BeamStar: An Edge-Based Approach to Routing in Wireless Sensors Networks", IEEE Transactions on Mobile Computing, IEEE Service Center, Los Alamitos, CA US, vol. 6, No. 11, Nov. 1, 2007, 13 pgs.
Mascarenas et al. "Experimental Studies of Using Wireless Energy Transmission for Powering Embedded Sensor Nodes," Nov. 28, 2009, Journal of Sound and Vibration, 13 pgs.
Mishra et al. "SIW-based Slot Array Antenna and Power Management Circuit for Wireless Energy Harvesting Applications", IEEE APSURSI, Jul. 2012, 2 pgs.
Nenzi et al "U-Helix: On-Chip Short Conical Antenna", 2013 7th European Conference on Antennas and Propagation (EUCAP), ISBN:978-1-4673-2187-7, IEEE, Apr. 8, 2013, 5 pgs.
Qing et al. "UHF Near-Field Segmented Loop Antennas with Enlarged Interrogation Zone," 2012 IEEE International Workshop on Antenna Technology (iWAT), Mar. 1, 2012, pp. 132-135, XP055572059, ISBN: 978-1-4673-0035-3.
Singh "Wireless Power Transfer Using Metamaterial Bonded Microstrip Antenna for Smart Grid WSN", Fourth International Conference on Advances in Computing and Communications (ICACC), Aug. 27-29, 2014, Abstract 1 pg.
Smolders "Broadband Microstrip Array Antennas" Institute of Electrical 1-15 and Electronics Engineers, Digest of the Antennas and Propagation Society International Symposium. Seattle, WA, Jun. 19-24, 1994, Abstract 3 pgs.
Van Veen et al., "Beamforming: A Versatile Approach to Spatial Filtering", IEEE, ASSP Magazine, Apr. 1988, pp. 4-24.
Wei et al. "Design of a Wideband Horizontally Polarized Omnidirectional Printed Loop Antenna," IEEE Antennas and Wireless Propagation Letters, vol. 11, Jan. 3, 2012, 4 pgs.
Zhai et al. "A Practical Wireless Charging System Based on Ultra-Wideband Retro-Reflective Beamforming" 2010 IEEE Antennas and Propagation Society International Symposium, Toronto, ON 2010, 4 pgs.

\* cited by examiner

SYSTEMS AND METHODS OF ESTIMATING OPTIMAL PHASES TO USE FOR INDIVIDUAL ANTENNAS IN AN ANTENNA ARRAY

RELATED APPLICATIONS

This application is a continuation of U.S. patent application Ser. No. 16/784,035, filed on Feb. 6, 2020, entitled "Systems And Methods Of Estimating Optimal Phases To Use For Individual Antennas In An Antenna Array," which claims priority to U.S. Provisional Patent Application No. 62/802,127 filed Feb. 6, 2019, entitled "Systems and Methods of Estimating Optimal Phases to Use for Individual Antennas in an Antenna Array," each of which is herein fully incorporated by reference in its respective entirety.

TECHNICAL FIELD

The present disclosure relates generally to wireless power transmission, and more particularly to adjusting characteristics of power transmission signals to increase usable power wirelessly delivered to a receiver.

BACKGROUND

Portable electronic devices such as smartphones, tablets, notebooks and other electronic devices are used every day by people to communicate and interact with one another. However, frequent use of an electronic device requires a significant amount of power which leads to depletion of the device's battery. As such, a device may need to be charged at least once a day, or for some high-demand electronic devices, more than once a day. Accordingly, users frequently need to plug their devices into a power source in order to recharge their devices. This activity is tedious and burdensome, and users may need to carry chargers with them in case their portable electronic devices need to be charged. Users also need to locate available power sources (e.g., a wall outlet) to use the chargers.

To address this problem, wireless power transmission systems have been devised to wirelessly transmit power from one or more transmitters to one or more receivers. Such transmitters include antennas or coils configured to transmit power wirelessly. The transmitted power is received at and harvested by a receiver. To maximize the power received by the receiver, phase values of individual antennas of the transmitter may be calculated in order to maximize the power received by the receiver.

However, current solutions for determining an optimal phase involve sequentially incrementing the phase over a range of 360 degrees (or $2\pi$) for each antenna, and then monitoring the amount of power received at the receiver at each phase value. Then, the phase corresponding to the maximum received power is chosen as the phase for the transmitter antenna. This process consumes valuable resources, like time, energy, and unnecessary processing cycles. The amount of time and processing required to perform this method drastically increases as the numbers of phases and antennas increase. Additionally, since each incremental phase is checked, the wireless signals transmitted by the transmitter are more susceptible to noise distortion.

SUMMARY

Accordingly, there is a need for a wireless power transmitter that estimates the optimal phase at which to transmit RF power to a receiver that saves time and processing, while decreasing susceptibility to noise distortion. One embodiment estimates the optimal phase based on two (or three) different phased RF test signals, rather than exhaustively searching the entire phase cycle of RF test signals for an optimal phase. The transmitter disclosed herein uses several methods to estimate the optimal transmitter phase for an antenna array.

(A1) In some embodiments, a method is performed at a wireless-power-transmitting device, and the method includes receiving, by a wireless communication radio of a wireless-power-transmitting device, which includes an antenna array, a wireless communication signal indicating that a wireless-power-receiving device is within a wireless-power-transmission range of the wireless-power-transmitting device. The method further includes, in response to receiving the wireless communication signal (i.e., upon determining that the wireless-power-transmitting device is within the wireless-power-transmission range), transmitting, via a respective antenna of the antenna array of the wireless-power-transmitting device, a plurality of radio frequency (RF) test signals using at least two test phases of a plurality of available phases for the respective antenna (the at least two test phases are different phases). Importantly, the plurality of available phases includes phases (e.g., phase values) in addition to the at least two test phases. The method further includes (i) receiving, from the wireless-power-receiving device, information identifying a first amount of power delivered to (i.e., received by) the wireless-power-receiving device by a first of the plurality of RF test signals transmitted at a first of the at least two test phases, and (ii) receiving, from the wireless-power-receiving device, information identifying a second amount of power delivered to (i.e., received by) the wireless-power-receiving device by a second of the plurality of RF test signals transmitted at a second of the at least two test phases. The method further includes determining, based on the first and second amounts of power delivered to the wireless-power-receiving device, an optimal phase from among the plurality of available phases for the respective antenna of the wireless-power-transmitting device. It is noted that the at least two test phases may be predetermined.

(A2) In some embodiments of A1, no additional RF test signals are transmitted using phases in addition to the at least two test phases.

(A3) In some embodiments of any of A1-A2, the optimal phase is one of the phases in addition to the at least two test phases.

(A4) In some embodiments of any of A1-A3, the method further includes, transmitting, via the respective antenna of the wireless-power-transmitting device, one or more RF power signals with the optimal phase to the wireless-power-receiving device, wherein the wireless-power-receiving device uses power from the one or more RF power signals to power or charge itself. In some embodiments, the RF power signals have a first power level and the RF test signals have a second power level, the second power level being less than the first power level.

(A5) In some embodiments of any of A1-A4, transmitting the plurality of RF test signals further includes transmitting a first of the plurality of RF test signals in response to receiving the wireless communication signal from the wireless-power-receiving device; and transmitting a second of the plurality of RF test signals in response to receiving an additional wireless communication signal from the wireless-power-receiving device.

(A6) In some embodiments of any of A1-A5, the respective antenna is a first antenna; and the plurality of RF test signals is a first plurality of RF test signals. Moreover, in some embodiments, the method further includes, in response to receiving the wireless communication signal: transmitting, via each additional antenna of the antenna array, a respective plurality of RF test signals each transmitted using the at least two test phases; receiving for each additional antenna, from the wireless-power-receiving device, information identifying a first amount of power delivered to the wireless-power-receiving device by a first of the plurality of RF test signals transmitted at the first of the at least two test phases; receiving for each additional antenna, from the wireless-power-receiving device, information identifying a second amount of power delivered to the wireless-power-receiving device by a second of the plurality of RF test signals transmitted at the second of the at least two test phases; and determining, based on the first and second amounts of power delivered to the wireless-power-receiving device by each additional antenna, an optimal phase from among the plurality of available phases for each additional antenna of the wireless-power-transmitting device.

(A7) In some embodiments of A6, the optimal phase for the first antenna differs from the optimal phase of at least one other antenna in the antenna array.

(A8) In some embodiments of any of A6-A7, the first plurality of RF test signals are transmitted before the plurality of RF test signals transmitted by the other antennas in the antenna array.

(A9) In some embodiments of any of A1-A8, respective values for the at least two different phases are separated by a predefined interval (e.g., a predefined amount/number of phases).

(A10) In some embodiments of A9, the predefined interval corresponds to known characteristics of a pure sinusoidal wave.

(A11) In some embodiments of any of A1-A10, the information identifying the first amount of power delivered to the wireless-power-receiving device is received via a first additional wireless communication signal; and the information identifying the second amount of power delivered to the wireless-power-receiving device is received via a second additional wireless communication signal.

(A12) In some embodiments of any of A1-A11, the information identifying the first amount of power delivered to the wireless-power-receiving device and the information identifying the second amount of power delivered to the wireless-power-receiving device are received together in an additional wireless communication signal.

(A13) In some embodiments of any of A1-A12, the method further includes, receiving, from the wireless-power-receiving device, information identifying a third amount of power delivered to the wireless-power-receiving device by a third of the plurality of RF test signals transmitted at a third of the at least two test phases; and determining, based on the first, second, and third amounts of power delivered to the wireless-power-receiving device, an optimal phase from among the plurality of available phases for the respective antenna of the wireless-power-transmitting device.

(A14) In some embodiments of any of A1-A13, the information identifying the first amount of power delivered to the wireless-power-receiving device indicates and a first amount of usable power delivered to the wireless-power-receiving device. Furthermore, the information identifying the second amount of power delivered to the wireless-power-receiving device indicates a second amount of usable power delivered to the wireless-power-receiving device.

(A15) In another aspect, a wireless-power-transmitting device (e.g., transmitter 102, FIGS. 1-2) is provided. In some embodiments, the wireless-power-transmitting device includes: a wireless communications radio; an antenna array; one or more processors; and memory storing one or more programs for execution by the one or more processors, the one or more programs including instructions for causing the wireless-power-transmitting device to perform the method described in any of A1-A14.

(A16) In yet another aspect, a non-transitory computer-readable storage medium is provided. The non-transitory computer-readable storage medium stores one or more programs configured for execution by one or more processors of a wireless-power-transmitting device that includes a wireless communications radio and an antenna array, the one or more programs including instructions for causing the wireless-power-transmitting device to perform the method described in any of A1-A14.

(A17) In yet another aspect, a wireless-power-transmitting device (e.g., transmitter 102, FIGS. 1-2) is provided and the wireless-power-transmitting device includes means for performing the method described in any one of A1-A14.

(B1) In some embodiments, another method is performed at a wireless-power-transmitting device, and the method includes receiving, by a wireless communications radio of a wireless-power-transmitting device that includes an antenna array, a wireless communication signal indicating that a wireless-power-receiving device is within a wireless-power-transmission range of the wireless-power-transmitting device. The method further includes, in response to receiving the wireless communication signal (i.e., upon determining that the wireless-power-transmitting device is within the wireless-power-transmission range): transmitting, via a respective antenna of the antenna array of the wireless-power-transmitting device: (i) a first radio frequency (RF) test signal at a first test phase of a plurality of available phases for the respective antenna, and (ii) a second RF test signal at a second test phase of the plurality of available phases, where the first and second test phases are separated by a number of the available test phases. The available phases include a range of phase values, and the first and second test phases are selected so that a threshold number of phase values from the range of phase values separate the first and second test phases.

The method further includes receiving, from the wireless-power-receiving device, information identifying first and second amounts of power delivered to the wireless-power-receiving device by the first and second RF test signals, respectively. The method further includes, in response to determining that the first amount of power is greater than the second amount of power: (i) selecting the first test phase as a reference test phase, and (ii) transmitting, via the respective antenna, third and fourth RF test signals at third and fourth test phases, respectively. Importantly, the third test phase is a greater phase value than the first test phase and the fourth test phase is a smaller phase value than the first test phase.

(B2) In some embodiments of B1, the method further includes information identifying third and fourth amounts of power delivered to the wireless-power-receiving device by the third and fourth RF test signals, respectively.

(B3) In some embodiments of B2, the method further includes, in accordance with a determination that the third and fourth test phases are each adjacent to the reference test phase (i.e., the first test phase): (i) comparing the first, third, and fourth amounts of power to one another, and (ii) selecting, as an optimal phase for the respective antenna, the phase with a highest amount of power from the first, third, and fourth amounts of power.

(B4) In some embodiments of B2, the method further includes, in accordance with a determination that the third and fourth test phases are each not adjacent to the reference test phase (i.e., the first test phase) and in response to determining that the third amount of power is greater than the fourth amount of power: (i) selecting the third test phase as the reference test phase (i.e., a new reference test phase is selected), and (ii) transmitting, via the respective antenna, fifth and sixth RF test signals at fifth and sixth test phases, respectively. In some embodiments, the fifth test phase is a greater phase value than the third test phase and the sixth test phase is a smaller phase value than the third test phase.

(B5) In some embodiments of B4, the method further includes, in accordance with a determination that the fifth and sixth test phases are each adjacent to the reference test phase (i.e., the third test phase): (i) comparing the third, fifth, and sixth amounts of power to one another; and (ii) selecting, as an optimal phase for the respective antenna, the phase with a highest amount of power from the third, fifth, and sixth amounts of power.

(B6) In another aspect, a wireless-power-transmitting device (e.g., transmitter 102, FIGS. 1-2) is provided. In some embodiments, the wireless-power-transmitting device includes: a wireless communications radio; an antenna array; one or more processors; and memory storing one or more programs for execution by the one or more processors, the one or more programs including instructions for causing the wireless-power-transmitting device to perform the method described in any of B1-B5.

(B7) In yet another aspect, a non-transitory computer-readable storage medium is provided. The non-transitory computer-readable storage medium stores one or more programs configured for execution by one or more processors of a wireless-power-transmitting device that includes a wireless communications radio and an antenna array, the one or more programs including instructions for causing the wireless-power-transmitting device to perform the method described in any of B1-B5.

(B8) In yet another aspect, a wireless-power-transmitting device (e.g., transmitter 102, FIGS. 1-2) is provided and the wireless-power-transmitting device includes means for performing the method described in any one of B1-B5.

(C1) In some embodiments, another method is performed at a wireless-power-transmitting device that includes a wireless communications radio and an antenna array of one or more antennas configured to transmit RF signals for wireless power delivery at a predetermined plurality of distinct phases. The method includes, receiving, by the wireless communication radio of the wireless-power-transmitting device, a wireless communication signal indicating that a wireless-power-receiving device is within a wireless-power-transmission range of the wireless-power-transmitting device. The method also includes, upon determining that the wireless-power-transmitting device is within the wireless-power-transmission range: transmitting, by an antenna of the antenna array, multiple RF test signals each at a different phase selected from a subset of phases of the predetermined plurality of distinct phases. For example, if the predetermined plurality of distinct phases (also referred to herein as "a plurality of available phases") consists of 1/16, 2/16, 3/16, 4/16, 5/16, 6/16, 7/16, 8/16, 9/16, 10/16, 11/16, 12/16, 13/16, 14/16, 15/16, and 16/16, then the difference phases of the multiple RF test signals may be 4/16 and 10/16, or 3/16, 8/16, and 13/16 (or some other combination). The method further includes (i) receiving, for each of the multiple RF test signals received by the wireless-power-receiving device, information identifying a respective amount of power received by the wireless-power-receiving device, and (ii) determining, based on the information, an optimal phase, from the plurality of distinct phases, for transmitting wireless power from the antenna to the wireless-power-receiving device.

(C2) In some embodiments of C1, the different phases of the multiple RF test signals are each separated from one another by a phase difference (e.g., 5/16 phase difference, or some other phase difference).

(C3) In some embodiments of C2, the phase difference is predetermined.

(C4) In some embodiments of any of C1-C3, transmitting the multiple RF test signals comprises: (i) transmitting a first RF test signal at a first phase; and (ii) transmitting a second RF test signal at a second phase different from the first phase. Furthermore, receiving the information comprises receiving, for each of the first and second RF test signals received by the wireless-power-receiving device, information identifying a respective amount of power received by the wireless-power-receiving device.

(C5) In some embodiments of C4, the method further includes, prior to determining the optimal phase: (i) determining that the wireless-power-receiving device received more power from the first RF test signal than the second RF test signal, and (ii) upon determining that the wireless-power-receiving device received more power from the first RF test signal than the second RF test signal, transmitting a third RF test signal at a third phase greater than the first phase and different to the second phase and transmitting a fourth RF test signal at a fourth phase less than the first phase and different to the second and third phases. The method may further include receiving, for each of the third and fourth RF test signals received by the wireless-power-receiving device, information identifying a respective amount of power received by the wireless-power-receiving device.

(C6) In some embodiments of C5, the determined optimal phase is one of the first phase, third phase, and fourth phase.

(C7) In some embodiments of any of C1-C3, transmitting the multiple RF test signals consists of transmitting first and second RF test signals at first and second phases, respectively. Moreover, the optimal phase is a phase between or equal to the first and second phases.

(C8) In some embodiments of C7, determining the optimal phase comprises interpolating the optimal phase from the first and second phases.

(C9) In some embodiments of any of C1-C3, transmitting the multiple RF test signals consists of transmitting first, second, and third RF test signals at first, second, and third phases, respectively. Furthermore, determining the optimal phase comprises interpolating the optimal phase from the first, second, and third phases.

(C10) In another aspect, a wireless-power-transmitting device (e.g., transmitter 102, FIGS. 1-2) is provided. In some embodiments, the wireless-power-transmitting device includes: a wireless communications radio; an antenna array of one or more antennas configured to transmit radio frequency (RF) signals for wireless power delivery at a predetermined plurality of distinct phases; one or more processors; and memory storing one or more programs for execution by the one or more processors, the one or more programs including instructions for causing the wireless-power-transmitting device to perform the method described in any of C1-C9.

(C11) In yet another aspect, a non-transitory computer-readable storage medium is provided. The non-transitory computer-readable storage medium stores one or more programs configured for execution by one or more processors of a wireless-power-transmitting device that includes a wireless communications radio and an antenna array of one or more antennas configured to transmit radio frequency (RF) signals for wireless power delivery at a predetermined plurality of distinct phases, the one or more programs including instructions for causing the wireless-power-transmitting device to perform the method described in any of C1-C9.

(C12) In yet another aspect, a wireless-power-transmitting device (e.g., transmitter 102, FIGS. 1-2) is provided and the wireless-power-transmitting device includes means for performing the method described in any one of C1-C9.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

Figure 1:
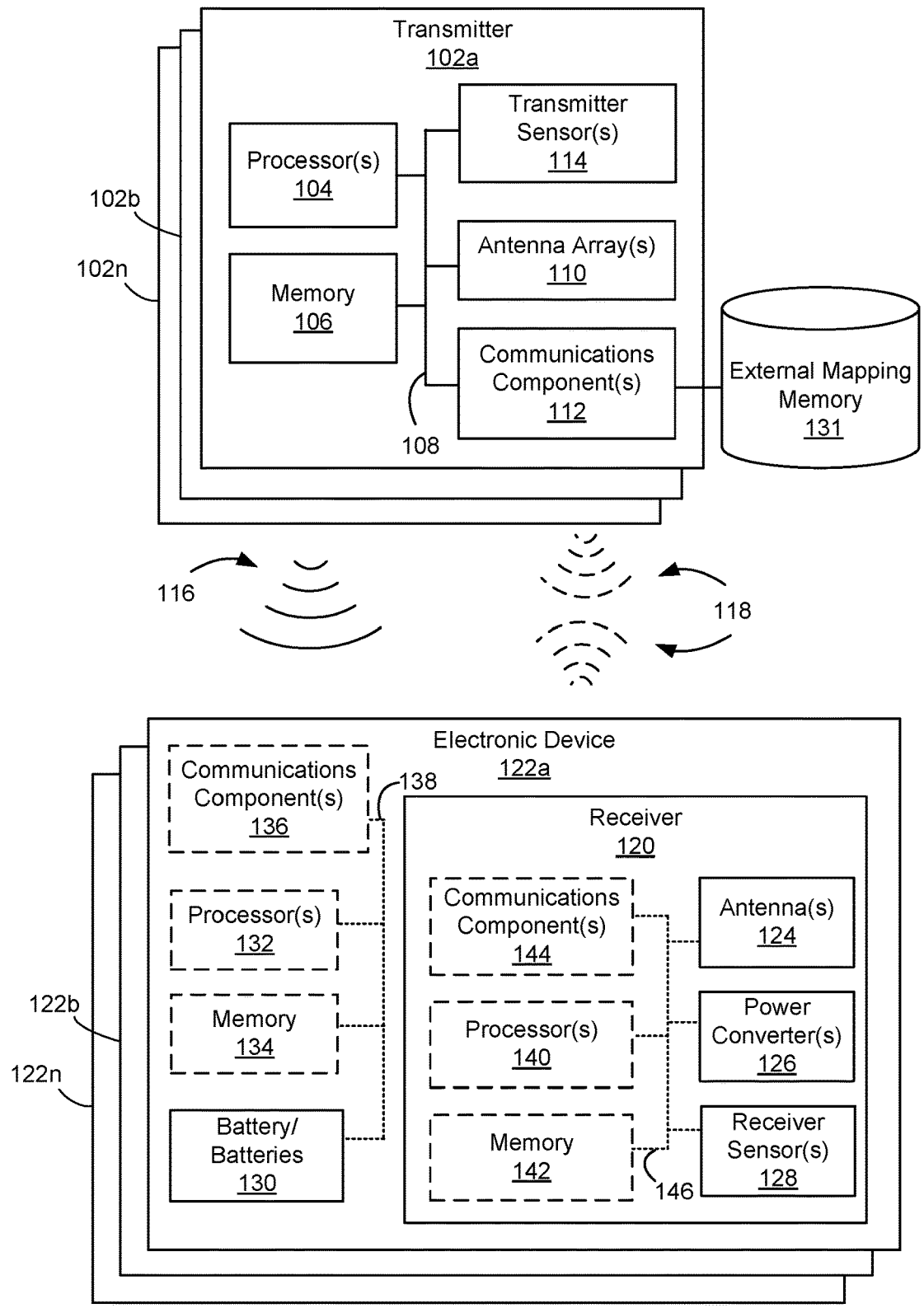
FIG. 1 is a block diagram illustrating a representative wireless power transmission system in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as not to unnecessarily obscure pertinent aspects of the embodiments described herein.

FIG. 1 is a block diagram of components of wireless power transmission environment 100, in accordance with some embodiments. Wireless power transmission environment 100 includes, for example, transmitters 102 (e.g., transmitters 102a, 102b . . . 102n) and one or more receivers 120 (e.g., receivers 120a, 120b . . . 120n). In some embodiments, each respective wireless power transmission environment 100 includes a number of receivers 120, each of which is associated with a respective electronic device 122. In some instances, the transmitter 102 is referred to herein as a "wireless-power-transmitting device" or a "wireless power transmitter." Additionally, in some instances, the receiver 120 is referred to herein as a "wireless-power-receiving device" or a "wireless power receiver."

An example transmitter 102 (e.g., transmitter 102a) includes, for example, one or more processor(s) 104, a memory 106, one or more antenna arrays 110, one or more communications components 112 (also referred to herein as a "wireless communications radio," a "communications radio" or simply a "radio"), and/or one or more transmitter sensors 114. In some embodiments, these components are interconnected by way of a communications bus 108. References to these components of transmitters 102 cover embodiments in which one or more of these components (and combinations thereof) are included. The components are discussed in further detail below with reference to FIG. 2.

In some embodiments, a single processor 104 (e.g., processor 104 of transmitter 102a) executes software modules for controlling multiple transmitters 102 (e.g., transmitters 102b . . . 102n). In some embodiments, a single transmitter 102 (e.g., transmitter 102a) includes multiple processors 104, such as one or more transmitter processors (configured to, e.g., control transmission of signals 116 by antenna array 110), one or more communications component processors (configured to, e.g., control communications transmitted by communications component 112 and/or receive communications by way of communications component 112) and/or one or more sensor processors (configured to, e.g., control operation of transmitter sensor 114 and/or receive output from transmitter sensor 114).

The wireless power receiver 120 receives power transmission signals 116 and/or communication signals 118 transmitted by transmitters 102. In some embodiments, the receiver 120 includes one or more antennas 124 (e.g., an antenna array including multiple antenna elements), power converter 126, receiver sensor 128, and/or other components or circuitry (e.g., processor(s) 140, memory 142, and/or communication component(s) 144). In some embodiments, these components are interconnected by way of a communications bus 146. References to these components of receiver 120 cover embodiments in which one or more of these components (and combinations thereof) are included.

The receiver 120 converts energy from received signals 116 (also referred to herein as RF power transmission signals, or simply, RF signals, RF waves, power waves, or power transmission signals) into electrical energy to power and/or charge electronic device 122. For example, the receiver 120 uses the power converter 126 to convert energy derived from power waves 116 to alternating current (AC) electricity or direct current (DC) electricity to power and/or charge the electronic device 122. Non-limiting examples of the power converter 126 include rectifiers, rectifying circuits, voltage conditioners, among suitable circuitry and devices.

In some embodiments, the receiver 120 is a standalone device that is detachably coupled to one or more electronic devices 122. For example, the electronic device 122 has processor(s) 132 for controlling one or more functions of the electronic device 122, and the receiver 120 has processor(s) 140 for controlling one or more functions of the receiver 120.

In some embodiments, the receiver 120 is a component of the electronic device 122. For example, processors 132 control functions of the electronic device 122 and the receiver 120. In addition, in some embodiments, the receiver 120 includes one or more processors 140, which communicates with processors 132 of the electronic device 122.

In some embodiments, the electronic device 122 includes one or more processors 132, memory 134, one or more communication components 136, and/or one or more batteries 130. In some embodiments, these components are interconnected by way of a communications bus 138. In some embodiments, communications between electronic device 122 and receiver 120 occur via communications component(s) 136 and/or 144. In some embodiments, communications between the electronic device 122 and the receiver 120 occur via a wired connection between communications bus 138 and communications bus 146. In some embodiments, the electronic device 122 and the receiver 120 share a single communications bus.

In some embodiments, the receiver 120 receives one or more power waves 116 directly from the transmitter 102 (e.g., via one or more antennas 124). In some embodiments, the receiver 120 harvests power waves from one or more pockets of energy created by one or more power waves 116 transmitted by the transmitter 102. In some embodiments, the transmitter 102 is a near-field transmitter that transmits the one or more power waves 116 within a near-field distance (e.g., less than approximately six inches away from the transmitter 102). In other embodiments, the transmitter 102 is a far-field transmitter that transmits the one or more power waves 116 within a far-field distance (e.g., more than approximately six inches away from the transmitter 102).

After the power waves 116 are received and/or energy is harvested from a pocket of energy, circuitry (e.g., integrated circuits, amplifiers, rectifiers, and/or voltage conditioner) of the receiver 120 converts the energy of the power waves (e.g., radio frequency electromagnetic radiation) to usable power (i.e., electricity), which powers the electronic device 122 and/or is stored to battery 130 of the electronic device 122. In some embodiments, a rectifying circuit of the receiver 120 translates the electrical energy from AC to DC for use by the electronic device 122. In some embodiments, a voltage conditioning circuit increases or decreases the voltage of the electrical energy as required by the electronic device 122. In some embodiments, an electrical relay conveys electrical energy from the receiver 120 to the electronic device 122.

In some embodiments, the electronic device 122 obtains power from multiple transmitters 102 and/or using multiple receivers 120. In some embodiments, the wireless power transmission environment 100 includes a plurality of electronic devices 122, each having at least one respective receiver 120 that is used to harvest power waves from the transmitters 102 into power for charging the electronic devices 122.

In some embodiments, the one or more transmitters 102 adjust values of one or more characteristics (e.g., waveform characteristics, such as phase, gain, direction, amplitude, polarization, and/or frequency) of power waves 116. For example, a transmitter 102 selects a subset of one or more antenna elements of antenna array 110 to initiate transmission of power waves 116, cease transmission of power waves 116, and/or adjust values of one or more characteristics used to transmit power waves 116. In some embodiments, the one or more transmitters 102 adjust power waves 116 such that trajectories of power waves 116 converge at a predetermined location within a transmission field (e.g., a location or region in space), resulting in controlled constructive or destructive interference patterns. The transmitter 102 may adjust values of one or more characteristics for transmitting the power waves 116 to account for changes at the wireless power receiver that may negatively impact transmission of the power waves 116.

As will be discussed in detail below with reference to FIGS. 5A-5C, the transmitter 102 is also configured to transmit RF test signals 116. The RF test signals are used to determine an optimal phase (also called an "optimal phase setting" or "optimal phase value") for at least a subset of antennas in the transmitter's antenna array 110. Additionally, at least in some embodiments, a location of the receiver is determined once the optimal phases are determined for the subset of antennas.

In some embodiments, respective antenna arrays 110 of the one or more transmitters 102 may include antennas having one or more polarizations. For example, a respective antenna array 110 may include vertical or horizontal polarization, right hand or left hand circular polarization, elliptical polarization, or other polarizations, as well as any number of polarization combinations. In some embodiments, antenna array 110 is capable of dynamically varying the antenna polarization (or any other characteristic) to optimize wireless power transmission.

In some embodiments, respective antenna arrays 110 of the one or more transmitters 102 may include a set of one or more antennas configured to transmit the power waves 116 into respective transmission fields of the one or more transmitters 102. Integrated circuits (not shown) of the respective transmitter 102, such as a controller circuit (e.g., a radio frequency integrated circuit (RFIC)) and/or waveform generator, may control the behavior of the antennas. For example, based on the information received from the receiver 120 by way of the communication signal 118, a controller circuit (e.g., processor 104 of the transmitter 102, FIG. 1) may determine values of the waveform characteristics (e.g., amplitude, frequency, trajectory, direction, phase, polarization, among other characteristics) of power waves 116 that would effectively provide power to the receiver 120, and in turn, the electronic device 122. The controller circuit may also identify a subset of antennas from the antenna arrays 110 that would be effective in transmitting the power waves 116. In some embodiments, a waveform generator circuit (not shown in FIG. 1) of the respective transmitter 102 coupled to the processor 104 may convert energy and generate the power waves 116 having the specific values for the waveform characteristics identified by the processor 104/controller circuit, and then provide the power waves to the antenna arrays 110 for transmission.

In some embodiments, constructive interference of power waves occurs when two or more power waves 116 (e.g., RF power transmission signals) are in phase with each other and converge into a combined wave such that an amplitude of the combined wave is greater than amplitude of a single one of the power waves. For example, the positive and negative peaks of sinusoidal waveforms arriving at a location from multiple antennas "add together" to create larger positive and negative peaks. In some embodiments, a pocket of energy is formed at a location in a transmission field where constructive interference of power waves occurs.

In some embodiments, destructive interference of power waves occurs when two or more power waves are out of phase and converge into a combined wave such that the amplitude of the combined wave is less than the amplitude of a single one of the power waves. For example, the power waves "cancel each other out," thereby diminishing the amount of energy concentrated at a location in the transmission field. In some embodiments, destructive interference is used to generate a negligible amount of energy or "null" at a location within the transmission field where the power waves converge.

In some embodiments, the one or more transmitters 102 transmit power waves 116 that create two or more discrete transmission fields (e.g., overlapping and/or non-overlapping discrete transmission fields). In some embodiments, a first transmission field (i.e., an area of physical space into which a first set of power waves is transmitted) is managed by a first processor 104 of a first transmitter (e.g., transmitter 102a) and a second transmission field (i.e., another area of physical space into which a second set of power waves is transmitted) is managed by a second processor 104 of a second transmitter (e.g., transmitter 102b). In some embodiments, the two or more discrete transmission fields (e.g., overlapping and/or non-overlapping) are managed by the transmitter processors 104 as a single transmission field. Moreover, in some embodiments, a single processor 104 manages the first and second transmission fields.

In some embodiments, the communications component 112 transmits communication signals 118 by way of a wired and/or wireless communication connection to the receiver 120. In some embodiments, the communications component 112 generates communication signals 118 used for triangulation of the receiver 120 (e.g., test signals). In some embodiments, the communication signals 118 are used to convey information between the transmitter 102 and receiver 120 for adjusting values of one or more waveform characteristics used to transmit the power waves 116 (e.g., convey amounts of power derived from RF test signals). In some embodiments, the communication signals 118 include information related to status, efficiency, user data, power consumption, billing, geo-location, and other types of information.

In some embodiments, the communications component 112 transmits communication signals 118 to the receiver 120 by way of the electronic device 122a. For example, the communications component 112 may convey information to the communications component 136 of the electronic device 122a, which the electronic device 122a may in turn convey to the receiver 120 (e.g., via bus 138).

In some embodiments, the communications component 112 includes a communications component antenna for communicating with the receiver 120 and/or other transmitters 102 (e.g., transmitters 102b through 102n). In some embodiments, these communication signals 118 are sent using a first channel (e.g., a first frequency band) that is independent and distinct from a second channel (e.g., a second frequency band distinct from the first frequency band) used for transmission of the power waves 116.

In some embodiments, the receiver 120 includes a receiver-side communications component 144 (also referred to herein as a "wireless communications radio," a "communications radio" or simply a "radio")) configured to communicate various types of data with one or more of the transmitters 102, through a respective communication signal 118 generated by the receiver-side communications component (in some embodiments, a respective communication signal 118 is referred to as an advertising signal). The data may include location indicators for the receiver 120 and/or electronic device 122, a power status of the device 122, status information for the receiver 120, status information for the electronic device 122, status information about the power waves 116, and/or status information for pockets of energy. In other words, the receiver 120 may provide data to the transmitter 102, by way of the communication signal 118, regarding the current operation of the system 100, including: information identifying a present location of the receiver 120 or the device 122, an amount of energy (i.e., usable power) received by the receiver 120, and an amount of power received and/or used by the electronic device 122, among other possible data points containing other types of information.

In some embodiments, the data contained within communication signals 118 is used by the electronic device 122, the receiver 120, and/or the transmitters 102 for determining adjustments to values of one or more waveform characteristics used by the antenna array 110 to transmit the power waves 116. Using a communication signal 118, the transmitter 102 communicates data that is used, e.g., to identify receivers 120 within a transmission field, identify electronic devices 122, determine safe and effective waveform characteristics for power waves, and/or hone the placement of pockets of energy. In some embodiments, the receiver 120 uses a communication signal 118 to communicate data for, e.g., alerting transmitters 102 that the receiver 120 has entered or is about to enter a transmission field (e.g., come within wireless-power-transmission range of a transmitter 102), provide information about the electronic device 122, provide user information that corresponds to the electronic device 122, indicate the effectiveness of received power waves 116, and/or provide updated characteristics or transmission parameters that the one or more transmitters 102 use to adjust transmission of the power waves 116.

In some embodiments, transmitter sensor 114 and/or receiver sensor 128 detect and/or identify conditions of the electronic device 122, the receiver 120, the transmitter 102, and/or a transmission field. In some embodiments, data generated by the transmitter sensor 114 and/or receiver sensor 128 is used by the transmitter 102 to determine appropriate adjustments to values of one or more waveform characteristics used to transmit the power waves 106. Data from transmitter sensor 114 and/or receiver sensor 128 received by the transmitter 102 includes, e.g., raw sensor data and/or sensor data processed by a processor 104, such as a sensor processor. Processed sensor data includes, e.g., determinations based upon sensor data output. In some embodiments, sensor data received from sensors that are external to the receiver 120 and the transmitters 102 is also used (such as thermal imaging data, information from optical sensors, and others).

In some embodiments, the receiver sensor 128 is a gyroscope that provides raw data such as orientation data (e.g., tri-axial orientation data), and processing this raw data may include determining a location of the receiver 120 and/or or a location of receiver antenna 124 using the orientation data. Furthermore, the receiver sensor 128 can indicate an orientation of the receiver 120 and/or electronic device 122. As one example, the transmitters 102 receive orientation information from the receiver sensor 128 and the transmitters 102 (or a component thereof, such as the processor 104) use the received orientation information to determine whether electronic device 122 is flat on a table, in motion, and/or in use (e.g., next to a user's head).

In some embodiments, the receiver sensor 128 includes one or more infrared sensors (e.g., that output thermal imaging information), and processing this infrared sensor data includes identifying a person (e.g., indicating presence of the person and/or indicating an identification of the person) or other sensitive object based upon the thermal imaging information.

In some embodiments, receiver sensor 128 is a sensor of the electronic device 122. In some embodiments, receiver 120 and/or electronic device 122 includes a communication system for transmitting signals (e.g., sensor signals output by receiver sensor 128) to the transmitter 102.

Non-limiting examples of the transmitter sensor 114 and/or the receiver sensor 128 include, e.g., infrared, pyroelectric, ultrasonic, laser, optical, Doppler, gyro, accelerometer, microwave, millimeter, RF standing-wave sensors, resonant LC sensors, capacitive sensors, and/or inductive sensors. In some embodiments, technologies for the transmitter sensor 114 and/or the receiver sensor 128 include binary sensors that acquire stereoscopic sensor data, such as the location of a human or other sensitive object.

In some embodiments, the transmitter sensor 114 and/or receiver sensor 128 is configured for human recognition (e.g., capable of distinguishing between a person and other objects, such as furniture). Examples of sensor data output by human recognition-enabled sensors include: body temperature data, infrared range-finder data, motion data, activity recognition data, silhouette detection and recognition data, gesture data, heart rate data, portable devices data, and wearable device data (e.g., biometric readings and output, accelerometer data).

Figure 2:
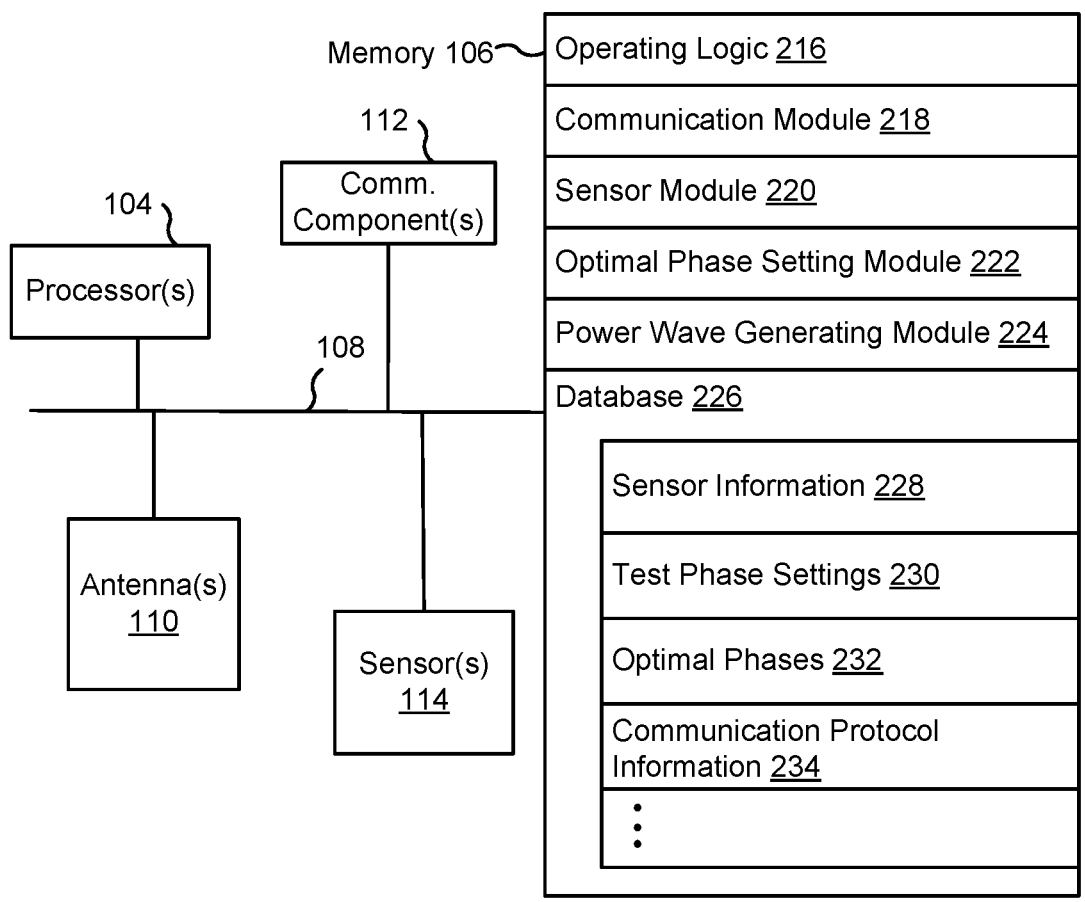
FIG. 2 is a block diagram illustrating a representative transmitter device in accordance with some embodiments.

FIG. 2 is a block diagram illustrating a representative transmitter device 102 (also sometimes referred to herein as a transmitter 102, a wireless power transmitter 102, and a wireless-power-transmitting device 102) in accordance with some embodiments. In some embodiments, the transmitter device 102 includes one or more processors 104 (e.g., CPUs, ASICs, FPGAs, microprocessors, and the like), one or more communication components 112 (e.g., radios), memory 106, one or more antennas 110, and one or more communication buses 108 for interconnecting these components (sometimes called a chipset). In some embodiments, the transmitter device 102 includes one or more sensors 114 as described above with reference to FIG. 1. In some embodiments, the transmitter device 102 includes one or more output devices such as one or more indicator lights, a sound card, a speaker, a small display for displaying textual information and error codes, etc. In some embodiments, the transmitter device 102 includes a location detection device, such as a GPS (global positioning satellite) or other geo-location receiver, for determining the location of the transmitter device 102.

The communication components 112 enable communication between the transmitter 102 and one or more communication networks. In some embodiments, the communication components 112 include, e.g., hardware capable of data communications using any of a variety of wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) wired protocols (e.g., Ethernet, HomePlug, etc.), and/or any other suitable communication protocol, including communication protocols not yet developed as of the filing date of this document.

The memory 106 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 106, or alternatively the non-volatile memory within memory 106, includes a non-transitory computer-readable storage medium. In some embodiments, the memory 106, or the non-transitory computer-readable storage medium of the memory 106, stores the following programs, modules, and data structures, or a subset or superset thereof:

operating logic 216 including procedures for handling various basic system services and for performing hardware dependent tasks;

communication module 218 for coupling to and/or communicating with remote devices (e.g., remote sensors, transmitters, receivers, servers, etc.) in conjunction with communication component(s) 112;

sensor module 220 for obtaining and processing sensor data (e.g., in conjunction with sensor(s) 114) to, for example, determine the presence, velocity, and/or positioning of object in the vicinity of the transmitter 102;

optimal phase setting module 222 for determining an optimal phase antenna for respective antennas in the transmitter's antenna array 110 based on RF test signals 116. In some embodiments, as discussed below with reference to FIGS. 5A-5C, the optimal phase setting module 222 determines the optimal phase setting using either a binary search method or a least squares method, or some combination thereof;

power wave generating module 224 for generating and transmitting (e.g., in conjunction with antenna(s) 110) power waves and test signals (e.g., RF test signals 116), including but not limited to, forming pocket(s) of energy at given locations. In some embodiments, the power wave generating module 224 is associated with (or includes) the optimal phase setting module 222 in that the RF test signals 116 are used to determine the optimal phase; and database 226, including but not limited to:
sensor information 228 for storing and managing data received, detected, and/or transmitted by one or more sensors (e.g., sensors 114 and/or one or more remote sensors);

test phases 230 for storing and managing predetermined test phases of test signals transmitted by the power wave generating module 224. In some embodiments, as discussed below with reference to FIGS. 5A-5C, the test phases are separated by a predetermined interval corresponding to known characteristics of a pure sinusoidal wave;

optimal phases 232 for storing and managing optimal antenna phases determined by the optimal phase setting module 222 for one or more antennas 110; and communication protocol information 234 for storing and managing protocol information for one or more protocols (e.g., custom or standard wireless protocols, such as ZigBee, Z-Wave, etc., and/or custom or standard wired protocols, such as Ethernet).

Each of the above-identified elements (e.g., modules stored in memory 106 of the transmitter 102) is optionally stored in one or more of the previously mentioned memory devices, and corresponds to a set of instructions for performing the function(s) described above. The above identified modules or programs (e.g., sets of instructions) need not be implemented as separate software programs, procedures, or modules, and thus various subsets of these modules are optionally combined or otherwise rearranged in various embodiments. In some embodiments, the memory 106, optionally, stores a subset of the modules and data structures identified above. Furthermore, the memory 106, optionally, stores additional modules and data structures not described above, such as a tracking module for tracking the movement and positioning of objects within a transmission field.

Figure 3:
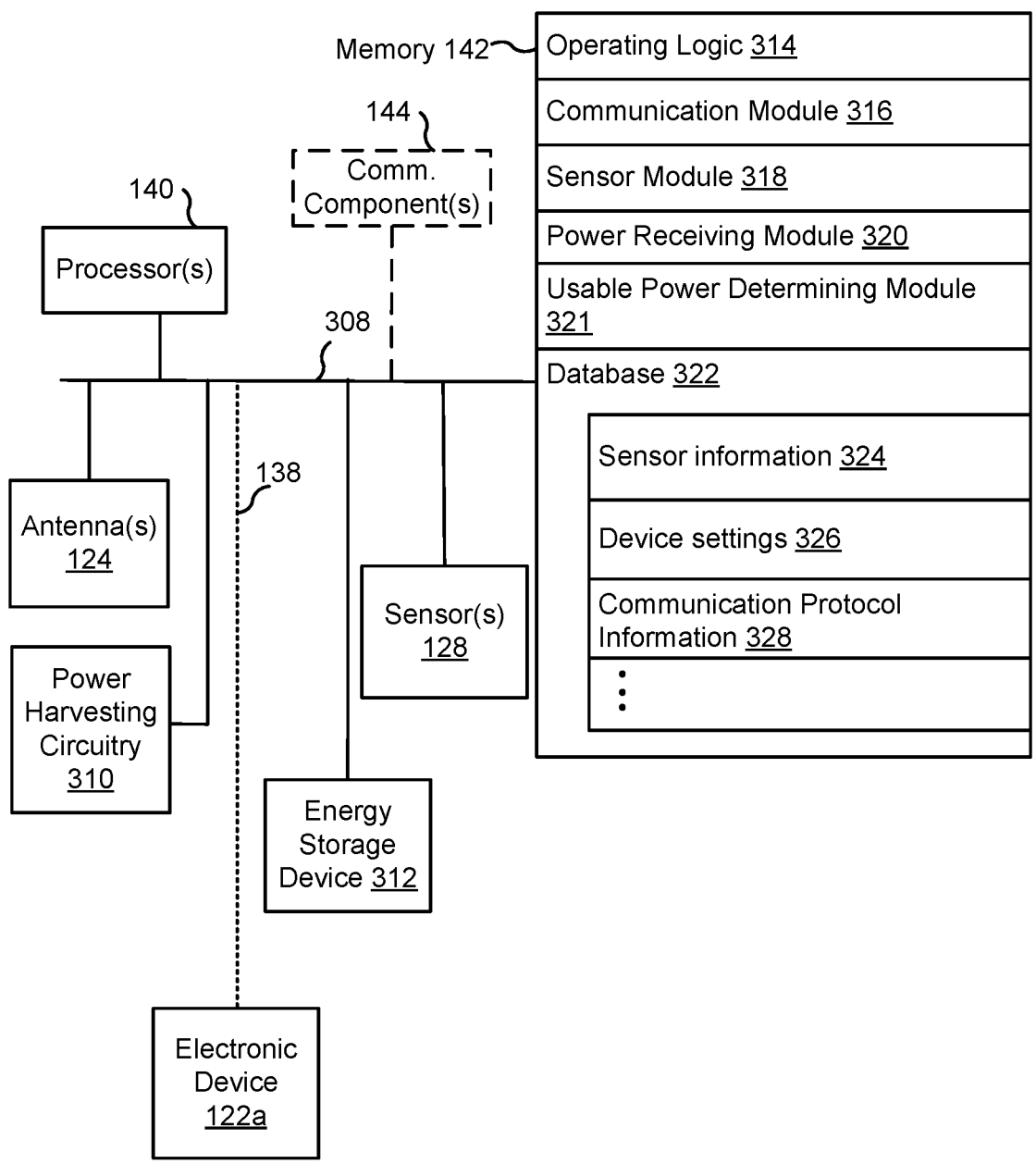
FIG. 3 is a block diagram illustrating a representative receiver device in accordance with some embodiments.

FIG. 3 is a block diagram illustrating a representative receiver device 120 (also referred to herein as a receiver 120, a wireless power receiver 120, and a wireless-power-receiving device 120) in accordance with some embodiments. In some embodiments, the receiver device 120 includes one or more processors 140 (e.g., CPUs, ASICs, FPGAs, microprocessors, and the like), one or more communication components 144, memory 142, one or more antennas 124, power harvesting circuitry 310, and one or more communication buses 308 for interconnecting these components (sometimes called a chipset). In some embodiments, the receiver device 120 includes one or more sensors 128 such as one or sensors described above with reference to FIG. 1. In some embodiments, the receiver device 120 includes an energy storage device 312 for storing energy harvested via the power harvesting circuitry 310. In various embodiments, the energy storage device 312 includes one or more batteries (e.g., battery 130, FIG. 1), one or more capacitors, one or more inductors, and the like.

As described above with reference to FIG. 1, in some embodiments, the receiver 120 is internally or externally connected to an electronic device (e.g., electronic device 122*a*, FIG. 1) via a connection 138 (e.g., a bus).

In some embodiments, the power harvesting circuitry 310 includes one or more rectifying circuits and/or one or more power converters. In some embodiments, the power harvesting circuitry 310 includes one or more components (e.g., a power converter 126) configured to convert energy from power waves and/or energy pockets to electrical energy (e.g., electricity). In some embodiments, the power harvesting circuitry 310 is further configured to supply power to a coupled electronic device (e.g., an electronic device 122), such as a laptop or phone. In some embodiments, supplying power to a coupled electronic device include translating electrical energy from an AC form to a DC form (e.g., usable by the electronic device 122).

The communication component(s) 144 enable communication between the receiver 120 and one or more communication networks. In some embodiments, the communication component(s) 144 include, e.g., hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document. In some embodiments, the receiver 120 may utilize a built-in communication component (e.g., a Bluetooth radio) or an electronic device with which the receiver is coupled, and therefore, in these embodiments, the receiver 120 may not include its own communication component.

The memory 142 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 142, or alternatively the non-volatile memory within memory 142, includes a non-transitory computer-readable storage medium. In some embodiments, the memory 142, or the non-transitory computer-readable storage medium of the memory 142, stores the following programs, modules, and data structures, or a subset or superset thereof:

- operating logic 314 including procedures for handling various basic system services and for performing hardware dependent tasks;
- communication module 316 for coupling to and/or communicating with remote devices (e.g., remote sensors, transmitters, receivers, servers, electronic devices, mapping memories, etc.) in conjunction with communication component(s) 144;
- sensor module 318 for obtaining and processing sensor data (e.g., in conjunction with sensor(s) 128) to, for example, determine the presence, velocity, and/or positioning of the receiver 120, a transmitter 102, or an object in the vicinity of the receiver 120;
- power receiving module 320 for receiving (e.g., in conjunction with antenna(s) 124 and/or power harvesting circuitry 310) and optionally converting (e.g., in conjunction with power harvesting circuitry 310) the energy (e.g., to direct current); transferring the energy to a coupled electronic device (e.g., an electronic device 122); and optionally storing the energy (e.g., in conjunction with energy storage device 312)
- power determining module 321 for determining (in conjunction with operation of the power receiving module 320) an amount of power received by the receiver based on energy extracted from power waves (or RF test signals) and/or pockets or energy at which the power waves converge (e.g., RF signals 116, FIG. 1). In some embodiments, as discussed below with reference to FIGS. 5A-5C, after determining an amount of power received by the receiver, the receiver 120 transmits to the transmitter 102 information identifying the amount of power; and
- database 322, including but not limited to:
    - sensor information 324 for storing and managing data received, detected, and/or transmitted by one or more sensors (e.g., sensors 128 and/or one or more remote sensors);
    - device settings 326 for storing and managing operational settings for the receiver 120, a coupled electronic device (e.g., an electronic device 122), and/or one or more remote devices; and
    - communication protocol information 328 for storing and managing protocol information for one or more protocols (e.g., custom or standard wireless protocols, such as ZigBee, Z-Wave, etc., and/or custom or standard wired protocols, such as Ethernet).

In some embodiments, the power receiving module 321 communicates the amount of power to the communication module 316, which communicates the amount of power to other remote devices (e.g., transmitter 102, FIGS. 1-2). Moreover, in some embodiments, the power receiving module 321 communicates the amount of power to database 322 (e.g., the database 322 stores the amount of power derived from one or more power waves 116). In some embodiments, the power receiving module 321 instructs the communication module 316 to transmit distinct transmissions to the remote devices (e.g., a first communication signal that indicates a first amount of power received by the receiver (e.g., by a first test signal from the transmitter 102), a second communication signal that indicates a second amount of power received by the receiver (e.g., by a second test signal from the transmitter 102), and so on if needed). Alternatively, in some embodiments, the power receiving module 321 instructs the communication module 316 to transmit data packets to the remote devices (e.g., a respective data packet can include information for multiple test signals transmitted by the transmitter 102).

Each of the above identified elements (e.g., modules stored in memory 142 of the receiver 120) is optionally stored in one or more of the previously mentioned memory devices, and corresponds to a set of instructions for performing the function(s) described above. The above identified modules or programs (e.g., sets of instructions) need not be implemented as separate software programs, procedures, or modules, and thus various subsets of these modules are optionally combined or otherwise rearranged in various embodiments. In some embodiments, the memory 142, optionally, stores a subset of the modules and data structures identified above. Furthermore, the memory 142, optionally, stores additional modules and data structures not described above, such as an identifying module for identifying a device type of a connected device (e.g., a device type for an electronic device 122).

Figure 4A:
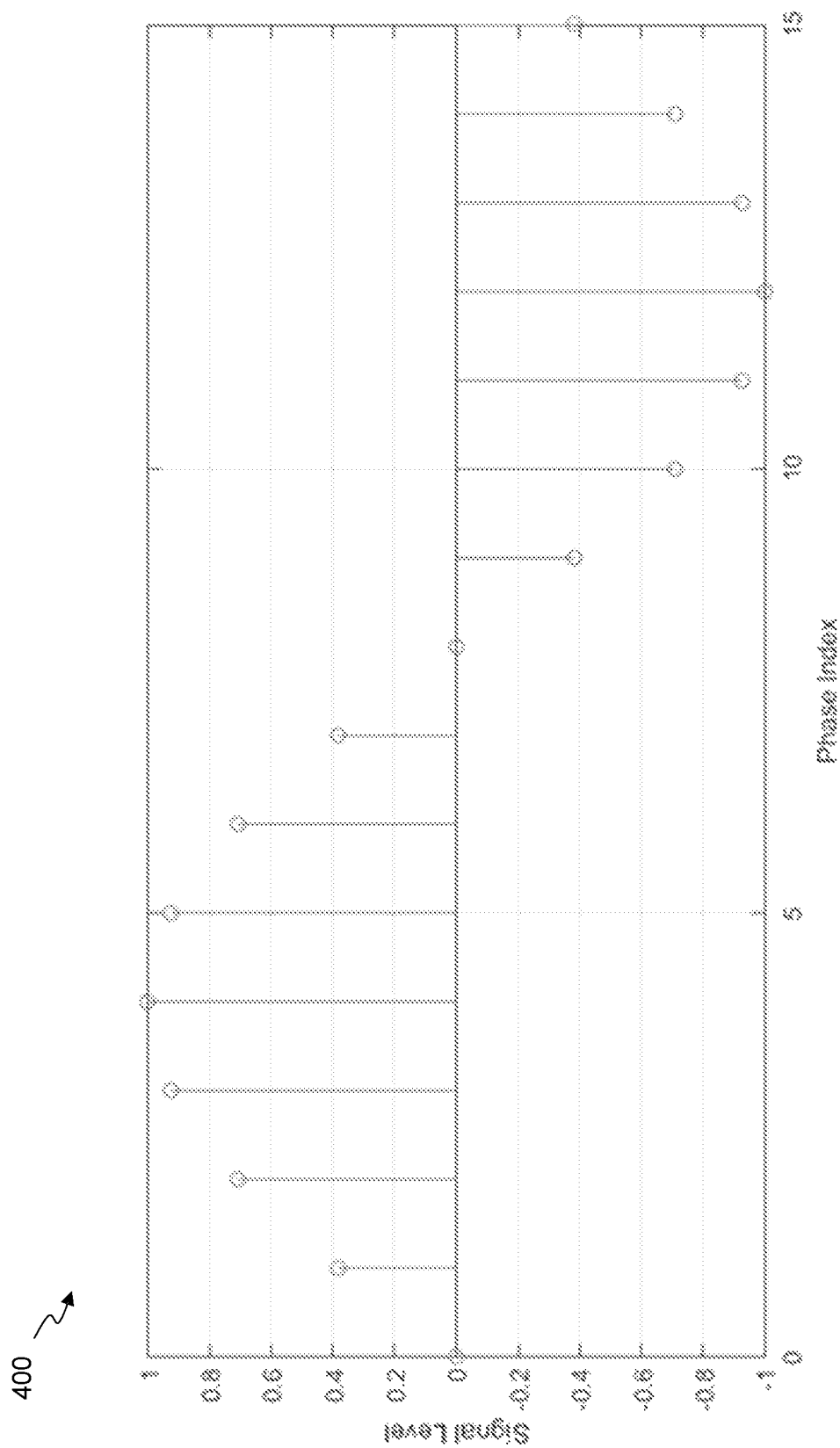
FIGS. 4A-4B are plots illustrating example sinusoidal functions of radio frequency (RF) test signals transmitted by antennas of a transmitter in accordance with some embodiments.
Figure 4B:
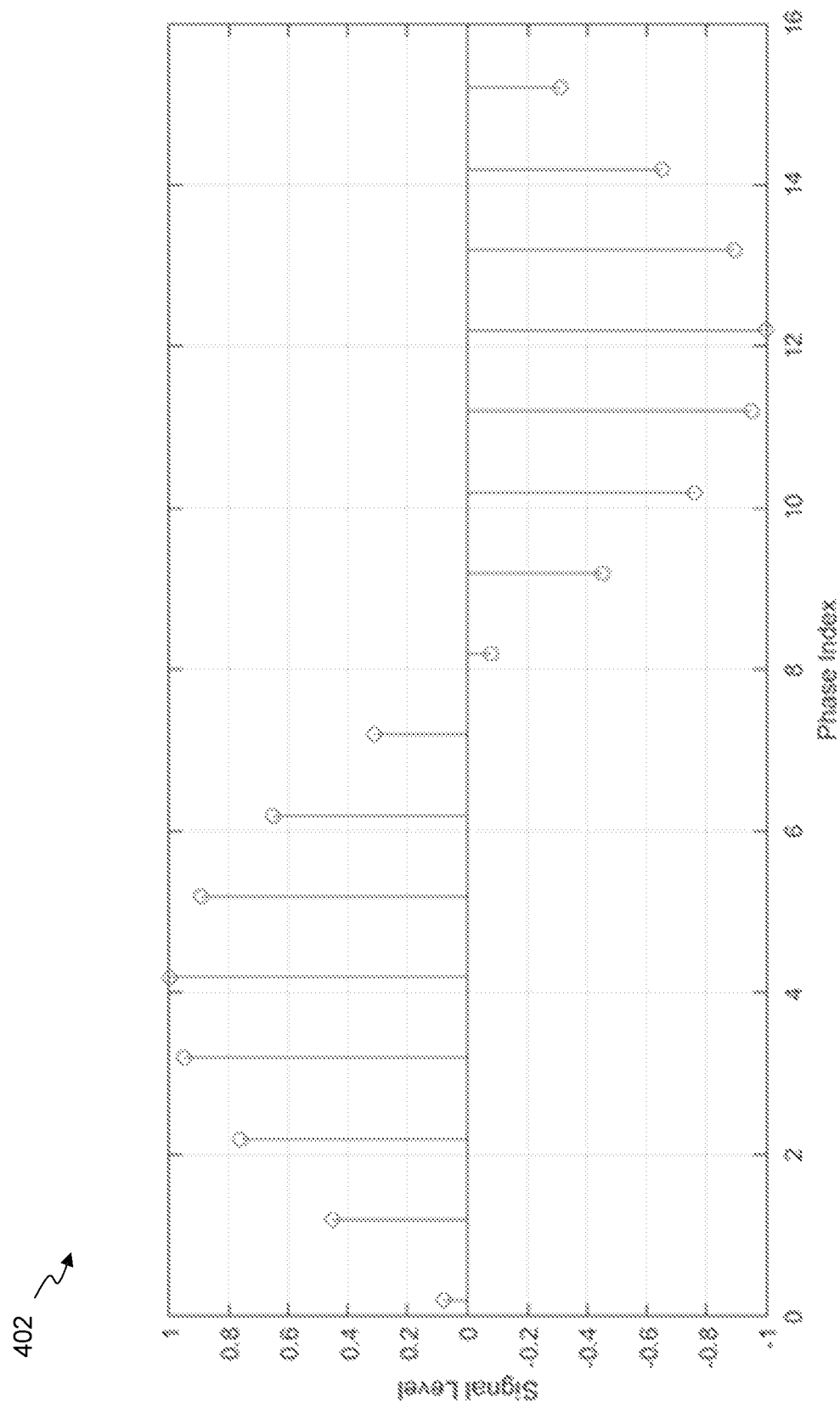

FIGS. 4A-4B are plots illustrating example sinusoidal functions of radio frequency (RF) test signals transmitted by antennas (e.g., antennas in antenna array 110, FIGS. 1-2) of a transmitter (e.g., transmitter 102, FIGS. 1-2), in accordance with some embodiments. FIGS. 4A-4B are plots illustrating two examples of Equation (1):

$$|S|=A+\cos(\theta_m+v_m) \quad (1)$$

where $|S|$ is the signal level magnitude, $A$ is a constant, $\theta_m$ is the frequency, and $v_m$ is the phase. In the example illustrated in FIG. 4A, $A=0$ and $v_m=\pi/2$. In the example illustrated in FIG. 4B, $v_m$ is not equal to exactly $\pi/2$ even though the RF test signals may be transmitted with a phase offset of $\pi/2$. This is due, in some instances, to noise. Thus, the example illustrated in FIG. 4B is a more realistic example of a sinusoidal function of RF test signals transmitted by antennas of a transmitter.

Figure 5A:
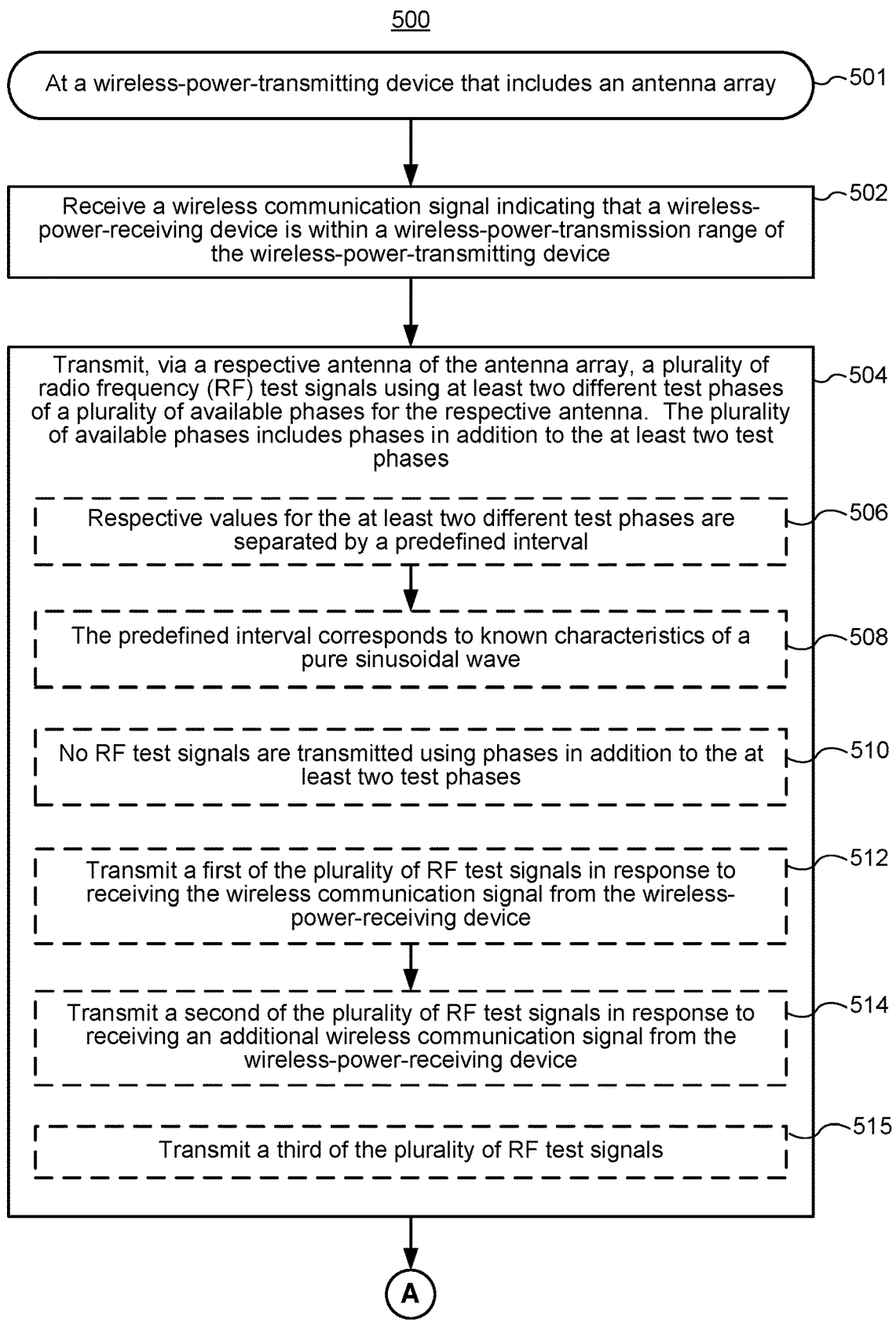
FIGS. 5A-5C are flow diagrams illustrating a method of estimating optimal phases to use for individual antennas in an antenna array in accordance with some embodiments.
Figure 5B:
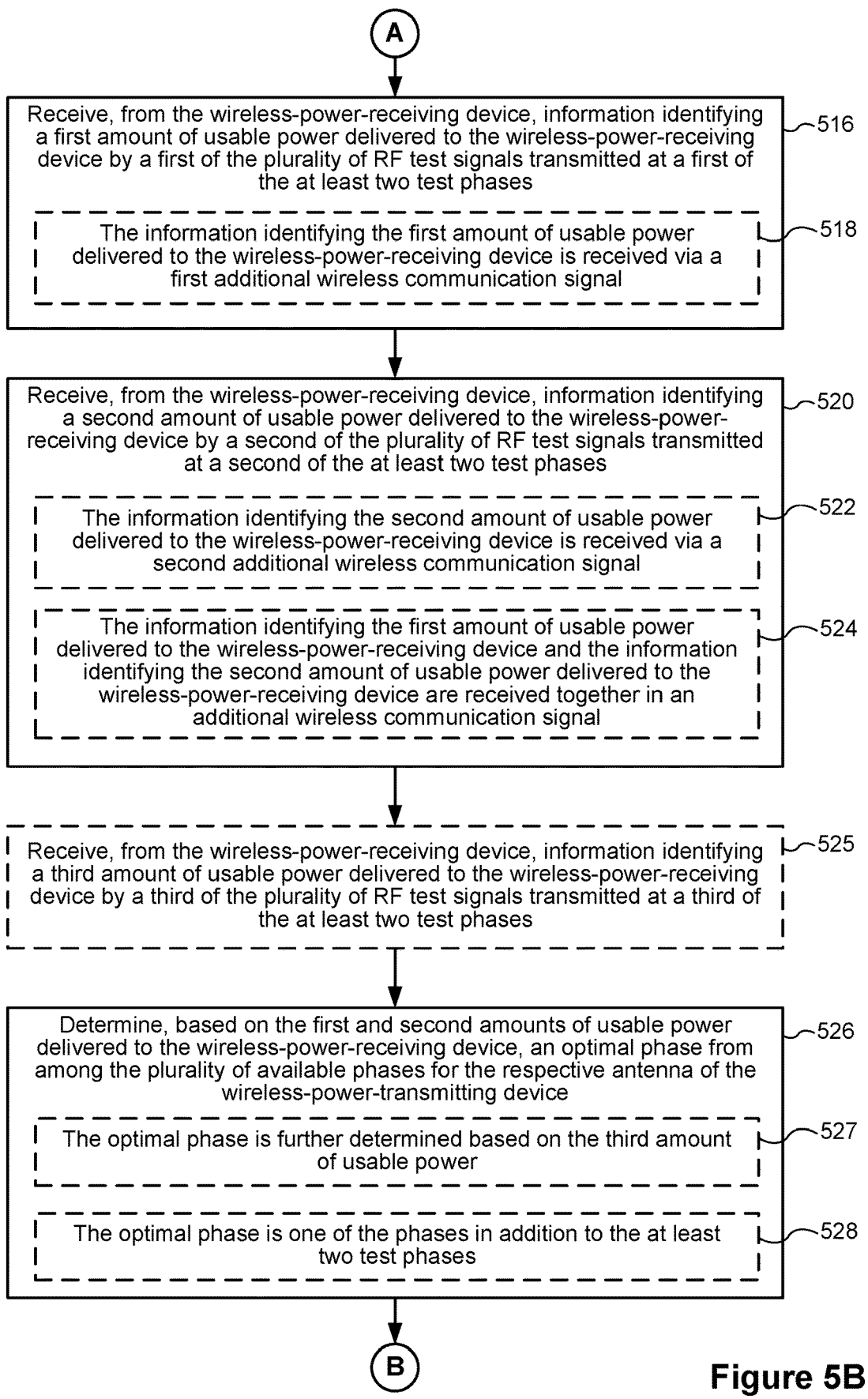
Figure 5C:
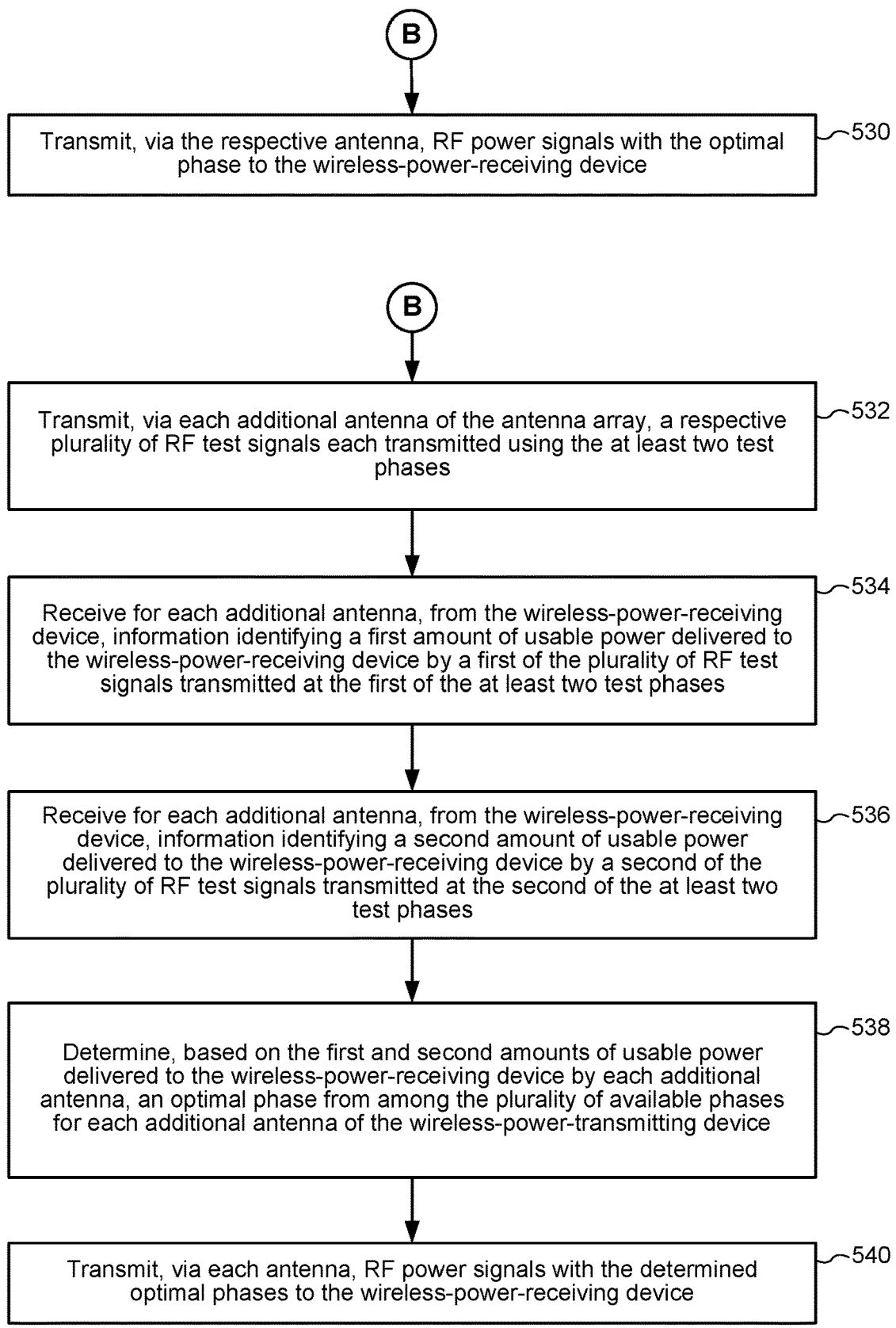

FIGS. 5A-5C are flow diagrams illustrating a method of estimating optimal phases to use for individual antennas in an antenna array (e.g., antenna array 110, FIGS. 1-2), in accordance with some embodiments. Operations of the method 500 may be performed by a transmitter (e.g., transmitter 102, FIGS. 1-2) or by one or more components thereof (e.g., those described above with reference to FIG. 2) (501). FIGS. 5A-5C correspond to instructions stored in a computer memory or computer-readable storage medium (e.g., memory 106 of the transmitter 102, FIG. 2).

As illustrated in FIG. 5A, in some embodiments, the method 500 includes receiving (502), by a radio of the transmitter, a wireless communication signal (e.g., signal 118, FIG. 1) indicating that a receiver is within a wireless-power-transmission range of the transmitter. In some embodiments, the wireless-power-transmission range is predefined and excludes a shut-off region that is defined 1 to 2 feet in front of the transmitter. In some embodiments, the wireless-power-transmission range extends (excluding the shut-off region) approximately 1 to 10 feet from the transmitter 102. It is noted that the wireless-power transmission range may increase overtime as wireless charging technologies continue to improve their far-field charging capabilities. Thus, a skilled artisan will appreciate that the example range above is not meant to exclude technological improvements in this field.

In some embodiments, one or more receivers are within the wireless-power-transmission range. In such cases, one or more transmitters may be utilized to provide wireless power to the one or more receivers. For example, if a receiver is not within a suitable distance from a transmitter (e.g., near an outer limit of the transmitter's wireless-power transmission range), then a higher power transmitter (e.g., one that is closer to the receiver) may be selected to transmit to that transmitter. In some embodiments, the one or more transmitters are in communication with each other so that the transmitters are able coordinate charging routines (e.g., transmitter 1 informs transmitter 2 that it will transmit power to the receiver 120).

Continuing, in some embodiments, the method 500 includes transmitting (504), via a respective antenna of an antenna array (e.g., an instance of the antenna array 110, FIG. 1) of the transmitter, a plurality of RF test signals in response to receiving the wireless communication signal. The plurality of RF test signals is transmitted using at least two test phases (which may be predetermined) of a plurality of available phases for the respective antenna. For example, a first RF test signal is transmitter at a first test phases, a second RF test signal is transmitter at a second test phases different from the first RF test signal, and so on (if more the plurality of RF test signals includes more than two RF test signals). Importantly, the plurality of available phases includes phases (e.g., phase values) in addition to the at least two test phases. Put another way, the RF test signals in the plurality of RF test signals are transmitted using a subset—i.e., less than all—of the available phases.

The RF test signals discussed above are used to help determine an optimal phase for delivering wireless power to the wireless power receiver. In some embodiments, these RF test signals are not used by the wireless power receiver to provide power or charge to the wireless power receiver, or a device associated therewith. Instead, the RF power signals (discussed in detail below), which are higher power RF signals relative to the RF test signals, are used to provide power or charge to the wireless power receiver. In this way, the transmitter is able to preserve resources during a device tuning stage (e.g., while transmitting the RF test signals) until the optimal phases are determined for at least a subset of the transmitter's antennas. As will be described in more detail below, the method 500 is able to locate a position of the wireless power receiver using test signals, tune the transmitter's antennas, and then transmit RF power signals to the wireless power receiver. It is noted that the RF signals 116 discussed above with reference to FIG. 1 could be either the RF test signals or RF power signals.

In some embodiments, a first test phase (also referred to herein as a "test phase setting" or "test phase value") may be 3/16 of one cycle of the RF test signals transmitted by the transmitter (e.g., $2\pi*3/16$ for sinusoidal signals). In this example, a second test phase may be 11/16 of one cycle of the RF test signals transmitted by the transmitter. Because two test phases are used, determining (526) an optimal phase for respective antennas is referred to herein as a binary search method, which will be discussed in greater detail below. In some other embodiments, the first and second test phases are different from 3/16 and 11/16. The key here, for either the binary search method or the least squares method (also discussed below) is that the first and second (and potentially third) test phases are separated by a threshold amount of phase values/settings (sometimes referred to below as a "predetermined interval" or a "predefined amount of phases"). The threshold amount of phase values may be greater than or equal to 5/16 in some embodiments (lesser amounts can also be used).

As mentioned above, the plurality of available phases (also referred to herein as "a predetermined plurality of distinct phases") may include phases in addition to the at least two test phases, which may be predetermined test phases. For example, the plurality of available phases may include 1/16, 2/16, 3/16, 4/16, 5/16, 6/16, 7/16, 8/16, 9/16, 10/16, 11/16, 12/16, 13/16, 14/16, 15/16, and 16/16. One skilled in the art will appreciate that different antennas have various available phases, and the 1/16 example above is merely one possible antenna arrangement.

In some other embodiments, the plurality of test signals includes three test signals, and as a result, three test phases are used, which may also be predetermined test phases. In one example, the first test phase is 3/16, the second test phase is 8/16, and the third test phase is 13/16. In this example, determining (526) an optimal phase for respective antennas is a least squares method. The least squares method is generally a faster and more accurate optimal phase estimation method than the binary search method. This approach will be discussed in greater detail with reference to step 526.

It is noted that, with the least squares method, phases of 3/16, 8/16, and 13/16 provide a reliable estimation of the optimal phase. With that said, other test phases can also be used that provide equally reliable estimations of the optimal phase due, in part, to these other test phases being equally susceptible to noise and finite bit width effects in computation of the pseudo-inverse (e.g., 4/16, 9/16, and 14/16 may be used, or some other combination of test phases may be used). Moreover, using more than three test phases with the least squares method can further improve the robustness to noise in the optimal phase measurements. It is also noted that some test phase combinations do not provide a reliable estimation of the optimal phase. For example, test phases of 0/16, 1/16, and 2/16 provide poor estimates of optimal phase because, in part, the pseudoinverse matrix is unstable, meaning it is susceptible to noise in the power signal and also computer finite bit width effects when computing the least squares solution.

In some embodiments, respective values for the at least two different phases are separated by a predefined interval (506). For example, where the at least two test phases are 3/16, 8/16, and 13/16, the phases are separated by a predefined interval of 5/16 (i.e., five phase values separate each test phase (in some embodiments, a greater or lesser predefined internal is used). The predefined interval corresponds to known characteristics of a pure sinusoidal wave (508). For example, the transmitter may transmit the RF test signals as pure sinusoidal waves. That is, in some instances, the RF test signals may be characterized by the functions described with reference to FIGS. 4A-4B. As described with reference to FIGS. 4A-4B, the predefined interval may be defined by sampling the sinusoidal wave at a predefined number of points on the sinusoidal wave that are, for example, equidistant along the phase index axis. The distance in phase index between the predefined number of points on the sinusoidal wave is the predefined interval.

In some embodiments, no RF test signals are transmitted using phases in addition to the at least two test phases (510). For example, where the at least two test phases are 3/16, 8/16, and 13/16, other phases—e.g., 1/16, 2/16, 4/16, 5/16, 6/16, 7/16, 9/16, 10/16, 11/16, 12/16, 14/16, 15/16, and 16/16—are not transmitted. It is noted that one of these phases could ultimately be the optimal phase (discussed below). In other embodiments, such as with the binary search method, some RF test signals are transmitted using phases in addition to the at least two predetermined test phases.

In some embodiments, transmitting the plurality of RF test signals includes transmitting (512) a first RF test signal of the plurality of RF test signals in response to receiving the wireless communication signal from the receiver (e.g., receiver 120, FIGS. 1 and 3), and also transmitting (514) a second RF test signal of the plurality of RF test signals in response to receiving an additional wireless communication signal from the receiver. The additional wireless communication signal may be separate and distinct from the wireless communication signal indicating that a receiver is within a wireless-power-transmission range of the transmitter (received at 502) and/or separate and distinct from the plurality of RF test signals using the at least two test phases (transmitted at 504). Alternatively, in some embodiments, transmitting the plurality of RF test signals includes transmitting the first RF test signal and the second RF test signal in response to receiving the wireless communication signal from the receiver.

In some embodiments, the method 500 includes transmitting (515) a third RF test signal of the plurality of RF test signals. The third RF test signal may be transmitted after transmitting the first and second RF test signals. Transmission of the third RF test signal is used with the least squares method, discussed below.

As illustrated in FIG. 5B, in some embodiments, the method 500 includes receiving (516), from the receiver, information identifying a first amount of power delivered to (i.e., received by) the receiver by a first RF test signal of the plurality of RF test signals transmitted at a first test phase of the at least two test phases. For example, where the at least two test phases are 3/16 and 11/16, information identifying a first amount of power delivered to the receiver may be transmitted at phase setting 3/16.

In some embodiments, the information identifying the first amount of power delivered to the receiver is received via a first additional wireless communication signal (518) (e.g., by the radio of transmitter). The first additional wireless communication signal may be separate and distinct from the wireless communication signal indicating that a receiver is within a wireless-power-transmission range of the transmitter (received at 502), the plurality of RF test signals using the at least two test phases (transmitted at 504), and/or the additional wireless communication signal from the receiver (transmitted at 514, which is optional).

The method 500 also includes receiving (520), from the receiver, information identifying a second amount of power delivered to (i.e., received by) the receiver by a second RF test signal of the plurality of RF test signals transmitted at a second test phase (distinct from the first test phase) of the at least two test phases. For example, where the at least two test phases are 3/16 and 11/16, information identifying the second amount of power delivered to the receiver may be transmitted at phase setting 11/16.

In some embodiments, the information identifying the second amount of power delivered to the receiver is received via a second additional wireless communication signal (522). The second additional wireless communication signal may be separate and distinct from the wireless communication signal indicating that a receiver is within a wireless-power-transmission range of the transmitter (received at 502), the plurality of RF test signals using the at least two test phases (transmitted at 504), and/or the additional wireless communication signal from the receiver (transmitted at 514).

In some other embodiments, the information identifying the first amount of power delivered to the receiver and the information identifying the second amount of power delivered to the receiver are received together in an additional wireless communication signal. This additional wireless communication signal may be separate and distinct from the wireless communication signal indicating that a receiver is within a wireless-power-transmission range of the transmitter (received at 502), the plurality of RF test signals using the at least two test phases (transmitted at 504), and/or the additional wireless communication signal from the receiver (transmitted at 514).

In some embodiments, the method 500 includes receiving (525), from the receiver, information identifying a third amount of power delivered to the receiver by a third RF test signal of the plurality of RF test signals transmitted at a third test phase (distinct from the first and second test phases) of the at least two test phases. In this example, the test phases may be 3/16 (e.g., the first test phase), 8/16 (e.g., the second test phase), and 13/16 (e.g., the third test phase), information identifying the third amount of power delivered to the receiver may be transmitted at phase 13/16. Step 525 is performed with the least squares method discussed in detail below.

In some embodiments, the method 500 includes determining (526), based on the first and second amounts of power delivered to the receiver, an optimal phase from among the plurality of available phases for the respective antenna of the transmitter. In some embodiments, where there are two test phases (e.g., phases of 3/16 and 11/16), determining an optimal phase is performed using a binary search method, which is detailed below. The binary search method is also discussed on its own with reference to the method 700.

Using $2\pi*3/16$ and $2\pi*11/16$ as example test phases, the binary search method may be carried out as follows. First, the respective absolute values of the signal level magnitudes (e.g., |S| in Equation (1)) for phase indices 3/16 and 11/16 are measured. Next, if the signal level magnitude (i.e., the amount of power) for phase index 3/16 is greater than the signal level magnitude for phase index 11/16, then phase index 3/16 is assigned as the temporary maximum. If, on the other hand, the signal level magnitude for phase index 11/16 is greater than the signal level magnitude for phase index 3/16, then phase index 11/16 is assigned as the temporary maximum. It should be noted that the present disclosure is not limited to test phases $2\pi*3/16$ and $2\pi*11/16$, as mentioned above.

In this embodiment of the binary search method, because there are 16 phase index values, the true maximum of the signal level must be within four samples of the phase index value that is the temporary maximum. Therefore, the respective absolute values of the signal level magnitudes for the two phase indices are four samples less than and four samples greater than the temporary maximum are measured. For example, where the temporary maximum is at phase index 3/16, phase indices 7/16 and 15/16 are the next two that are assessed. That is, the absolute values of the signal level magnitudes at phase indices 7/16 and 15/16 are compared to the temporary maximum. The new phase index value that has the greatest value is then assigned as the new temporary maximum.

This process of comparing the absolute values of the signal level magnitudes is iterated until all phase index values have been checked. At each subsequent iteration, the number of samples that are away from the temporary maximum and compared to the temporary maximum is decreased by half. For example, continuing the example in which there are 16 phase index values, the next iteration includes comparing the two phase index values that are two samples less than and two samples greater than the temporary maximum's phase index value with the temporary maximum. The iteration after this includes comparing the two phase index values that are one sample less than and one sample greater than the temporary maximum's phase index value with the temporary maximum. At this point, the binary search method is complete and the phase index value corresponding to the maximum in the last iteration is the optimal phase for the respective antenna.

Unlike other methods for optimal phase estimation, the binary search method does not require sequentially incrementing the phase over an entire cycle of the antenna signal under test. Therefore, the binary search method decreases the amount of time and processing required to carry out optimal phase estimation and decreases the transmitter's susceptibility to noise distortion. In particular, using the example of 16 phase index values, the binary search method measures 8 phase index values of the possible 16 phase index values in order to the optimal phase for the respective antenna. Some antennas have 64 phase index values (or even greater numbers), and in such cases, the benefits of the binary search method become even more pronounced (e.g., only 32 of the possible 64 phase index have to be measured to determine the optimal phase). However, even the binary search method may be improved by estimating the optimal phase using a least squares method, which is discussed below.

If more than two test phases are transmitted (e.g., at step 504), then the binary search method is no longer used. Instead, a least squares method is used. The least squares method involves determining (526) the optimal phase based on, at least, the first, second, and third amounts of power delivered to the receiver (527) (e.g., interpolating the optimal phase from the test phases and their respective amounts of power delivered to the receiver, as described below). It is noted that more than three measurements of power can be used in the least squares method (and also two measurements of power can also be used in the least squares method). Using $2\pi*3/16$, $2\pi*8/16$, and $2\pi*13/16$ as example test phases, the least squares method may be carried out as follows. First, using trigonometric identities, Equation (1) above may be expressed as Equation (2):

$$|S|=A+\cos(\theta_m)\cos(v_m)-\sin(\theta_m)\sin(v_m) \qquad (2)$$

In this example, since all 16 test phases vary over the range $[0,2\pi]$, the RF test signal level magnitude may be expressed as a projection, which may be defined by Equation (3):

$$|S| = H \begin{bmatrix} \cos(v_m) \\ \sin(v_m) \\ A \end{bmatrix} \qquad (3)$$

where H is a model matrix, and may be defined by Equation (4):

$$H = \begin{bmatrix} \cos(2\pi*3/16) & \sin(2\pi*3/16) & 1 \\ \cos(2\pi*8/16) & \sin(2\pi*8/16) & 1 \\ \cos(2\pi*13/16) & \sin(2\pi*13/16) & 1 \end{bmatrix} \qquad (4)$$

In example embodiments where the number of test phases is greater than 3, the matrix H may be defined by Equation (5):

$$H = \begin{bmatrix} \cos(2\pi * v_1) & \sin(2\pi * v_1) & 1 \\ \cos(2\pi * v_2) & \sin(2\pi * v_2) & 1 \\ \ldots & \ldots & 1 \\ \cos(2\pi * v_n) & \sin(2\pi * v_n) & 1 \end{bmatrix} \quad (5)$$

where $v_1$ to $v_n$ are the n test phases.

To determine the optimal phase, Equation (3) may be rewritten as Equation (6):

$$\begin{bmatrix} \cos(v_m) \\ \sin(v_m) \\ A \end{bmatrix} = pinv(H'H)H'|S| \quad (6)$$

where pinv is the pseudoinverse and H' indicates the conjugate transpose or Hermitian Transpose of the matrix H. The right-hand side of Equation (6) generates a vector of coefficients on the left-hand side. The first and second of these coefficients may then be used to determine the optimal phase in accordance with Equation (7):

$$v_m = \arctan\left(\frac{\sin(v_m)}{\cos(v_m)}\right) \quad (7)$$

One skilled in the art will appreciate that different transmitting antennas and different transmission signals will have various mathematical representations, and the expressions above are merely examples of such representations.

In some embodiments, the optimal phase is one of the phases in addition to the at least two test phases (528). For example, where the at least two test phases are 3/16, 8/16, and 13/16, the optimal phase is one of the other 13 phases. However, in other embodiments, the optimal phase may be either 3/16, 8/16, or 13/16.

Regardless of whether the binary search method or the least squares method is used, the method 500 further includes transmitting (530), via the respective antenna of the transmitter, one or more RF power signals having the optimal phase to the receiver. In some embodiments, the receiver uses power (e.g., energy) from the one or more RF power signals to power or charge itself and/or power or charge an electronic device coupled to the receiver.

In some embodiments, the method 500 includes tuning each additional antenna of the antenna array in the manner described above with reference to steps 504-515. For example, the method 500 includes transmitting (532), via each additional antenna of the antenna array, a respective plurality of RF test signals each transmitted using the at least two test phases.

Prior to this transmission 532, the steps performed thus far in the method 500 have been performed by a single antenna in the transmitter's antenna array. However, because the optimal phase may not be the same for each additional antenna in the array, these steps may be repeated for each additional antenna. In this way, each antenna in the array transmits RF test signals at a subset of the available test phases rather than exhaustively transmitting RF test signals at all available test phases and searching for the optimal phase in a brute force manner. As the number of antennas in the array increases, this process drastically saves time and computing power. Additionally, this process decreases the transmitter's susceptibility to noise distortion in the transmission signals.

In some embodiments, the method 500 includes receiving (534) for each additional antenna, from the receiver, information identifying a first amount of power delivered to the receiver by a first of the plurality of RF test signals transmitted at the first of the at least two test phases. In some embodiments, receiving 534 may include features mentioned above with reference to steps 516-518.

Continuing, in some embodiments, the method 500 includes receiving (536) for each additional antenna, from the receiver, information identifying a second amount of power delivered to the receiver by a second of the plurality of RF test signals transmitted at the second of the at least two test phases. In some embodiments, receiving 536 may include features mentioned above with reference to steps 520-524. The method 500 may also include receiving for each additional antenna, from the receiver, information identifying a third amount of power delivered to the receiver by a third of the plurality of RF test signals transmitted at the third of the at least two test phases.

Continuing, in some embodiments, the method 500 includes determining (538), based on the first and second (and, in some embodiments, third) amounts of power delivered to the receiver by each additional antenna, an optimal phase from among the plurality of available phases for each additional antenna of the transmitter. In some embodiments, determining 538 may include features mentioned above with reference to steps 526-528.

Continuing, in some embodiments, the method 500 includes transmitting (540), via each antenna, RF power signals with the determined optimal phases to the receiver. In some embodiments, the receiver uses power (e.g., energy) from the one or more RF power signals to power or charge itself and/or power or charge an electronic device coupled to the receiver. In some embodiments, transmitting 540 may include features mentioned above with reference to step 530.

Figure 6A:
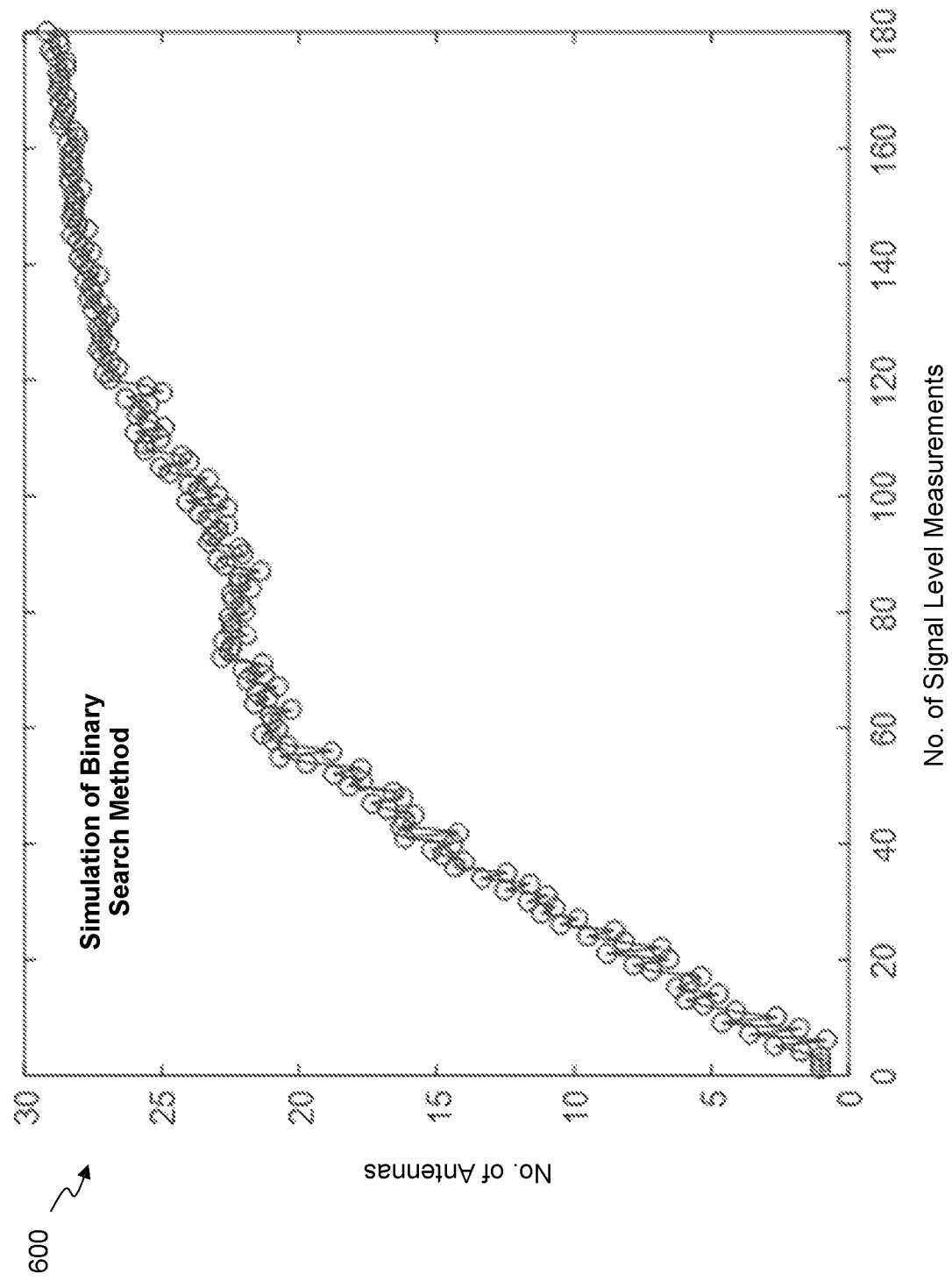
FIGS. 6A-6B are plots illustrating the results of simulations of a method of estimating optimal phases to use for individual antennas in an antenna array in accordance with some embodiments.
Figure 6B:
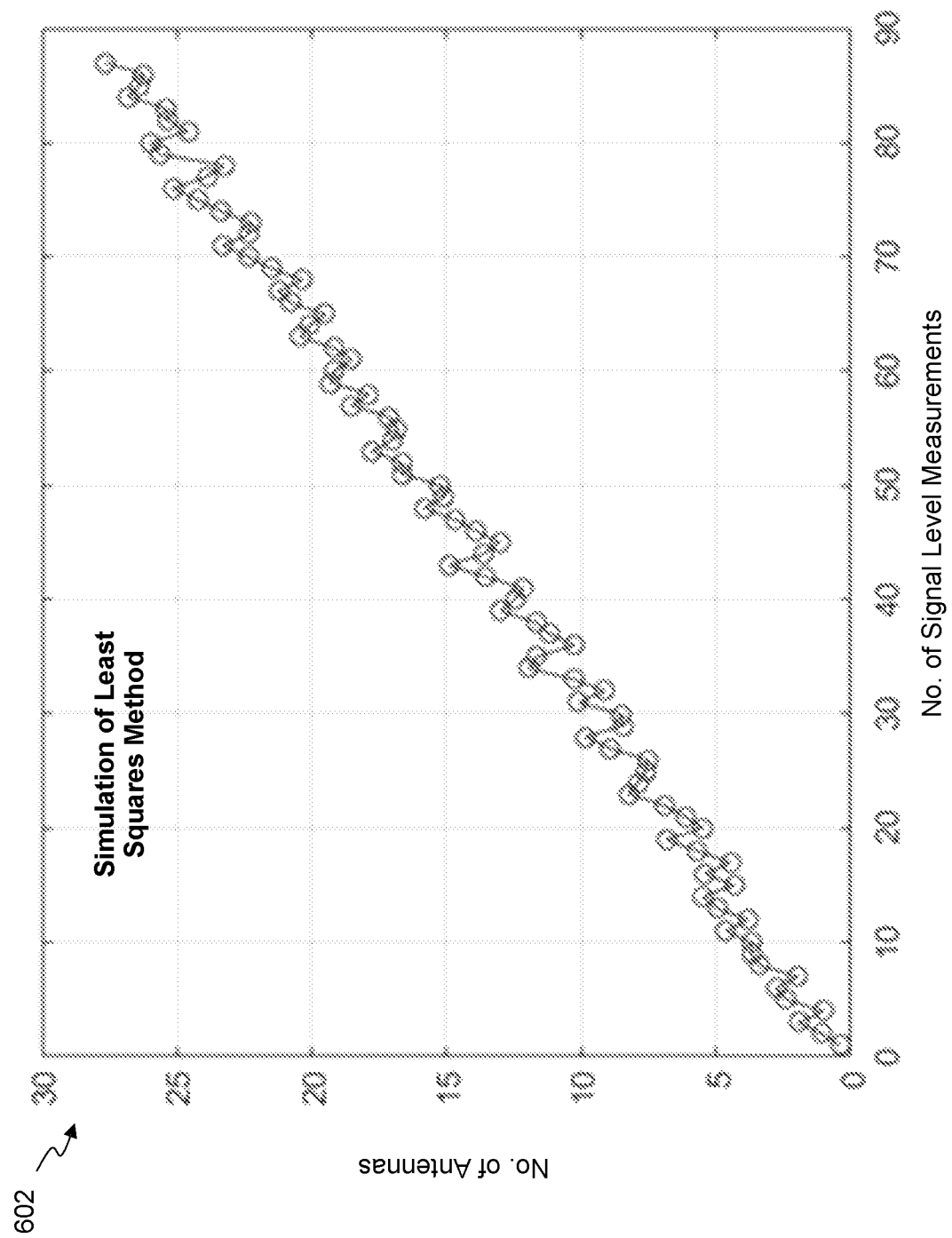

FIGS. 6A-6B are plots illustrating the results of simulations of a method of estimating optimal phases to use for individual antennas in an antenna array, in accordance with some embodiments.

The plot in FIG. 6A illustrates the results of a simulation of the binary search method described above with reference to FIGS. 5A-5C. In this simulation, a 30-antenna array was used in the transmitter. As illustrated in FIG. 6A, in this simulation, the number of signal level measurements required to determine the optimal phase in the binary search method approaches approximately 180 as the number of antennas that have transmitted RF test signals approaches 30. This contrasts with the results of the simulation illustrated in FIG. 6B. The plot in FIG. 6B illustrates the results of a simulation of the least squares method described above with reference to FIGS. 5A-5C. In this simulation, a 30-antenna array was used in the transmitter. As illustrated in FIG. 6B, in this simulation, the number of signal level measurements required to determine the optimal phase in the least squares method approaches approximately 90 as the number of antennas that have transmitted RF test signals approaches 30. Therefore, the least squares method achieves approximately half the computational complexity as the binary search method.

Figure 7:
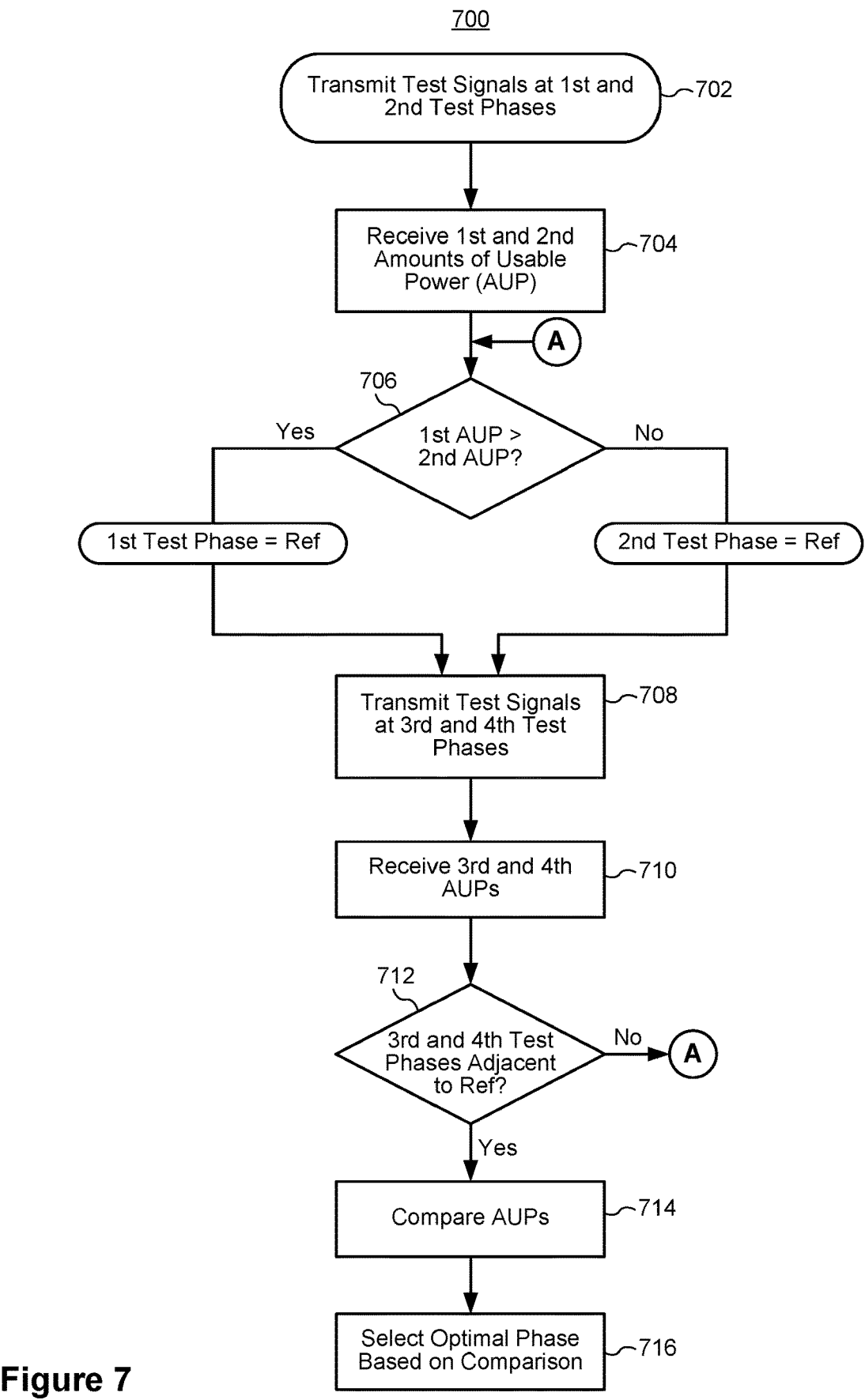
FIG. 7 is a flow diagram illustrating a method of estimating an optimal phase in accordance with some embodiments.

FIG. 7 is a flow diagram illustrating a binary search method 700 of estimating an optimal phase in accordance with some embodiments. Operations of the method 700 may be performed by a transmitter (e.g., transmitter 102, FIGS.

1-2) or by one or more components thereof (e.g., those described above with reference to FIG. 2). FIG. 7 corresponds to instructions stored in a computer memory or computer-readable storage medium (e.g., memory 106 of the transmitter 102, FIG. 2). It is noted that aspects of the binary search method have already been described above with reference to the method 500. Therefore, for the sake of brevity, those aspects already covered in the method 500 are generally not repeated here.

The method 700 includes receiving, by a radio of the transmitter, a wireless communication signal (e.g., signal 118, FIG. 1) indicating that a receiver is within a wireless-power-transmission range of the transmitter. Receiving a wireless communication signal from a receiver is discussed in further detail above with reference to step 502 of the method 500.

The method 700 further includes, in response to receiving the wireless communication signal: transmitting (702), via a respective antenna of the antenna array of the wireless-power-transmitting device: (i) a first radio frequency (RF) test signal at a first test phase of a plurality of available phases for the respective antenna, and (ii) a second RF test signal at a second test phase of the plurality of available phases. The first and second test phases are separated by a number of the available test phases. The available phases include a range of phase values, and the first and second test phases are selected so that a threshold number of phase values from the range of phase values separate the first and second test phases. To illustrate, if the first and second test phases are 3/16 and 11/16, respectively, then these example settings are separate by seven phase values from either's perspective (e.g., seven phase values separate 3/16 and 11/16 (e.g., 4/16 through 10/16), and seven phase values separate 11/16 and 3/16, e.g., 12/16 through 2/16). One example is that a predetermined interval is used to ensure that the number of the available test phases is between the first and second test settings (e.g., the predetermined interval is seven phase values).

The method 700 further includes receiving (704), from the wireless-power-receiving device, information identifying first and second amounts of power delivered to (i.e., received by) the wireless-power-receiving device by the first and second RF test signals, respectively. Receiving additional signals from the receiver is discussed in further detail above with reference to steps 522 and 524 of the method 500.

The method 700 further includes determining (706) whether the first amount of power is greater than the second amount of usable power (or vice versa). In response to determining that the first amount of power is greater than the second amount of power (706-Yes), the method 700 further includes selecting the first test phase as a reference test phase. Alternatively, in response to determining that the first amount of power is not greater than the second amount of power (706-No), the method 700 includes selecting the second test phase as the reference test phase.

For ease of discussion going forward, the first test phase is selected as the reference test phase. With that said, the discussion below could equally apply to those situations where the second test phase is selected as the reference test phase. It is also noted that, in some instances, the first and second amounts of power may be equal to each other. In such instances, the process described below is repeated for the second test phase. Optimal phases determined from the first test phase and the second test phase are then compared (if different), and the result with the highest amount of power is chosen as the final optimal phase for the respective antenna.

In some embodiments, the method 700 further includes transmitting (708), via the respective antenna, third and fourth RF test signals at third and fourth test phases (each distinct from the first and second test phases), respectively, where the third test phase is a greater phase value than the reference test phase (i.e., the first test phase) and the fourth test phase is a smaller phase value than the reference test phase (i.e., the first test phase). In addition, the third and fourth test phases are both one of the number of the available test phases that separated the first and second test phases. To illustrate, if 3/16 is selected to be the reference test phase, then the third and fourth test phases are, say, 15/16 and 7/16. It is noted that other phase values for the third and fourth test phases may be selected, and the examples provided are used here to provide context.

In some embodiments, the method 700 includes receiving (710), from the wireless-power-receiving device, information identifying third and fourth amounts of power delivered to the wireless-power-receiving device by the third and fourth RF test signals. Again, receiving additional signals from the receiver is discussed in further detail above with reference to steps 522 and 524 of the method 500.

Thereafter, the method 700 includes determining (712) whether the third and fourth test phases are each adjacent to the reference test phase. To illustrate, if 3/16 is selected to be the reference test phase, and the third and fourth test phases are, say, 2/16 and 4/16, then the third and fourth test phases are each "adjacent" to the reference test phase (i.e., the reference test phase, the third test phases, and the fourth test phases are sequential numbers).

In some embodiments, in accordance with a determination that the third and fourth test phases are each adjacent to the reference test phase (712-Yes), the method 700 further comprises: (i) comparing (714) the first, third, and fourth amounts of power to one another, and (ii) selecting (716), as an optimal phase for the respective antenna, the phase with a highest amount of power from the first, third, and fourth amounts of power.

However, in accordance with a determination that the third and fourth test phases are not each adjacent to the reference test phase (712-No), the method 700 loops back to the determining step of 706, and further includes determining (706) whether the third amount of power is greater than the fourth amount of power. During the loop operation, the steps of 708, 710, 712, and potentially steps 714 and 716 are repeated. For example, in response to determining that the third amount of power is greater than the fourth amount of power (706-Yes), the method 700 may include: (i) selecting the third test phase as the reference test phase, and (ii) transmitting, via the respective antenna, fifth and sixth RF test signals at fifth and sixth test phases, respectively, where the fifth test phase is a greater phase value than the third test phase and the sixth test phase is a smaller phase value than the third test phase. In addition, the fifth and sixth test phases are both one of the number of the available test phases that separate the first and second test phases. Similar steps are performed if the fourth test phase is selected as the reference test phase. To illustrate and by building on the example above, if 3/16 is selected to be the first reference test phase and (i) the third and fourth test phases are 15/16 and 7/16 and (ii) 7/16 is selected to be the second reference test phase, then the fifth and sixth test phases are, say, 5/16 and 9/16 (or some other values less than and greater than 7/16).

Continuing with this example, the method 700 can further include receiving (710), from the wireless-power-receiving device, information identifying fifth and sixth amounts of power delivered to the wireless-power-receiving device by the fifth and sixth RF test signals. Thereafter, the method 700 includes determining (712) whether the fifth and sixth test phases are each adjacent to the reference test phase. In accordance with a determination that the fifth and sixth test phases are each adjacent to the reference test phase (712-Yes), the method 700 further includes: (i) comparing (714) the first, fifth, and sixth amounts of power to one another, and (ii) selecting (716), as an optimal phase for the respective antenna, the phase with a highest amount of power from the first, fifth, and sixth amounts of power. However, in accordance with a determination that the third and fourth test phases are not each adjacent to the reference test phase (712-No), the method 700 loops back to the determining step of 706 and the loop operation is performed again (e.g., seventh and eighth RF test signals at seventh and eighth test phases are transmitted). The method 700 continues to loop until the Xth and Yth test phases are both adjacent to the reference test phase.

After the optimal phase is selected for the respective antenna of the transmitter, the method 700 includes transmitting, via the respective antenna, one or more RF power signals having the optimal phase to the receiver. In some embodiments, the receiver uses power (e.g., energy) from the one or more RF power signals to power or charge itself and/or power or charge an electronic device coupled to the receiver.

In some embodiments, the method 700 also includes tuning each additional antenna of the antenna array in the manner described in the method 700. Once each antenna (or some threshold number of antennas) of the transmitter is (are) tuned to its (their) optimal phase, the method 700 includes transmitting, via each antenna, RF power signals with the determined optimal phases to the receiver.

It will be understood that, although the terms "first," "second," etc. are used above to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Features of the present invention can be implemented in, using, or with the assistance of a computer program product, such as a storage medium (media) or computer readable storage medium (media) having instructions stored thereon/in which can be used to program a processing system to perform any of the features presented herein. The storage medium (e.g., memory 106) can include, but is not limited to, high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Memory (e.g., 106, 134, and/or 142) optionally includes one or more storage devices remotely located from the CPU(s) (e.g., processor(s) 104, 132, and/or 140). Memory (e.g., 106, 134, and/or 142), or alternatively the non-volatile memory device(s) within the memory, comprises a non-transitory computer readable storage medium.

Stored on any one of the machine readable medium (media), features of the present invention (e.g., an executable instruction set to cause a transmitter and/or receiver to perform aspects of the methods 500 and 700) can be incorporated in software and/or firmware for controlling the hardware of a processing system (such as the components associated with the transmitters 102 and/or receivers 120), and for enabling a processing system to interact with other mechanisms utilizing the results of the present invention. Such software or firmware may include, but is not limited to, application code, device drivers, operating systems, and execution environments/containers.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

What is claimed is:

1. A non-transitory, computer-readable storage medium including instructions that, when executed by a wireless-power transmitter with an antenna array, cause the wireless-power transmitter to perform operations comprising:
  transmitting, via an antenna of the antenna array of the wireless-power transmitter, a set of radio frequency (RF) test signals, wherein each RF test signal in the set of RF test signals uses a distinct phase of a plurality of available phases for the antenna;
  receiving, from a wireless-power receiver, information identifying respective amounts of power delivered to the wireless-power receiver by each RF test signal in the set of RF test signals; and
  determining, based on the respective amounts of power delivered to the wireless-power receiver, an optimal phase, wherein the optimal phase is a phase of the plurality of available phases for the antenna that delivers a greatest amount of power to the wireless-power receiver.

2. The non-transitory, computer-readable storage medium of claim 1, wherein the set of RF test signals includes at least two RF test signals.

3. The non-transitory, computer-readable storage medium of claim 2, wherein the set of RF test signals includes at least three RF test signals.

4. The non-transitory, computer-readable storage medium of claim 1, wherein the operations that the wireless-power transmitter is caused to perform further-comprise:
transmitting, via the antenna of the antenna array, one or more RF power signals using the optimal phase of the plurality of available phases for the antenna to the wireless-power receiver, wherein the wireless-power receiver converts the one or more RF power signals into usable power.

5. The non-transitory, computer-readable medium of claim 1, wherein determining the optimal phase includes determining that an RF test signal in the set of RF test signals uses the optimal phase of the plurality of available phases for the antenna.

6. The non-transitory, computer-readable medium of claim 1, wherein determining the optimal phase comprises:
determining an RF test signal in the set of RF test signals that delivers a greatest amount of power to the wireless-power receiver;
transmitting, via the antenna of the antenna array of the wireless-power transmitter, an additional set of RF test signals, wherein each RF test signal in the additional set of RF test signals uses another distinct phase of the plurality of available phases for the antenna, wherein each other distinct phase is separated from a respective phase used to transmit the RF test signal in the set of RF test signals by a respective phase increment;
receiving, from the wireless-power receiver, additional information identifying respective amounts of power delivered to the wireless-power receiver by each RF test signal in the additional set of RF test signals; and
determining, based on the respective amounts of power delivered to the wireless-power receiver, the optimal phase.

7. The non-transitory, computer-readable medium of claim 1, wherein determining the optimal phase further comprises interpolating the optimal phase from the set of RF test signals.

8. The non-transitory, computer-readable medium of claim 1, wherein the wireless-power receiver is a first wireless-power receiver, the antenna of the antenna array is a first antenna, and the set of RF test signals is a first set of RF test signals, and wherein the instructions further cause the wireless-power transmitter to perform operations including:
responsive to receiving, at the wireless-power transmitter, an additional wireless communication signal indicating that a second wireless-power receiver is within a wireless-power-transmission range of the wireless-power transmitter:
transmitting, via a second antenna of the antenna array of the wireless-power transmitter, a second set of RF test signals, wherein each RF test signal in the second set of RF test signals uses a distinct phase of a plurality of available phases for the second antenna;
receiving, from the second wireless-power receiver, information identifying respective amounts of power delivered to the second wireless-power receiver by each RF test signal in the second set of RF test signals; and
determining, based on the respective amounts of power delivered to the second wireless-power receiver, a respective optimal phase, wherein the respective optimal phase is a phase of the plurality of available phases for the second antenna that delivers a greatest amount of power to the second wireless-power receiver.

9. The non-transitory, computer-readable medium of claim 1, wherein a respective distinct phase of each RF test signal in the set of RF test signals is separated from another respective distinct phase of another test signal in the set of RF test signals by a predetermined phase interval.

10. The non-transitory, computer-readable medium of claim 9, wherein the predetermined phase interval corresponds to known characteristics of a pure sinusoidal wave.

11. The non-transitory, computer-readable medium of claim 1, wherein the operations that the wireless-power transmitter is caused to perform further comprise determining a location of the wireless-power receiver based on the optimal phase.

12. The non-transitory, computer-readable medium of claim 1, wherein the operations that the wireless-power transmitter is caused to perform further comprise, for each antenna of the antenna array of the wireless-power transmitter:
transmitting a respective set of RF test signals, wherein each RF test signal in the respective set of RF test signals uses a distinct phase of a plurality of available phases for the respective antenna;
receiving, from the wireless-power receiver, information identifying respective amounts of power delivered to the wireless-power receiver by each RF test signal in the respective set of RF test signals; and
determining, based on the respective amounts of power delivered to the wireless-power receiver, a respective optimal phase, wherein the respective optimal phase is a phase of the plurality of available phases that delivers a greatest amount of power to the wireless-power receiver.

13. The non-transitory, computer-readable medium of claim 12, wherein at least one optimal phase determined for a first antenna of the antenna array is distinct from another optimal phase determined for a second antenna of the antenna array.

14. The non-transitory, computer-readable medium of claim 1, wherein the plurality of available phases for the antenna to the wireless-power receiver includes at least 16 phases.

15. The non-transitory, computer-readable medium of claim 14, wherein the plurality of available phases for the antenna to the wireless-power receiver includes at least 64 phases.

16. A wireless-power transmitter, comprising:
a wireless communications radio;
an antenna array;
one or more processors; and
memory storing one or more programs for execution by the one or more processors, the one or more programs including instructions for:
transmitting, via an antenna of the antenna array of the wireless-power transmitter, a set of radio frequency (RF) test signals, wherein each RF test signal in the set of RF test signals uses a distinct phase of a plurality of available phases for the antenna;
receiving, from a wireless-power receiver, information identifying respective amounts of power delivered to the wireless-power receiver by each RF test signal in the set of RF test signals; and determining, based on the respective amounts of power delivered to the wireless-power receiver, an optimal phase, wherein the optimal phase is a phase of the plurality of available phases for the antenna that delivers a greatest amount of power to the wireless-power receiver.

17. The wireless-power transmitter of claim 16, wherein the set of RF test signals includes at least two RF test signals.

18. The wireless-power transmitter of claim 17, wherein the set of RF test signals includes at least three RF test signals.

19. The wireless-power transmitter of claim 16, the one or more programs further comprising instructions for:

transmitting, via the antenna of the antenna array, one or more RF power signals using the optimal phase of the plurality of available phases for the antenna to the wireless-power receiver, wherein the wireless-power receiver converts the one or more RF power signals into usable power.

20. A method performed at a wireless-power transmitter that includes an antenna array, the method comprising:

transmitting, via an antenna of the antenna array of the wireless-power transmitter, a set of radio frequency (RF) test signals, wherein each RF test signal in the set of RF test signals uses a distinct phase of a plurality of available phases for the antenna;

receiving, from a wireless-power receiver, information identifying respective amounts of power delivered to the wireless-power receiver by each RF test signal in the set of RF test signals; and determining, based on the respective amounts of power delivered to the wireless-power receiver, an optimal phase, wherein the optimal phase is a phase of the plurality of available phases for the antenna that delivers a greatest amount of power to the wireless-power receiver.

21. The non-transitory, computer-readable storage medium of claim 1, wherein no RF test signals in the set of RF test signals are transmitted using untested phases in the plurality of available phases for the antenna, and the optimal phase is one of the untested phases.

22. The wireless-power transmitter of claim 16, wherein no RF test signals in the set of RF test signals are transmitted using untested phases in the plurality of available phases for the antenna, and the optimal phase is one of the untested phases.

23. The method of claim 20, wherein no RF test signals in the set of RF test signals are transmitted using untested phases in the plurality of available phases, and the optimal phase is one of the untested phases.

24. The wireless-power transmitter of claim 16, wherein determining the optimal phase further comprises interpolating the optimal phase from respective distinct phases used to transmit each RF test signal in the set of RF test signals.

25. The wireless-power transmitter of claim 16, wherein the wireless-power receiver is a first wireless-power receiver, the antenna of the antenna array is a first antenna, and the set of RF test signals is a first set of RF test signals, and wherein the one or more programs further comprise instructions for:

responsive to receiving, at the wireless-power transmitter, an additional wireless communication signal indicating that a second wireless-power receiver is within a wireless-power-transmission range of the wireless-power transmitter:

transmitting, via a second antenna of the antenna array of the wireless-power transmitter, a second set of RF test signals, wherein each RF test signal in the second set of RF test signals uses a distinct phase of a plurality of available phases for the second antenna;

receiving, from the second wireless-power receiver, information identifying respective amounts of power delivered to the second wireless-power receiver by each RF test signal in the second set of RF test signals; and determining, based on the respective amounts of power delivered to the second wireless-power receiver, a respective optimal phase, wherein the respective optimal phase is a phase of the plurality of available phases for the second antenna that delivers a greatest amount of power to the second wireless-power receiver.

26. The wireless-power transmitter of claim 16, wherein a respective distinct phase of each RF test signal in the set of RF test signals is separated from another respective distinct phase of another test signal in the set of RF test signals by a predetermined phase interval.

27. The wireless-power transmitter of claim 26, wherein the predetermined phase interval corresponds to known characteristics of a pure sinusoidal wave.

28. The wireless-power transmitter of claim 16, wherein the one or more programs further comprise instructions for:

for each antenna of the antenna array of the wireless-power transmitter:

transmitting a respective set of RF test signals, wherein each RF test signal in the respective set of RF test signals uses a distinct phase of a plurality of available phases for the respective antenna;

receiving, from the wireless-power receiver, information identifying respective amounts of power delivered to the wireless-power receiver by each RF test signal in the respective set of RF test signals; and determining, based on the respective amounts of power delivered to the wireless-power receiver, a respective optimal phase, wherein the respective optimal phase is a phase of the plurality of available phases that delivers a greatest amount of power to the wireless-power receiver.

29. The wireless-power transmitter of claim 28, wherein at least one optimal phase for a first antenna of the antenna array is distinct from another optimal phase determined for a second antenna of the antenna array.

\* \* \* \* \*